(12) United States Patent
Machida

(10) Patent No.: US 7,002,702 B1
(45) Date of Patent: Feb. 21, 2006

(54) DATA PROCESSING APPARATUS AND DATA PROCESSING METHOD FOR CONTROLLING PLURAL PERIPHERAL DEVICES TO PROVIDE FUNCTION

(75) Inventor: Haruo Machida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/544,669

(22) Filed: Apr. 6, 2000

(30) Foreign Application Priority Data

Apr. 9, 1999 (JP) .................................. 11-102076
Apr. 30, 1999 (JP) .................................. 11-124821

(51) Int. Cl.
*H04N 1/40* (2006.01)
(52) U.S. Cl. ..................................... 358/1.15; 358/1.13
(58) Field of Classification Search ................ 345/853, 345/839; 358/1.13, 1.3, 1.9, 1.15, 2.1; 710/15
See application file for complete search history.

(56) References Cited

U.S. PATENT DOCUMENTS

| | | | | |
|---|---|---|---|---|
| 5,353,399 A | * | 10/1994 | Kuwamoto et al. | 345/736 |
| 5,790,119 A | * | 8/1998 | Sklut et al. | 345/839 |
| 5,887,193 A | | 3/1999 | Takahashi et al. | 709/249 |
| 5,935,217 A | | 8/1999 | Sakai et al. | 709/249 |
| 5,996,029 A | * | 11/1999 | Sugiyama et al. | 710/15 |
| 6,011,553 A | * | 1/2000 | Komiyama | 345/839 |
| 6,147,770 A | * | 11/2000 | Unishi et al. | 358/1.2 |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

A plural peripheral devices are controlled by an operation on icons to provide a user with a function implemented by the peripheral devices. Furthermore, optimal parameters concerning function are determined based on information about the peripheral devices.

57 Claims, 48 Drawing Sheets

| NO. OF REGISTERED FUNCTIONS | | 601 |
| --- | --- | --- |
| COMMENT | | 602 |
| 1 | SCANNER | 603a |
| | PRINTER | 603b |
| | COPIER | 603c |
| | COMMENT | 603d |
| ⋮ | | |
| N | SCANNER | 604a |
| | FAX MODEM | 604b |
| | FAX | 604c |
| | COMMENT | 604d |

603 labels the "1" group; 604 labels the "N" group.

FIG. 11

| NO. OF REGISTERED FUNCTIONS | ~1101 |

| | | | |
|---|---|---|---|
| 1103 | 1 | COMMENT | ~1102 |
| | | DEVICE ATTRIBUTE | ~1103a |
| | | DRIVER NAME | ~1103b |
| | | COMBINED FUNCTION | ~1103c |
| | | EXECUTION MODULE | ~1103d |
| | | ⋮ | |
| 1104 | N | DEVICE ATTRIBUTE | ~1104a |
| | | DRIVER NAME | ~1104b |
| | | COMBINED FUNCTION | ~1104c |
| | | EXECUTION MODULE | ~1104d |

FIG. 14

MEMORY MAP OF MEMORY
MEDIUM (FD/CD-ROM ETC.)

| DIRECTORY |
|---|
| 1ST DATA PROCESSING PROGRAM PROGRAM CODES FOR FLOWCHART OF FIG. 7 |
| 2ND DATA PROCESSING PROGRAM PROGRAM CODES FOR FLOWCHART OF FIG. 10 |
| |

FIG. 15

| PAGE SETUP | PRINTER DRIVER NAME | } 1501 |
| --- | --- | --- |
| | VERSION | |
| | COMMENT | |
| PAGE SETUP | ORIGINAL SIZE | } 1502 |
| | PAPER SIZE | |
| | PRINT DIRECTION | |
| | PAGE LAYOUT | |
| | MAGNIFICATION | |
| | STAMP | |
| FINISHING | PRINTING METHOD | } 1503 |
| | BINDING DIRECTION | |
| | EJECTION METHOD | |
| PAPER FEED | FEED METHOD | } 1504 |
| | OHP SETUP | |
| DEVICE SETUP | FEED OPTION | } 1505 |
| | EJECTION OPTION | |

FIG. 25

| | | |
|---|---|---|
| PRINTER DRIVER NAME | | } 2501 |
| VERSION | | |
| COMMENT | | |
| PAGE SETUP | RESOURCE OFFSET | } 2502 |
| | ORIGINAL SIZE | |
| | RESOURCE OFFSET | |
| | PAPER SIZE | |
| | RESOURCE OFFSET | |
| | PRINT DIRECTION | |
| | RESOURCE OFFSET | |
| | PAGE LAYOUT | |
| | RESOURCE OFFSET | |
| | MAGNIFICATION | |
| | RESOURCE OFFSET | |
| | STAMP | |
| | RESOURCE OFFSET | |
| FINISHING | RESOURCE OFFSET | } 2503 |
| | PRINTING METHOD | |
| | RESOURCE OFFSET | |
| | BINDING DIRECTION | |
| | RESOURCE OFFSET | |
| | EJECTION METHOD | |
| | RESOURCE OFFSET | |
| PAPER FEED | RESOURCE OFFSET | } 2504 |
| | FEED METHOD | |
| | RESOURCE OFFSET | |
| | OHP SETUP | |
| | RESOURCE OFFSET | |
| DEVICE SETUP | RESOURCE OFFSET | } 2505 |
| | FEED OPTION | |
| | RESOURCE OFFSET | |
| | EJECTION OPTION | |
| | RESOURCE OFFSET | |
| RESOURCE DATA | | } 2506 |

FIG. 28

| | | | |
|---|---|---|---|
| | MANAGEMENT DOMAIN NAME | | 2871 |
| | NO. OF PRINTERS TO MANAGE (M) | | |
| | COMMENT | | |
| 2881 | PRINTER NAME | | |
| 2882 | NO. OF LOGS (N1) | | |
| 2883 | COMMENT | | |
| | 1 | 1 | INPUT INFORMATION |
| | | | NO. OF PAGES TO PRINT |
| | | | PAPER SIZE |
| 2884-1 | | | PAPER HEIGHT |
| | | | PAPER WIDTH |
| | | | COLOR/MONO |
| | | | SINGLE/DOUBLE-SIDED |
| | | | TONER CONSUMPTION AMOUNT (Y, M, C,K) |
| | | ⋮ | |
| 2884-N1 | | N1 | |

2870

2872-1

⋮

| | | | |
|---|---|---|---|
| | PRINTER NAME | | |
| | NO. OF LOGS (N2) | | |
| | COMMENT | | |
| M | 1 | INPUT INFORMATION | |
| | | NO. OF PAGES TO PRINT | |
| | | PAPER SIZE | |
| | | PAPER HEIGHT | |
| | | PAPER WIDTH | |
| | | COLOR/MONO | |
| | | SINGLE/DOUBLE-SIDED | |
| | | TONER CONSUMPTION AMOUNT (Y, M, C,K) | |
| | ⋮ | | |
| | N2 | | |

| ITEM | CONTENTS | DATA RECORDING |
|---|---|---|
| SENDER | SENDER OF FAX | ONLY WHEN FAX DATA CONTAINS VALID INFORMATION OF SENDER |
| FAX NO. | FAX NO. OF SENDER | ONLY WHEN FAX DATA CONTAINS VALID FAX NUMBER DATA IN CSI BLOCK |
| DATE | DATE OF FAX RECEPTION | YY/MM/DD HH:MM |
| RECEPTION RESULT | STATUS OF FAX RECEPTION | ·NORMAL TERMINATION → SUCCESSFUL<br>·OTHERWISE → FAILED |
| RECEPTION TIME | TIME TO COST RECEIVING DATA | THE FORMAT IS "HH:MM:SS". IN CASE OF LESS THAN 1 HOUR, THE FORMAT IS "MM:SS" |
| NO. OF PAGES | NO. OF PAGES RECEIVED | |
| ERROR | RECEIVE ERROR INF. | |
| RESOLUTION | RESOLUTION OF IMAGE RECEIVED | 100, 200DPI |
| COMPRESSION | COMPRESSION METHOD | MH, MR, MMR |

FIG. 30

| ITEM | CONTENTS | DATA RECORDING |
|---|---|---|
| RECEIVER | RECEIVER OF FAX | RECEIVER'S NAME THAT IS INDICATED IN FAX SENDING DIALOG |
| FAX NO. | FAX NO. OF RECEIVER | |
| DATE | DATE OF FAX SENDING | YY/MM/DD HH:MM |
| SENDING RESULT | STATUS OF FAX SENDING | • NORMAL TERMINATION → SUCCESSFUL<br><br>• PARTIALLY FAILED (SOME SENDING FAILED IN CASE OF MULTIPLE RECEIVERS)<br><br>• OTHERWISE → FAILED |
| SENDING TIME | TIME TO COST SENDING DATA | THE FORMAT IS "HH:MM:SS". IF LESS THAN 1 HOUR, FORMAT IS "MM:SS" |
| NO. OF TRIALS | NO. OF SENDING TRIALS | |
| DOCUMENT NAME | DOCUMENT NAME THAT IS SENT | • IN VFAX PRINTER THE NAME OF PRINTED DOCUMENT<br><br>• IN CASE OF VOC'S FUNCTION, (SCAN IMAGE AND SEND FAX) THIS NAME IS "PCNAME-YYMMDDHHMM. TIX" |
| NUMBER OF RECEIVERS | | |
| NO. OF PAGES | NO. OF PAGES SENT | SENT PAGES/TOTAL PAGE (EX. 25/100) |
| ERROR | ERROR INFORMATION OF THE JOB | ERROR INFORMATION LIKE "RECEIVER FAX IS BUSY" |
| SECTION OF RECEIVER | SECTION OF FAX RECEIVER | COMPANY NAME+SECTION NAME |
| COMMENT | COMMENT ON COVER PAGE | |
| RESOLUTION | RESOLUTION OF IMAGE SENT | 100, 200DPI |
| COMPRESSION | COMPRESSION METHOD | MH, MR, MMR |
| TIME TO SERVER | THE TIME FAX DATA IS RECEIVED TO SERVER'S WAITING TRAY | YY/MM/DD HH:MM |
| SENDER | USER NAME WHO SENDS THIS FAX | |
| SENDER PC | PC NAME OF SENDER | |

FIG. 31

| ITEM | CONTENTS |
|---|---|
| USER NAME | USER NAME WHO PERFORMED SCANNING (INF. IN HTTP HEADER) |
| SCAN START TIME | START TIME OF TWAIN SESSION (CALL TIME OF SNTBEGINSESSION) |
| SCAN END TIME | END TIME OF TWAIN SESSION (CALL TIME OF SNTENDSESSION) |
| NO. OF SCAN PAGES | NO. OF PAGES OF SCANNED DOCUMENT (MAX 10 FIGURES) |
| MACHINE NAME | MACHINE NAME FOR SCAN (MAX 15 FIGURES) |
| TWAIN DRIVER NAME | TWAIN DRIVER NAME FOR SCAN (MAX 32 FIGURES) |
|  |  |
| PAPER SIZE |  |
| PAPER HEIGHT | PAPER HEIGHT IN 1/10MM UNITS (MAX 4 FIGURES) |
| PAPER WIDTH | PAPER WIDTH IN 1/10MM UNITS (MAX 4 FIGURES) |
| COLOR/MONO | 1 : MONOCHROME<br>2 : COLOR |
|  |  |
|  |  |

FIG. 32

| ITEM | CONTENTS |
|---|---|
| USER NAME | USER NAME WHO PERFORMED PRINTING |
| PRINT START TIME | START TIME OF PRINT JOB |
| PRINT END TIME | END TIME OF PRINT JOB |
| NO. OF PRINT PAGES | NO. OF PAGES OF PRINTED DOCUMENT (MAX 10 FIGURES) |
| MACHINE NAME | MACHINE NAME FOR PRINT (MAX 15 FIGURES) |
| PRINTER DRIVER NAME | PRINTER DRIVER NAME FOR PRINT (MAX 32 FIGURES) |
| APPLICATION NAME | · APPLICATION NAME THAT PERFORMED PRINTING<br>· FOR SCANNER, SCANNER MACHINE NAME, RESOLUTION COLOR/MONO |
| NO. OF COPIES | NO. OF COPIES DESIGNATED (MAX 6 FIGURES) |
|  |  |
| PAPER SIZE |  |
| PAPER HEIGHT | PAPER HEIGHT IN 1/10MM UNITS (MAX 4 FIGURES) |
| PAPER WIDTH | PAPER WIDTH IN 1/10MM UNITS (MAX 4 FIGURES) |
| COLOR/MONO | 1 : MONOCHROME<br>2 : COLOR |
| SIGNAL/DOUBLE-SIDED | 1 : SINGLE<br>2 : DOUBLE |
| TONER AMOUNT (Y, M, C, K) | TONER CONSUMPTION AMOUNT |
|  |  |

FIG. 34

| | | | |
|---|---|---|---|
| 3401 — HEADER INFORMATION | | VERSION | |
| | | INDEX TABLE NUMBER → N | |
| | | INDEX TABLE OFFSET | |
| 3402 — INDEX TABLE | ELEMENT [0] | DATA OFFSET | |
| | | DATA SIZE | |
| | | FLAG | |
| | ⋮ | ⋮ | |
| | ELEMENT [N-1] | DATA OFFSET | |
| | | DATA SIZE | |
| | | FLAG | |
| 3403-1 CLIENT PC DEVICE INFORMATION DATA [0] | 3404 — PC INFORMATION | PC NAME | |
| | | LOGON USER | |
| | | LICENSE INFORMATION | |
| | | OS INFORMATION | |
| | | PRINTER INFORMATION NUMBER → N0 | |
| | | SCANNER INFORMATION NUMBER → N1 | |
| | | FAX BOARD INFORMATION NUMBER → N2 | |
| | 3405 — PRINTER INFORMATION [0] | | |
| | ⋮ | | |
| | PRINTER INFORMATION [N0-1] | | |
| | 3406 — SCANNER INFORMATION [0] | | |
| | ⋮ | | |
| | SCANNER INFORMATION [N1-1] | | |
| | 3407 — FAX BOARD INFORMATION [0] | | |
| | ⋮ | | |
| | FAX BOARD INFORMATION [N2-1] | | |
| ⋮ | ⋮ | | |
| 3403-N CLIENT PC DEVICE INFORMATION DATA [N-1] | PC INFORMATION | | |
| | PRINTER INFORMATION | | |
| | SCANNER INFORMATION | | |
| | FAX BOARD INFORMATION | | |

PC INFORMATION 3404

| INFORMATION | CONTENTS |
|---|---|
| PC NAME | PC'S NET BIOS NAME |
| LOGON USER | PC'S LOGON USER |
| LICENSE INFORMATION | LICENSE NUMBER |
| OS INFORAMTION | 95/98 OR NT |
| NUMBER OF PRINTER INFORMATION | |
| NUMBER OF SCANNER INFORMATION | |
| NUMBER OF FAX BOARD INFORMATION | |

FIG. 35B

PRINTER INFORMATION 3405

| INFORMATION | CONTENTS | HOW TO OBTAIN |
|---|---|---|
| PRINTER NAME | CONNECTION INFORMATION, PRINTER NAME | PPRINTERNAME IN PRINTER _INFO_2 |
| DRIVER NAME | CONNECTION INFORMATION, DRIVER NAME | PDRIVERNAME IN PRINTER _INFO_2 |
| SHARED NAME | CONNECTION INFORMATION, SHARED NAME IN THE NETWORK | PSHARENAME IN PRINTER _INFO_2 |
| PORT NAME | CONNECTION INFORMATION, PRINTER PORT INFORMATION | PPORTNAME IN PRINTER _INFO_2 |
| SHARED INFORMATION | CONNECTION INFORMATION, THE INFORMATION TO SHARE AS NETWORK PRINTER | PATTRIBUTENAME IN PRINTER _INFO_2 |
| SERVER NAME | CONNECTION INFORMATION, SERVER PC OF SHARED PRINTER | PSERVERNAME IN PRINTER _INFO_2 |
| COLOR INFORMATION | DEVICE ATTRIBUTE INFORMATION | DMCOLOR OF PDEVMODE IN PRINTER_INFO_2 |

FIG. 36A

SCANNER INFORMATION 3406

| INFORMATION | CONTENTS | HOW TO OBTAIN |
|---|---|---|
| TWAIN SOURCE NAME | CONNECTION INFORMATION, TWAIN SOURCE NAME | OBTAINED BY TWAIN MANAGER TW_IDENTITY. PRODUCTNAME |
| SHARED NAME | CONNECTION INFORMATION, SHARED NAME IN THE NETWORK | UNDER VOS MANAGEMENT |
| SHARED INFORMATION | CONNECTION INFORMATION, SHARED INFORMATION LIKE PASSWORD IS SET OR NOT | UNDER VOS MANAGEMENT |
| MANUFACTURER NAME | DEVICE ATTRIBUTE INFORMATION, TWAIN MANUFACTURER NAME | STUB'S SNTGETSCANNER ATTRIBUTE 0 CAN GET THIS INFORMATION |
| ADF INFORMATION | DEVICE ATTRIBUTE INFORMATION, ADF CONNECTION INFORMATION | STUB'S SNTGETSCANNER ATTRIBUTE 0 CAN GET THIS INFORMATION |
| COLOR INFORMATION | DEVICE ATTRIBUTE INFORMATION, TWAIN DEVICE'S COLOR INFORMATION | STUB'S SNTGETSCANNER ATTRIBUTE 0 CAN GET THIS INFORMATION |
| UI INFORMATION | DEVICE ATTRIBUTE INFORMATION, SILENT UI OR NOT | STUB'S SNTGETSCANNER ATTRIBUTE 0 CAN GET THIS INFORMATION |
| THE FOLLOWING INFORMATION DOES NOT BE NEEDED FOR THE PURPOSE OF SHOWING THE SCANNER ICON. BUT VTD MUST CHECK THE TWAIN DRIVER VERSION WHEN IT IS CONNECTED TO REMOTE SCANNER, BECAUSE VTD SAVES THE INFORMATION OF CAPABILITIES AND MUST JUDGE IF THIS INFORMATION IS RIGHT OR NOT. THEREFORE IT MAY BE GOOD WAY TO SAVE THE FOLLOWING INFORMATION IN THIS SCANNER INFORMATION TABLE. THIS TOPICS IS NECESSARY TO DISCUSS WITH PECAN. IF YOU JUDGE THAT THE FOLLOWING ITEMS ARE NOT NEEDED, PLEASE TELL US | | |
| THE ELSE OF TW_IDENTITY | OTHER TW IDENTITY INFORMATION (VERSION OF TWAIN PROTOCOL, VERSION OF TWAIN DRIVER) | THE ELSE OF TW_IDENTITY INFORMATION (EX. TW_IDENTITY. PROTOCOLMAJOR, TW_IDENTITY. PROTOCOLMINOR, TW_IDENTITY. VERSION. MAJOR NUM, TW_IDENTITY. VERSION. MINOR NUM) |

FIG. 36B

FAX BOARD INFORMATION 3407

| INFORMATION | CONTENTS | HOW TO OBTAIN |
|---|---|---|
| SHARED NAME | CONNECTION INFORMATION, SHARED NAME IN THE NETWORK | UNDER VOS MANAGEMENT |

| | | |
|---|---|---|
| 3401 — HEADER INFORMATION | VERSION | |
| | INDEX TABLE NUMBER → 1 | |
| | INDEX TABLE OFFSET | |
| 3402 — INDEX TABLE | ELEMENT [0] | DATA OFFSET |
| | | DATA SIZE |
| | | FLAG |
| 3701 — LOCAL DEVICE INFORMATION DATA [0] | PC INFORMATION | PC NAME |
| | | LOGON USER |
| | | LICENSE INFORMATION |
| | | OS INFORMATION |
| | | PRINTER INFORMATION NUMBER → N0 |
| | | SCANNER INFORMATION NUMBER → N1 |
| | | FAX BOARD INFORMATION NUMBER → N2 |
| | PRINTER INFORMATION [0] | |
| | ⋮ | |
| | PRINTER INFORMATION [N0-1] | |
| | SCANNER INFORMATION [0] | |
| | ⋮ | |
| | SCANNER INFORMATION [N1-1] | |
| | FAX BOARD INFORMATION [0] | |
| | ⋮ | |
| | FAX BOARD INFORMATION [N2-1] | |

FIG. 38

| | | 3303 (3312, 3315) |
|---|---|---|
| 3401 — HEADER INFORMATION | VERSION | |
| | INDEX TABLE NUMBER → N | |
| | INDEX TABLE OFFSET | |
| 3402 — INDEX TABLE | ELEMENT [0] | DATA OFFSET |
| | | DATA SIZE |
| | | FLAG |
| | ⋮ | |
| | ELEMENT [N-1] | DATA OFFSET |
| | | DATA SIZE |
| | | FLAG |
| 3701 — LOCAL DEVICE INFORMATION DATA | PC INFORMATION | |
| | PRINTER INFORMATION | |
| | SCANNER INFORMATION | |
| 3403-1 — CLIENT PC DEVICE INFORMATION DATA | PC INFORMATION | |
| | PRINTER INFORMATION | |
| | SCANNER INFORMATION | |
| | ⋮ | |
| 3403-N — CLIENT PC DEVICE INFORMATION DATA | PC INFORMATION | |
| | PRINTER INFORMATION | |
| | SCANNER INFORMATION | |
| 3407 — NON-CLIENT PC DEVICE INFORMATION DATA | PC INFORMATION | |
| | PRINTER INFORMATION | |
| | ⋮ | |
| 3409 — NON-CLIENT PC DEVICE INFORMATION DATA | PC INFORMATION | |
| | PRINTER INFORMATION | |

FIG. 53

MEMORY MAP OF MEMORY
MEDIUM (FD/CD-ROM ETC.)

| DIRECTORY |
| --- |
| 3RD DATA PROCESSING PROGRAM PROGRAM CODES FOR FLOWCHART OF FIG. 39 |
| 4TH DATA PROCESSING PROGRAM PROGRAM CODES FOR FLOWCHART OF FIG. 41 |
| 5TH DATA PROCESSING PROGRAM PROGRAM CODES FOR FLOWCHART OF FIG. 42 |
| 6TH DATA PROCESSING PROGRAM PROGRAM CODES FOR FLOWCHART OF FIG. 46 |
| 7TH DATA PROCESSING PROGRAM PROGRAM CODES FOR FLOWCHART OF FIG. 47 |
| 8TH DATA PROCESSING PROGRAM PROGRAM CODES FOR FLOWCHART OF FIG. 48 |
| 9TH DATA PROCESSING PROGRAM PROGRAM CODES FOR FLOWCHART OF FIG. 52 |
| |
| |

DATA PROCESSING APPARATUS AND DATA PROCESSING METHOD FOR CONTROLLING PLURAL PERIPHERAL DEVICES TO PROVIDE FUNCTION

BACKGROUND OF THE INVENTION

Field of the Invention

The present invention relates to a data processing apparatus which is capable of performing data communication with various peripheral devices connected to a network, a data processing method, and a memory medium containing a computer-readable program for such a data processing apparatus.

Recently, networks, such as local area networks, connecting peripheral devices, such as personal computers, printers, scanners, and digital cameras, have become widely used. As a result, such peripheral devices, printers, modems, and image scanners have become increasingly shared among the devices connected to the network. By such sharing, a user can use a variety of peripheral devices, including a printer and scanner, on the network.

SUMMARY OF THE INVENTION

However, there are no methods for providing a function by combining the functions of plural peripheral devices. For example, providing a copy function by combining the functions of a scanner and a printer. To implement such a function, special equipment is required. Only certain special apparatuses, such as a multifunctional apparatus having a printer and scanner, can provide such a function, but general-purpose apparatuses cannot implement such a combined function.

BRIEF DESCRIPTION OF THE DRAWINGS

FIG. 11 shows a table of resource information about network devices shown in FIG. 1;

FIG. 14 is a diagram for describing a memory map of a storage medium containing a data processing program which can be read by the data processing apparatus according to the present invention;

FIG. 15 shows an example of device driver information managed by the data processing apparatus according to the present invention;

FIG. 25 shows an example of a resource file of a device driver managed by the data processing apparatus according to the present invention;

FIG. 28 shows an example of log information managed in the data processing apparatus according to the present invention;

FIG. 29 shows an example of log information managed in the data processing apparatus according to the present invention;

FIG. 30 shows an example of log information managed in the data processing apparatus according to the present invention;

FIG. 31 shows an example of log information managed in the data processing apparatus according to the present invention;

FIG. 32 shows an example of log information managed in the data processing apparatus according to the present invention;

FIG. 34 is a diagram for describing management server information;

FIGS. 35A and 35B are diagrams for describing PC information and Printer information in detail;

FIGS. 36A and 36B are diagrams for describing Scanner information and FAX board information in detail;

FIG. 37 is a diagram for describing server device information;

FIG. 38 is a diagram for describing client device information;

FIG. 53 is a diagram for describing a memory map of a storage medium containing various data processing programs which can be read by the data processing apparatus according to the present invention.

DESCRIPTION OF THE PREFERRED EMBODIMENTS

<Network>

Figure 1:
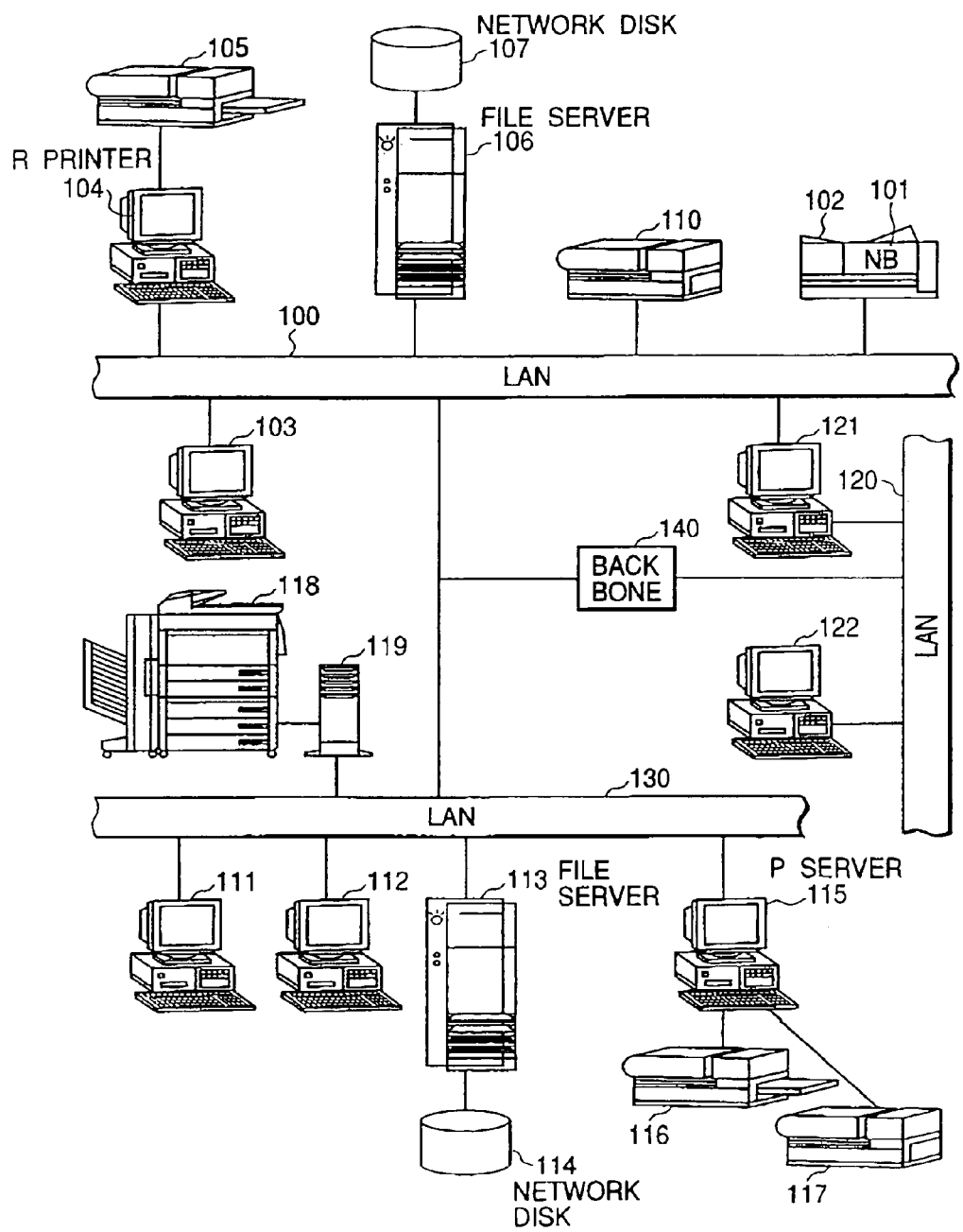
FIG. 1 is a diagram for describing a system configuration of network devices including a data processing apparatus according to the present invention.

FIG. 1 is a diagram for describing a system configuration of network devices including a data processing apparatus according to the present invention.

In FIG. 1, a printer 102 having an open architecture is connected to a network through a network board (NB) 101. The NB 101 is connected to local area networks (LANs) 100, 120, 130 through a local area network interface (not shown), such as an Ethernet interface 10Base-2 having a coaxial connector or a 10Base-T having an RJ-45 connector.

Also connected to the LANs are plural personal computers (PCs), such as PC 103, PC 104, PC 111. PC 112, PC 121 anc PC 122. These PCs can communicate with the NB 101 under the control of a network operating system.

Thus, one of the PCs, the PC 103, for example, can be used as a PC for managing network devices. A printer 105 may be locally connected to the PC 104 as a local printer of the PC 104.

A PC 106/113 which acts as a file server is also connected to the LAN 100/130 and manages access to files stored in a large storage (for example, ten billion bytes) network disk 107/114.

The PC 104 which acts as a print server manages printing on a printer, such as the locally connected printer 105, a locally connected printer 116, or a remote printer 102.

Similarly, a P server 115 which acts as a scanner server manages scanners, such as a locally connected scanner 117 or a remote scanner 110.

The scanner 110 is connected to the LAN 100 through components such as a network board. A copier 118 provides functions such as printer and scanner functions under the control of an image processing unit 119.

In the network shown in FIG. 1, network software, such as Novell and UNIX, is used in order to facilitate efficient communication between various network members. For example, NetWare from Novell (NetWare is a registered trademark of Novell. This notation will be omitted hereinafter.) is used. The details of this software package are described in an online documentation included with a NetWare package (provided by Novell with the NetWare package); therefore, the description is not provided herein.

Each of the PC 103 and PC 104 can generate data files, send the generated data files to the LAN 100, receive files from the LAN 100, and display and/or process these files.

In FIG. 1, personal computers (PCs) are shown. However, the PCs may be any other computer devices suitable for executing network software. For example, if UNIX software is used, UNIX workstations may be connected to the network, and the workstations may be used with the PCs shown in the FIG. 1.

Typically, the LAN 100 provides services to a user group which is in a relatively limited area, for example, on a single floor or a series of floors in a building. On the other hand, if users are in different buildings or different prefectures, a wide area network (WAN) may be constructed as the users separate. Essentially, the WAN is a collection of LANs and constructed by connecting the LANs through a high-speed digital line, such as an Integrated Services Digital Network (ISDN). For example, a WAN is constructed by connecting the LAN 100 and LAN 120 through a backbone 140, as shown in FIG. 1. The devices connected to the LAN 100, LAN 120, and LAN 130 can access the functionality of the other devices connected to the other LANs through the WAN connection.

<Data Processing Apparatus>

Figure 2:
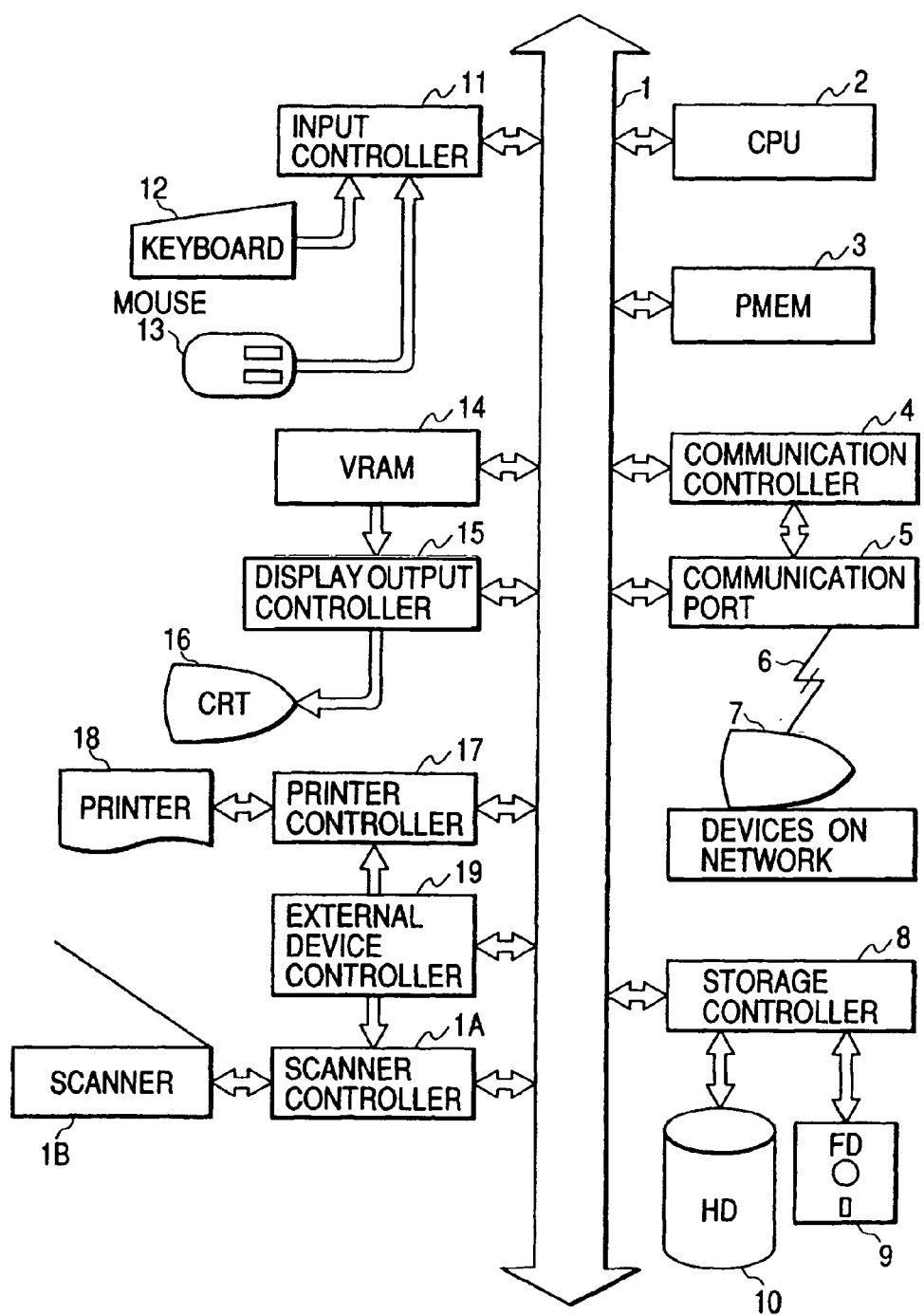
FIG. 2 shows a block diagram for describing a configuration of the data processing apparatus according to the present invention.

FIG. 2 shows a block diagram of a configuration of the data processing apparatus according to the present invention. The data processing apparatus shown in FIG. 2 can communicate with peripheral devices (including a printer, scanner, modem, and a complex image processing device) through a communication medium (not shown), for example, a LAN such as Ethernet, by using a predetermined communication protocol.

In FIG. 2, reference numeral 1 denotes a system bus. Various components, which will be described below, are connected to the system bus 1. Reference numeral 2 denotes a Central Processing Unit (CPU).

Reference numeral 3 denotes a program memory (hereinafter referred to as "PMEM"). A program for processing according to the present invention is read from a hard disk 10 appropriately, loaded into the PMEM 3, and executed by the CPU 2. Data input from a keyboard 12 is stored in the PMEM 3 as coded information.

Reference numeral 4 denotes a communication controller, which controls input/output data at a communication port 5. A signal output from the communication port 5 is provided to the communication port of another device 7 on the network through a communication line 6.

Communication between each device and a printer or an image reader (scanner) that is shared on a network is performed through this communication controller 4. The communication ports and the communication line connected to the communication unit 4 may be a public line.

Reference numeral 8 denotes a storage controller, which controls access to a data file disk, for example, a floppy disk (FD) 9 and a hard disk (HD) 10.

Reference numeral 11 denotes an input controller, to which input devices, such as a keyboard 12 and mouse 13, are connected. The operator uses the keyboard 12 to input operation commands and other information to the system. Reference numeral 16 denotes a cathode-ray tube unit (CRT). The user uses a pointing device (PD) to instruct the system to process image information on the CRT 16. The pointing device may be the mouse 13. The user uses the mouse 13 to move the cursor around the CRT 16 in X and Y directions arbitrarily. The user selects a command icon to indicate an image process to be performed, an object to be processed, and a position at which the image is to be drawn.

Reference numeral 14 denotes a video image memory (VRAM), which contains image data (bitmap data) in expanded form representing an image to be displayed on the CRT 16. The bitmap data stored in the VRAM 14 is read by a display output controller 15 appropriately to output to the CRT 16. Reference numeral 17 denotes a printer controller, which controls data output to a printer 18.

Reference numeral 1A denotes a scanner controller, which controls image reading of a connected scanner 1B. An external device controller 19 controls operations of external devices through the printer controller 17 or the scanner controller 1A.

The scanner controller 1A and the scanner 1B are mandatory for a server device which reads images. A client device, on the other hand, can use the scanner 1B of the server device through the communication controller 4 and the communication port 5 as described above.

The program stored in the ROM of the system in the present embodiment may be stored in a storage medium, such as the hard disk (HD) 10 and the floppy disk (FD) 9. Alternately, the program may be stored on another device with which the system is connected through the network. The program of the present invention can be provided to the system and devices through a storage medium such as the hard disk (HD) 10 and the floppy disk (FD) 9 or through the network.

<Digital Copier>

Figure 20:
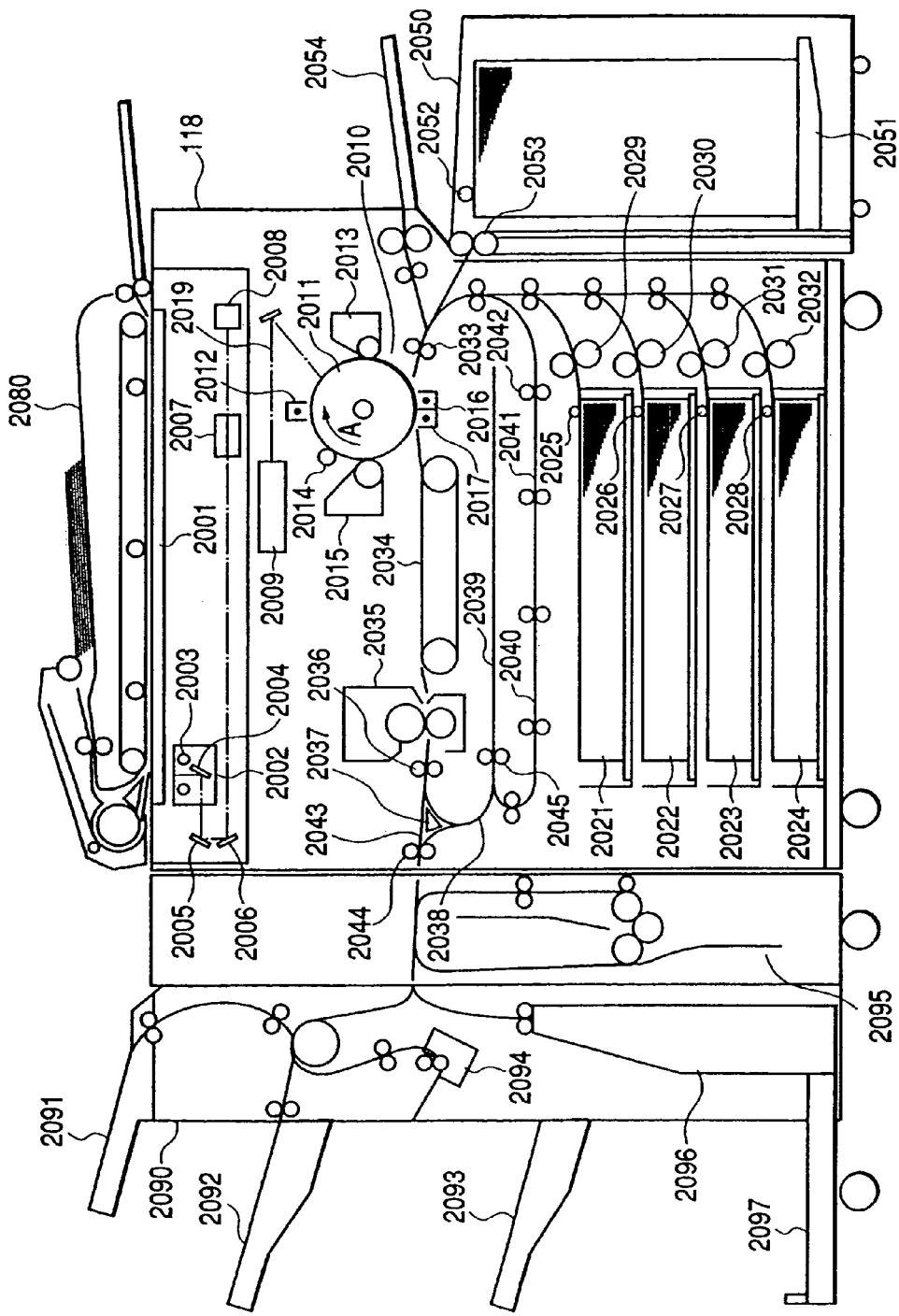
FIG. 20 shows a cross-sectional view for describing a configuration of a digital copier.

FIG. 20 shows a cross-sectional view for describing a configuration of the digital copier 118 shown in FIG. 1.

In FIG. 20, reference numeral 2080 denotes an automatic document feeder (ADF), which feeds originals to be copied one by one from a pile of originals placed on a document feeding tray to the copyboard (platen glass) 2001 of the copier 118. A scanner 2002 is shown which is comprised of a document illumination lamp 2003, a scanning mirror 2004 and other components. The scanner 2002 is driven by a motor (not shown) to and fro in a predetermined direction to scan the original and provides reflected light from the original to a scanning mirrors 2004 to 2006, then to a lens 2007 to image the light on a CCD image sensor (CCD) in an image sensor unit 2008.

The image sensor unit 2008 converts the reflected light from the original into an electric signal and applies a predetermined imaging process to the signal to generate an image signal. Reference numeral 2009 denotes an exposure controller, which is comprised of a laser generation unit, a polygonal scanner, and other components, generates laser light 2019 modulated based on the image signal generated by the image sensor unit 2008 and irradiates a photosensitive drum 2011 with the laser light.

Reference numeral 2010 denotes an image formation unit, which is comprised of the photosensitive drum 2011, a primary corona assembly 2012 placed around the photosensitive drum 2011, a developing device 2013, a transfer corona assembly 2016, a separation corona assembly 2017, a pre-exposure lamp 2014, a cleaner 2015 and other components.

In the image formation unit 2010, the photosensitive drum 2011 is driven by a motor (not shown) to rotate in the direction indicated by arrow A in FIG. 20. The primary corona assembly 2012 charges the photosensitive drum 2011 to a predetermined electric potential. The photosensitive drum 2011 charged by the primary corona assembly 2012 is irradiated with laser light 2019 generated by the exposure controller 2009 to produce an electrostatic latent image. The developing device 2013 develops the electrostatic latent image produced on the photosensitive drum 2011 to visualize the electrostatic latent image on the photosensitive drum 2011 as a toner image.

Reference numeral 2021 denotes a first cassette, 2022 a second cassette, 2023 a third cassette, and 2024 a fourth cassette, which contain transfer paper as recording media. The transfer paper contained in the first cassette 2021, second cassette 2022, third cassette 2023, or fourth cassette 2024 is picked up by pickup rollers 2025, 2026, 2027, 2028, fed by paper feeding roller, 2029, 2030, 2031, 2032 to the copier 118, and carried to the image formation unit 2010 by a resist roller 2033.

The transfer corona assembly 2016 transfers the visualized toner image on the photosensitive drum 2011 to the transfer paper carried into the image formation unit 2010. The cleaner 2015 cleans off any residual toner on the photosensitive drum 2011 after the toner image is transferred to the transfer paper. The pre-exposure lamp 2014 erases residual charges on the photosensitive drum 2011 after residual toner is cleaned off by the cleaner 2015.

The separation corona assembly 2017 separates the transfer paper after the toner image is transferred from the photosensitive drum 2011. A transport belt 2034 transports the transfer paper separated from the photosensitive drum 2011 by the separation corona assembly 2017 to a fixing assembly 2035. The fixing assembly 2035 applies pressure to and heats the transfer paper to fix the toner image onto the transfer paper. An eject roller 2036 ejects the transfer paper after the toner image is fixed by the fixing assembly 2035 to the outside of the copier 118.

A paper eject flapper 2037 switches the transport path of the transfer paper between a transport path 2038 and an eject path 2043. A lower transport path 2040 guides the transfer paper transported by the paper eject roller 2036 and the reversing roller 2045 and is reversed through reversing path 2039 to a paper re-feeding path 2041.

A paper re-feeding roller 2042 re-feeds the transfer paper guided to the paper re-feeding path 2041 to the image formation unit 2010. When the transport path is switched to the eject path 2043 by the paper eject flapper 2037, the transfer paper is provided to an eject roller 2044 placed in the proximity of the paper eject flapper 2037, then the eject roller 2044 ejects the transfer paper to the outside of the copier.

When double-sided recording (double-sided copying) is performed in the copier 118, the paper eject flapper 2037 is raised, and copied transfer paper is guided through the transport path 2038, the reversing path 2039, and the lower transport path 2040 to the paper re-feeding path 2041. During this process, the transfer paper is pulled into the reversing path 2039 to the position at which the back end of the transfer paper is entirely forced out from the transport path 2038 by the reversing roller 2045 and the transfer paper is pinched by the reversing roller 2045, then the transfer paper is provided to the lower transport path 2040 by reversing the rotation direction of the reversing roller 2045.

When the transfer paper is reversed and ejected from the copier 118, the paper eject flapper 2037 is raised and the transfer paper is pulled into the reversing path 2039 to the position at which the back end of the transfer paper remains in the transport path 2038, then the rotation direction of reversing roller 2045 is reversed to reverse the transfer paper and provide it to the eject roller 2044.

A sorter 2090 sorts a plurality of sheets of transfer paper ejected from the copier 118 and staples them. It loads and aligns the sheets of paper ejected one after another in a handling tray 2094. After a batch of image formation is completed, the batch (pile) of transfer paper is stapled by a stapler (not shown) within the handling tray 2094 and ejected to a paper receiving tray 2092 or 2093 in a bundle. The paper receiving trays 2092, 2093 are controlled to move up and down by a motor (not shown) and placed at a position of the handling tray 2094 before image processing operation starts.

A separation paper tray 2091 is loaded with separation paper to be inserted between sheets of transfer paper. A Z-folder 2095 z-folds ejected transfer paper. A bookbinder 2096 puts together a volume of ejected transfer paper, folds the paper along the center line, and staples to bind the volume of paper. The bound pile of paper is ejected to a receiving tray 2097.

The copier 118 includes a paper deck 2050 which can contain, for example, 4000 sheets of transfer paper. The lifter 2051 of the paper deck 2050 rises according to the quantity of the transfer paper so that the transfer paper abuts against a pickup roller 2052 at all times. The transfer paper is fed into the copier 118 by a paper feeding roller 2053. The copier 118 further includes a manual multiple paper feeder 2054 which can contain 100 sheets of transfer paper.

The developing device 2013 may be of the type in which toner is re-supplied by replacing a toner cassette or the type in which toner is re-supplied directly into the developing device 2013. The developing device 2013 can detect the amount of toner remained in the developing device 2013.

While a configuration of the monochrome copier has been described as an example of an image output device of the present invention, the device may be a color copier.

In such a case, the developing device 2013 would be comprised of four developing parts for yellow (Y), magenta (M), cyan (C), and black (Bk). The developing device 2013 can detect the quantity of the four colors (yellow (Y), magenta (M), cyan (C), and black (Bk)) of toner individually.

The copier 118 can detect the quantity of transfer paper contained in each of the first, second, third, and fourth cassettes and the paper deck 2050. The sorter 2090 can detect the quantity of staples contained in the handling tray 2094 for a pile of transfer paper. The sorter 2090, Z-folder 2095, and paper deck 2050 are optional and detachably attached to the copier 118.

Figure 21:
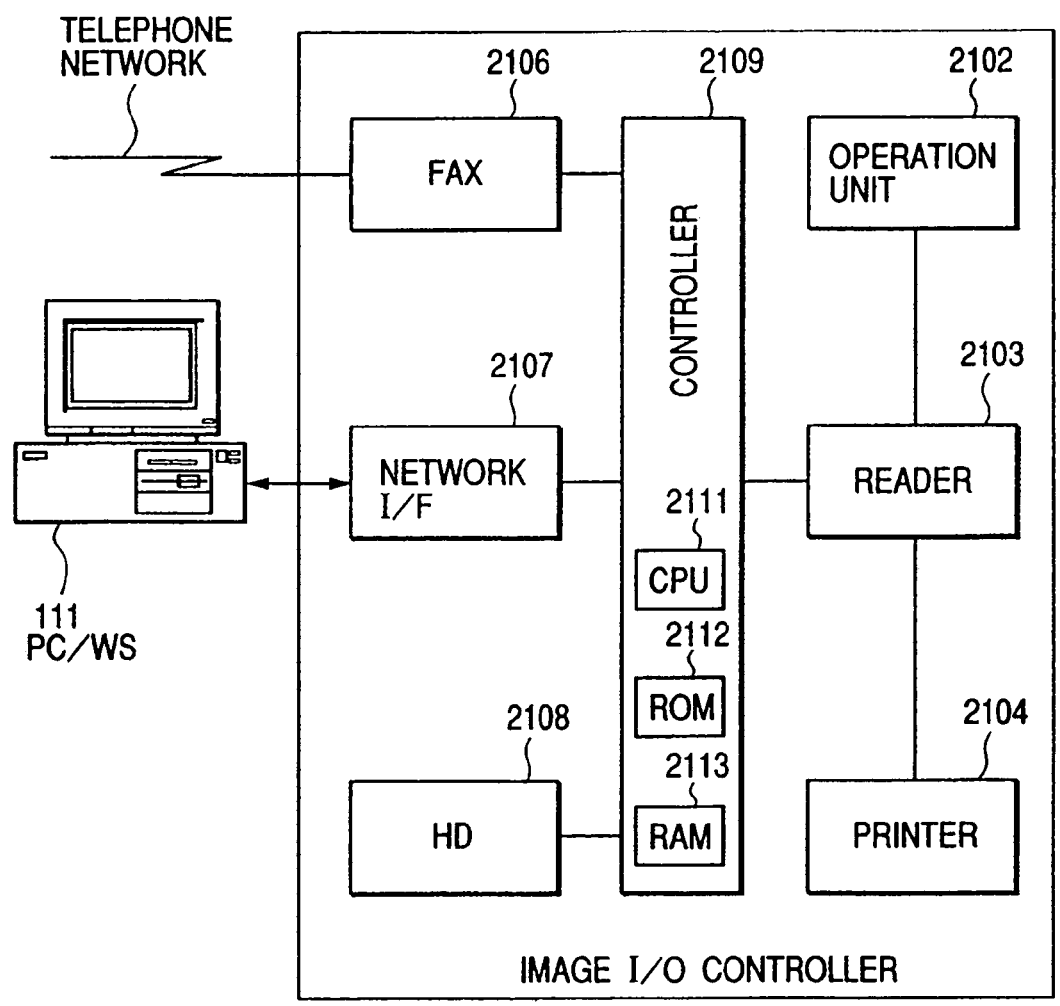
FIG. 21 shows a block diagram for describing a control configuration of the copier.

FIG. 21 shows a block diagram of a control configuration of the copier 118 shown in FIG. 20. In FIG. 21, like numbers are applied to the same elements as in the elements in FIG. 20.

In FIG. 21, an operation unit 2102 is used to input setting values and instructions for various operations of the digital copier 118. A reader 2103 consists of the components 2001 to 2008 shown in FIG. 20. The reader 2103 reads an original image and outputs image data according to the original image to a printer 2104 and a controller 2109. The printer 2104 consists of the components 2009 to 2045 shown in FIG. 20. The printer 2104 outputs an image to a recording medium according to the image data from the reader 2103 and the controller 2109.

The controller 2109 is connected to the reader 2103, a FAX 2106, a network interface 2107, and a hard disk unit 2108 and controls the entire copier 118.

The FAX 2106 decompresses compressed image data received over a telephone line and transfers the decompressed image data to the controller 2109. The FAX 2106 also compresses image data transferred from the controller 2109 and sends the compressed image data onto the telephone line. The compressed data received from the FAX 2106 can be temporarily stored in the hard disk unit 2108.

The network interface 2107 interfaces between the LAN 130 and the controller 2109. It converts coded data (Page Description Language (PDL) data) provided through the LAN 130 into image data in expanded form that can be recorded in the printer 2104 and provides the data to the controller 2109.

The controller 2109 consists of a CPU 2111, a ROM 2112, a RAM 2113, and other components and controls the data flow between the reader 2103, the FAX 2106, the network interface 2107, and the hard disk unit 2108 based on data stored in the ROM 2112 or data received from the other parts of the copier 118.

The hard disk unit 2108 includes a hard disk (HD) and page memory (which are not shown) and can store a plurality of image data. The plurality of image data stored in the hard disk unit 2108 can be output in a sequence according to an edit mode specified in the operation unit 2102 of the digital copier 118.

The controller 2109 can notify devices on the LAN 130, or on the WAN consisting of the LAN 130, LAN 100, AND LAN 120, shown in FIG. 1 through the network interface 2107, of the remaining quantity of toner, transfer paper of each size, and staples, the conditions of the copier (for example, door open, paper jam), and whether the optional devices (sorter 2090, Z folder 2095, and paper deck 2050 shown in FIG. 3) are attached to the copier or not.

<Device Map>

Figure 3:
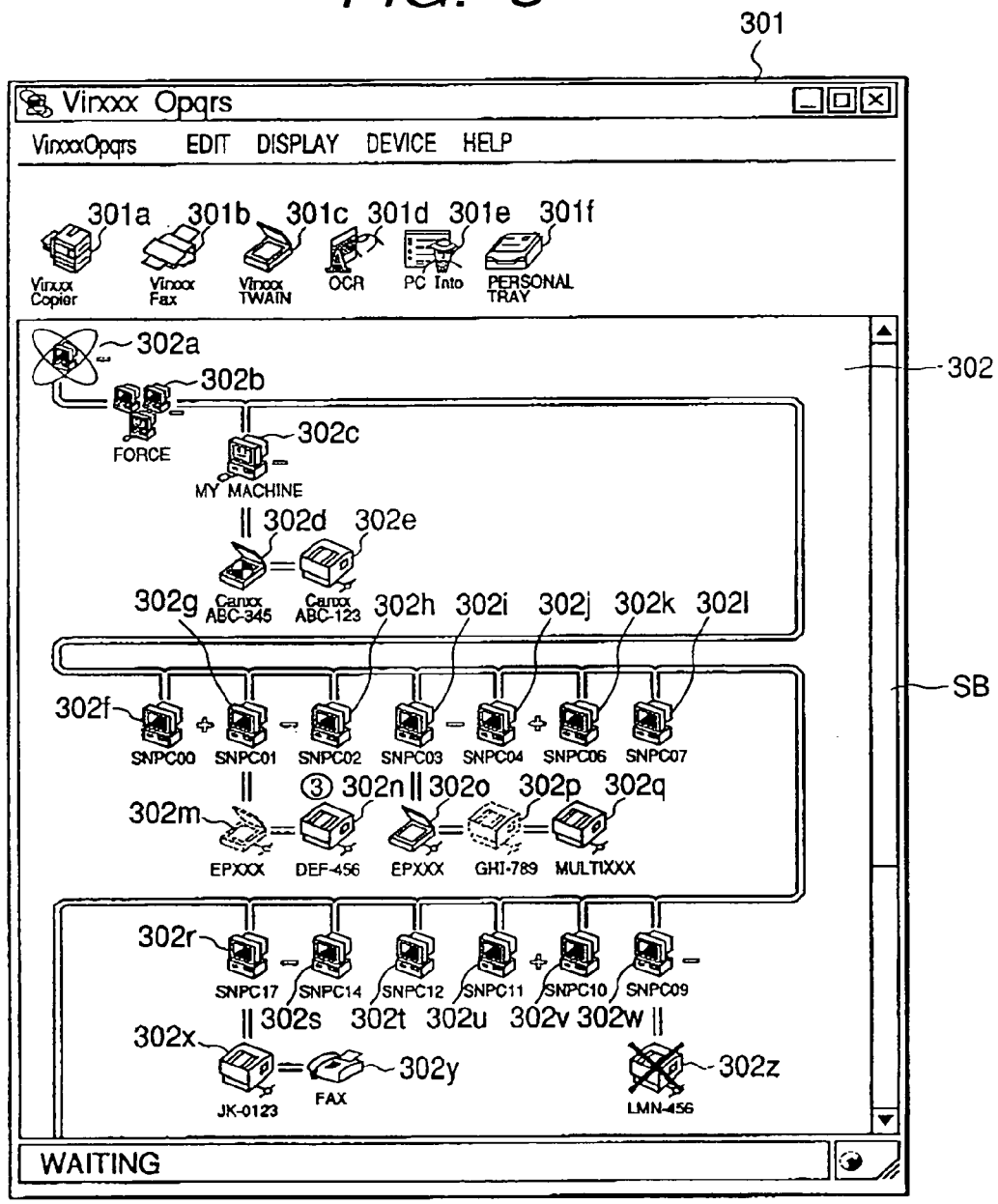
FIG. 3 shows a diagram for describing a device map displayed on a CRT.

FIG. 3 shows a window displayed on the CRT 16 shown in FIG. 2 for indicating devices connected to the network (a device map).

Shown in FIG. 3 is a main window 301 having a menu, a scroll bar (SB), a system display window 302, icons representing PCs and peripheral devices 302*a* to 302*z*, and icons representing functions provided by the PCs and peripherals 301*a* to 301*f* displayed on a tool bar.

For example, icon 301*a* provides for executing a copy function for reading image data through a selected scanner and outputting the image data on a selected printer. Icon 301*b* provides for a FAX function. Icon 301*c* provides for a scanner function for reading image data. Icon 301d provides for an OCR function for reading image data and performing OCR processes. Icon 301e provides for a function for displaying information about the PCs. Icon 301f provides for displaying personal tray data.

Icons 302a to 302z on the system display window 302 represent the PCs and peripheral devices connected to the network and shared among the devices on the network shown in FIG. 1. These icons are displayed differently depending on the types of devices, such as a PC, printer, scanner, FAX modem, or the state of the device, such as "in process" and "error" conditions.

Icon 302a is a root icon, icon 302b represents a domain to which the own machine (the machine on which this window is displayed or the machine used by the user viewing this window) belongs, and icon 302c represents the own machine. Because the own machine is dedicated to the user, it is displayed in distinction from the other PCs.

Icons for PCs and peripheral devices which are shared among the devices on the network (but no drivers for such PCs and peripheral devices are installed in the own machine) are grayed (the icons are displayed in grayish color) like icons 302m and 302p.

Icon 302d indicates that the scanner is currently scanning an image. Icon 302n indicates that a job is spooled for the printer and the numeric value of "3" indicates that three jobs are spooled.

Icon 302z indicates that a driver for the printer is installed but the printer cannot be used for some reason.

Thus, the user can identify the connection state and the operation status of all the PCs and peripheral devices on the network on this screen. In this example, not all the icons are shown because they cannot be displayed on the screen at once. The user can move the scroll bar SB located on one side of the screen to see all the PCs and peripheral devices.

<Combination Determination Data>

Figures 5, 6:
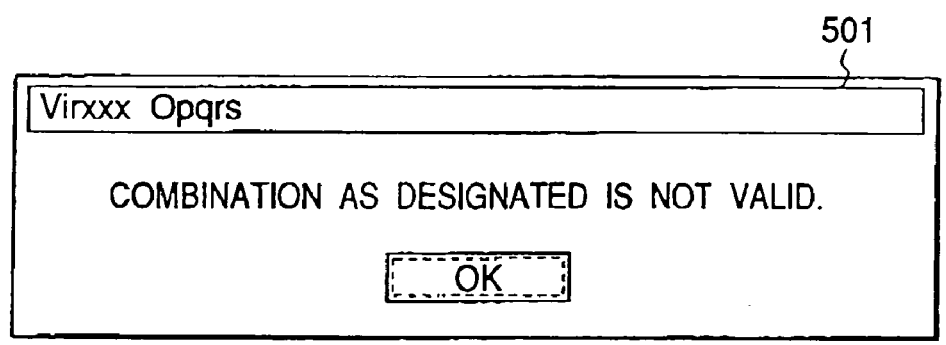
FIG. 5 shows an example of an error message displayed on the CRT.
FIG. 6 shows an example of combination determination data stored in the data processing apparatus.

FIG. 6 shows an example of a table of combination determination data stored in the data processing apparatus shown in FIG. 2. The table is stored, for example, on the hard disk 10. In FIG. 6, reference numerals 601 and 602 denote header parts. The header part 601 indicates the number of registered functions and the header part 602 indicates a comment.

Reference numerals 603 and 604 denote data for one function, respectively. Reference numeral 603a denotes data for a first device and 603b represents data for a second device. In FIG. 6, the first device data represents a scanner and the second device data represents a printer. This combination is valid even if the order is inverted. The function data 603c indicates a function (in FIG. 6, a copy function) executed by using the devices indicated by the first and second device data. Data 603d is a comment about this function. The table shown in FIG. 6 is configured such that N functions are registered. Data 604 is data concerning the Nth function.

<Copy Function Setup Screen>

Figure 4:
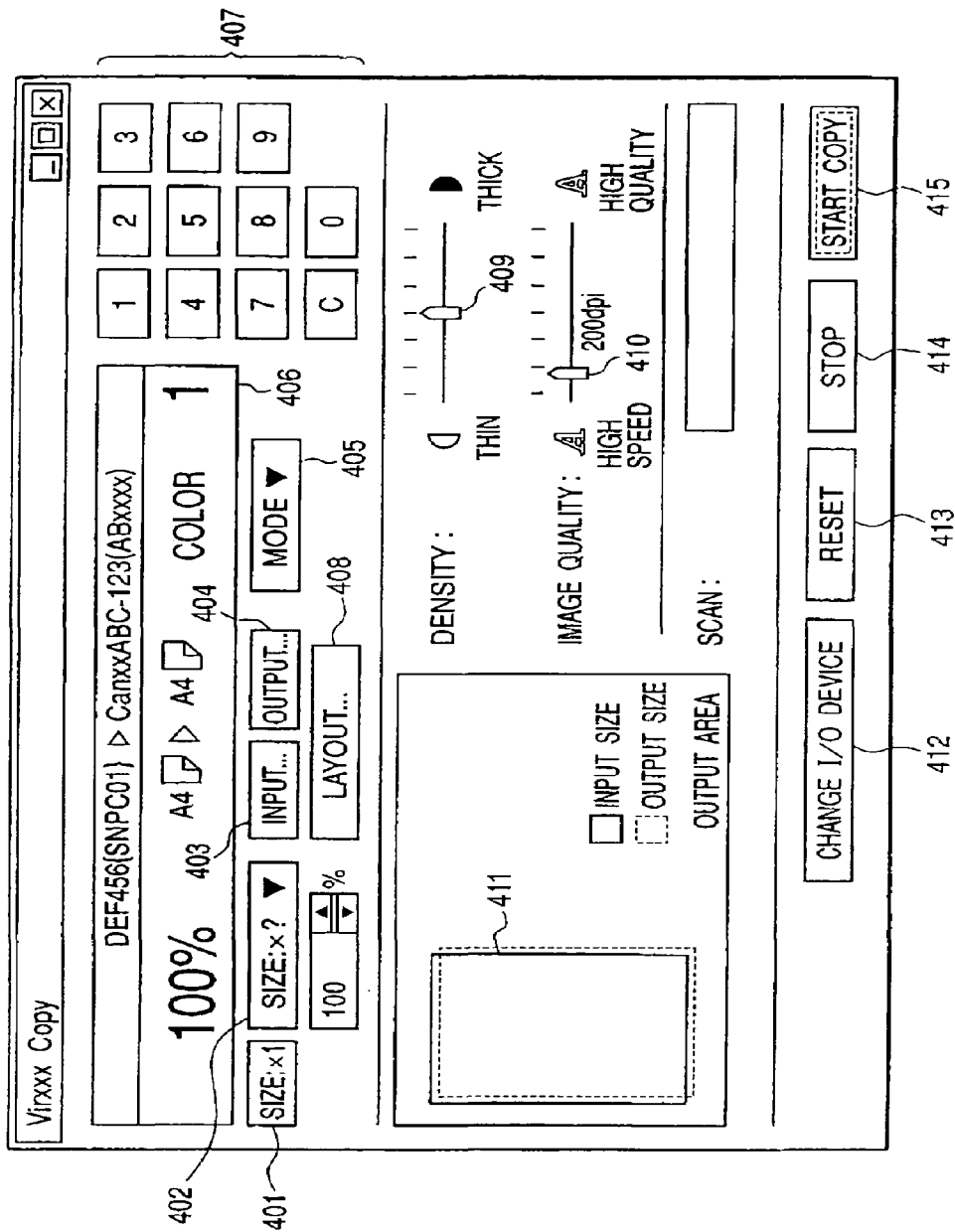
FIG. 4 shows an example of a copy function setup screen displayed on the CRT.

FIG. 4 shows an example of a copy function setup screen displayed on the CRT 16. When the user drags and drops an icon (that is, the user drags an icon and drops it on another icon) shown in FIG. 3, whether the combination of the two icons is valid or not is determined. If it is determined to be valid, the setup screen shown in FIG. 4 appears.

In FIG. 4, scale factor setting buttons 401, 402 are shown. When a scale factor of 100% is desired, the button 401 is pressed down by the user. When an enlarged/reduced output is desired, the button 402 is pressed down to specify a desired scale factor.

Button 403 is for input paper settings and button 404 is for output paper settings. The user presses the buttons 403, 404 to select a desired size and orientation of paper. Button 405 is for color mode settings of the input image. Color/monochrome/gray-scale and other modes can be set.

Also shown is an indicator area 406 for displaying the current settings. In the indicator area 406, settings for the function selected by combining icons are displayed. In this example, the indicator area indicates that the copy function, a scale factor of "100%," vertical input paper of "A4" size, vertical output paper of "A4" size, and color mode are set.

Also shown is a ten-key button 407 for setting the number of output copies by the user. Button 408 is a layout adjustment setting button. The user presses the button 408 to specify output position, "2 pages in one sheet" output, and other settings.

A slider 409 allows for setting a desired density by using the mouse 13. A slider 410 allows for setting a desired image quality by using the mouse 13.

An input size, output size, and effective output area is displayed in a preview area 411. Button 412 allows for changing input/output devices. When the user presses this button 412, a dialog box is created for setting input/output devices different from the input/output devices set by the combination of icons. The user can select a new input/output device from the dialog box. A button 413 allows the setting of the copy function to be reset. A stop button 414 and a copy start button 415 are also shown.

<Error Messages>

FIG. 5 shows an example of an error message 501 displayed on the CRT 16. This error message will be displayed if the combination of icons specified by the user on the screen shown in FIG. 3 is not valid. The determination is based on the combination determination data stored in the apparatus.

In the present embodiment, whether a combination is valid or not is determined at the point where the drag-and-drop operation is completed, and if not valid, the error message is displayed. However, the determination may be made after the user performs a drag operation and before a drop operation, and if not valid, the drop operation may be inhibited.

<First Data Processing>

Figure 7:
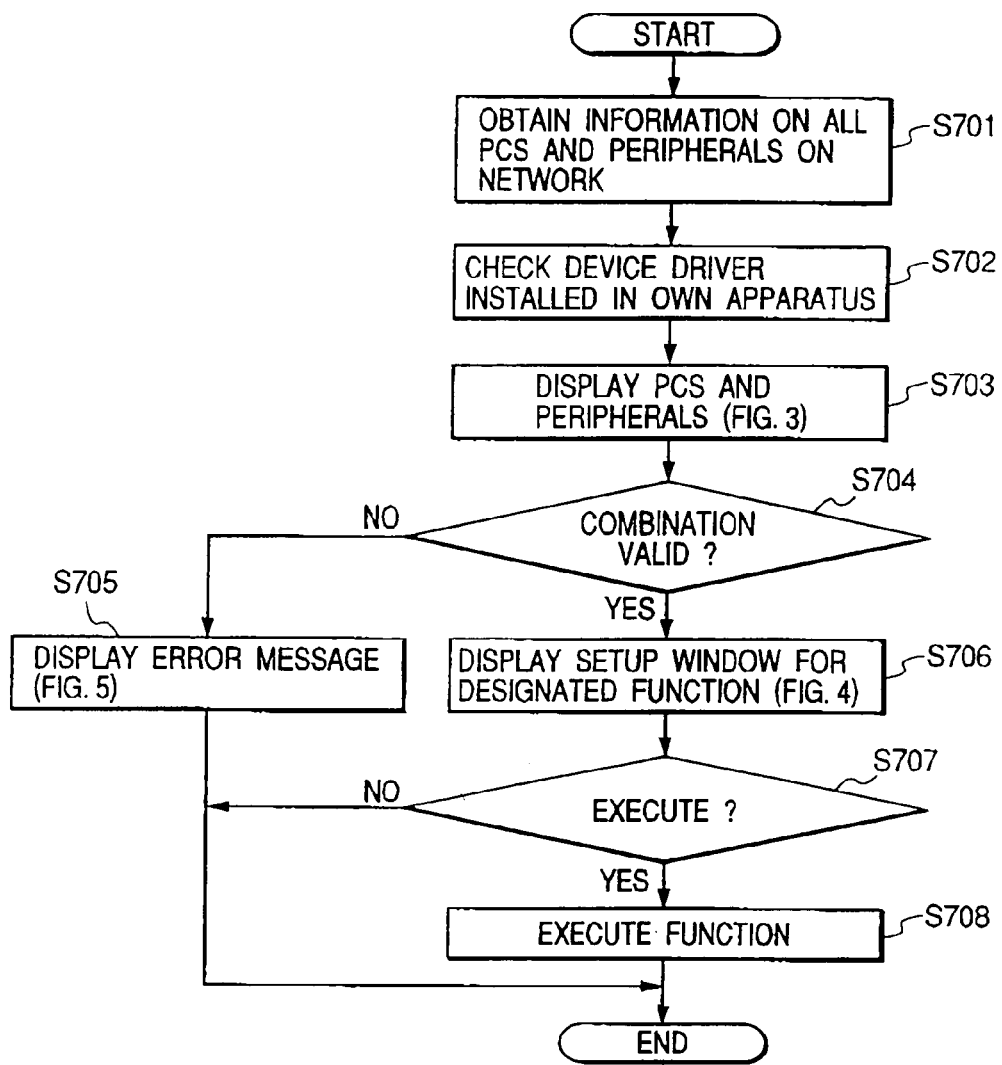
FIG. 7 is a flowchart describing an example of a first data processing procedure in the data processing apparatus according to the present invention.

FIG. 7 is a flowchart showing an example of a first data processing in the data processing apparatus according to the present invention. S701 to S708 indicate process steps.

At step S701, connection information about all the PCs and peripheral devices on the network, their usage conditions, and their status information are obtained. This information is stored in the PMEM 3 shown in FIG. 2. Then, device drivers installed in the data processing apparatus are checked at step S702. Then, at step S703, the window shown in FIG. 3 is displayed based on the information obtained.

Then, at step S704, whether the function specified by the user is valid or not is determined. For example, if the user drags and drops the icon 302d of a scanner on the icon 302n of a printer and specifies the copy function, it is determined whether the combination the scanner represented by the icon 302d and the printer represented by the icon 302n is valid or not.

If it is determined to be an invalid combination, the process proceeds to step S705 and an error message as shown in FIG. 5 is displayed. On the other hand, if it is determined to be a valid combination at step S704, the process proceeds to step S706 and a window for the specified function is displayed. In the example described above, the copy function setup screen shown in FIG. 4 is displayed.

Then, at step S707, whether the copy is executed or not is determined. If a copy abort command is issued, the process will end. If the button 415 is pressed to issue a copy execution command, the process proceeds to step S708 and the copy process is performed according to the data specified in FIG. 4.

While in the embodiment described above, the user drags and drops a device icon to specify a function each time, the data processing apparatus may store data for commonly used combined functions (the combinations of devices for implementing those functions) so that the user can specify a combined function in one operation.

<Input/Output Setup Window>

Figure 8:
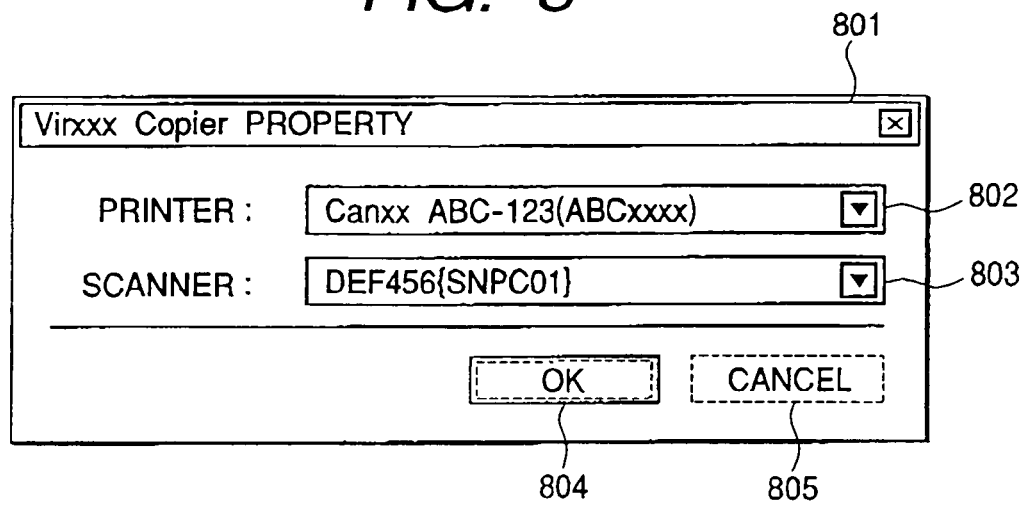
FIG. 8 shows an example of a screen displayed on the CRT for confirming input/output devices.

FIG. 8 shows an example of an input/output setup window displayed on the CRT 16. Shown in FIG. 8 is a main dialog window 801. A field 802 for printer name entry and a field 803 for scanner name entry are shown. The name of a digital camera can also be entered in the scanner name field 803 and the name of a plotter can be entered in the printer name field 802. A cancel button 805 allows for canceling the settings.

If OK button 804 is pressed at this point, the combination of the input and output devices entered in the fields 802 and 803 is stored. When the icon 301a (corresponding to the copy function) shown in FIG. 3 is selected with a cursor operation, the input/output setup window for executing the copy function using the input and output devices is displayed. In its initial state, this input/output setup window contains the first scanner is that found as the input device and a printer which is usually used as the output device. When the user places the cursor on the icon 301a and clicks the right mouse button once, the input/output setup window shown in FIG. 8 is displayed. In this window, the user can change the setting of the input/output devices.

In addition, a function can be set by dragging and dropping a device icon on a function icon using the mouse. For example, the input device for the copy function can be changed by dragging and dropping the scanner icon 302o on the icon 301a. If a device icon which cannot be specified is selected by this operation, the shape of the cursor changes and the drop operation is disabled.

Figure 9:
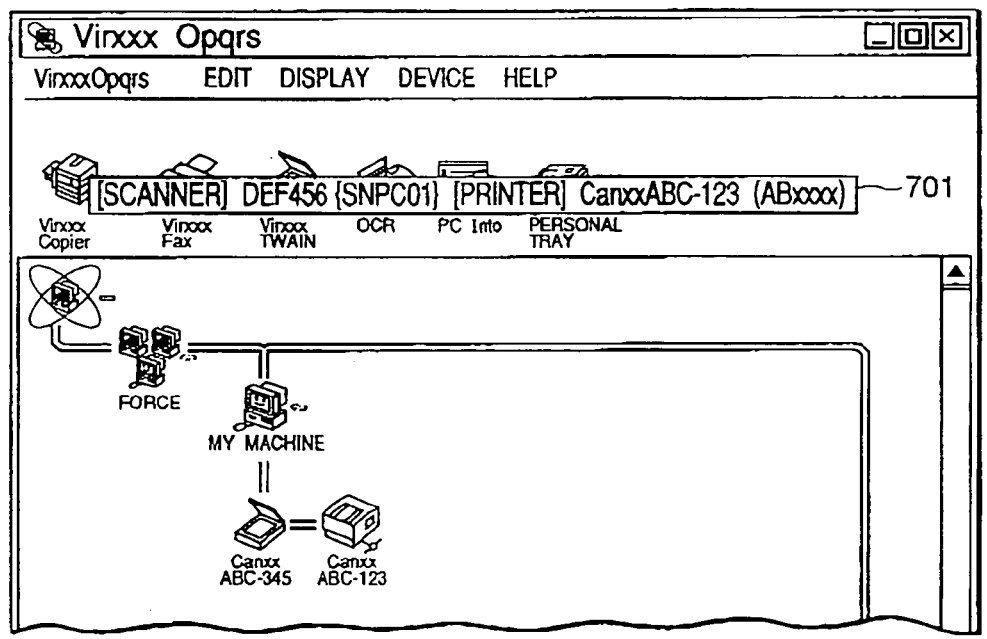
FIG. 9 shows an example of a display screen on the data processing apparatus according to the present invention.

FIG. 9 shows an example of an input/output device confirmation panel displayed on the CRT 16. Shown in FIG. 9 is a tool tip 701 for displaying settings for each function. Thus, the user can confirm the settings in the input/output setup window in FIG. 8 or in the tool tip 701.

In the embodiment described above, whether a function can be executed or not is determined when the user drags and drops the device icon. However, it would be user friendly if, when the user drags a device icon, only the device icons that can be combined with that device icon were displayed. Such an embodiment will be described below.

<Second Data Processing>

Figure 10:
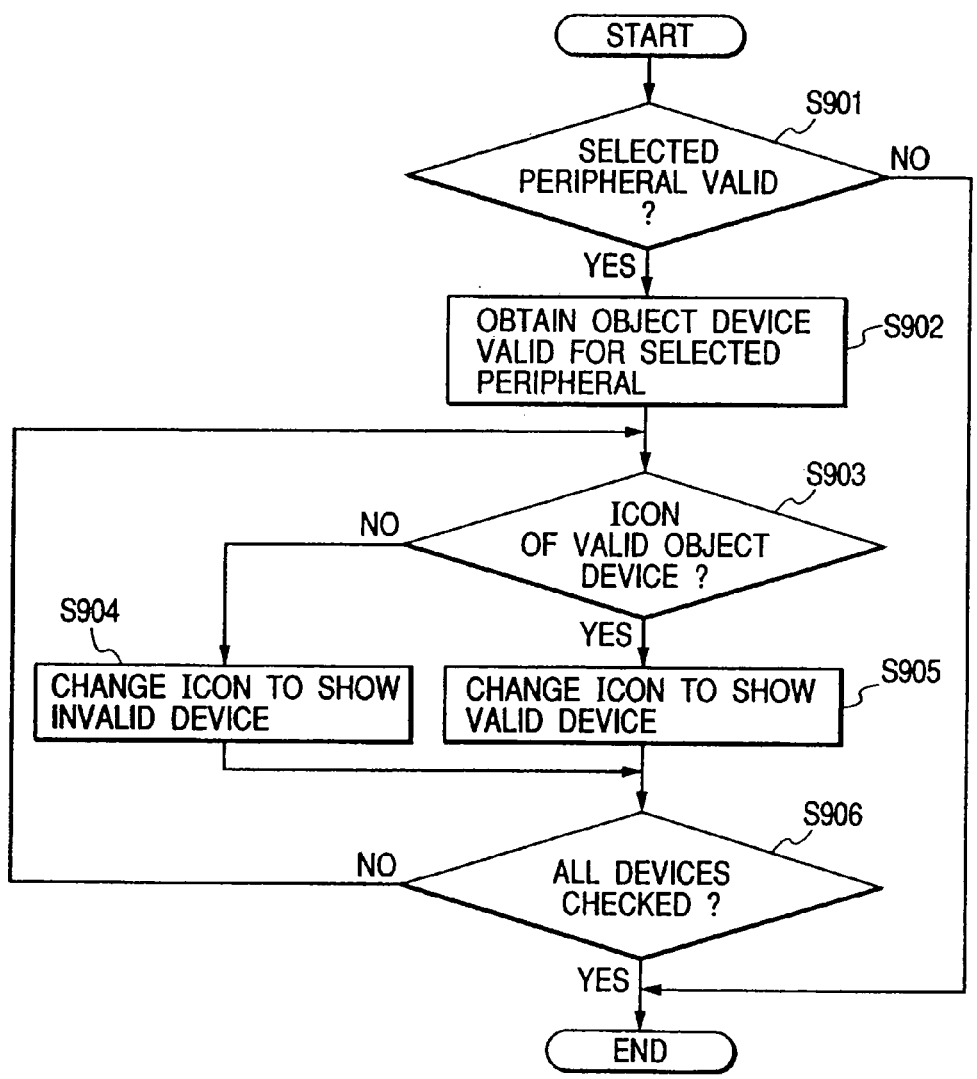
FIG. 10 is a flowchart describing an example of a second data processing procedure in the data processing apparatus of the present invention.

FIG. 10 is a flowchart showing an example of a second data processing in the data processing apparatus according to the present invention. S901 to S906 represent process steps.

First, at step S901, whether a selected peripheral is valid for a device for executing a compound function is determined. For example, the printer icon 302e is valid for the copy function, whereas "My Machine" (represented by icon 302c) is not valid for the compound function. The determination is made based on the table shown in FIG. 6. In the table shown in FIG. 6, data concerning which compound function is performed by which combination of devices is stored.

If the determination at step S901 is "NO", the process ends. If "YES", the process proceeds to step S902. At step S902, a device which is valid for combination with the selected device is obtained. For example, if the printer icon 302e is selected, a scanner or a FAX modem is a valid device to be combined with the printer.

Then, at step S903, whether the displayed icon indicates a valid object device or not is determined. If not, the icon is changed to show the invalidity at step S904. For example, the icon is grayed to disable any drop operation on the icon.

On the other hand, if it is determined that the icon indicates a valid device at step S903, the process proceeds to step S905 and displays the icon in such a way that it indicates a valid device to be selected. For example, the icon is displayed normally to enable the user to apply a drop operation to that icon.

Then, at step S906, whether all the icons (devices indicated by the icons) have been checked or not is determined. If not, the process returns to step S903 to continue the process. If "YES", the process is completed.

In the embodiment described above, when the user drags the printer icon and drops it on the scanner icon, the copy function is started. In the copy function setup screen (FIG. 4) then displayed, the user can set only general settings.

However, some input/output devices selected provide special functions. Therefore, it would be more convenient for the user if a list of devices having special functions is stored and whether a selected device is on the list or not is determined. Such an embodiment will be described below.

<Special Functions>

FIG. 11 shows a table of resource information stored in storage (for example, the hard disk 10) of the data processing apparatus shown in FIG. 2. The table lists devices having special functions.

In FIG. 11, a header part 1101 contains the number of devices registered. A header part 1102 contains a comment.

Reference numerals 1103 and 1104 each denote data on one device. Data entry 1103a stores the property of the device, for example the type of the device, such as a printer or scanner. Data entry 1103b contains a driver name. To determine whether a selected device is on this device list or not, the data entries 1103a and 1103b are referenced.

The data entry 1103c contains a special combined function provided by the device. If a device specified by drag-and-drop operation matches all of the data entries 1103a to 1103c, the execution module indicated by the data entry 1103d is executed instead of its normal combined function. The execution module contained in data entry 1103d is a module for implementing the special combined function contained in the data entry 1103c. The table shown in FIG. 11 is constructed such that N devices are registered and entry 1104 contains data on the Nth device.

Figure 12:
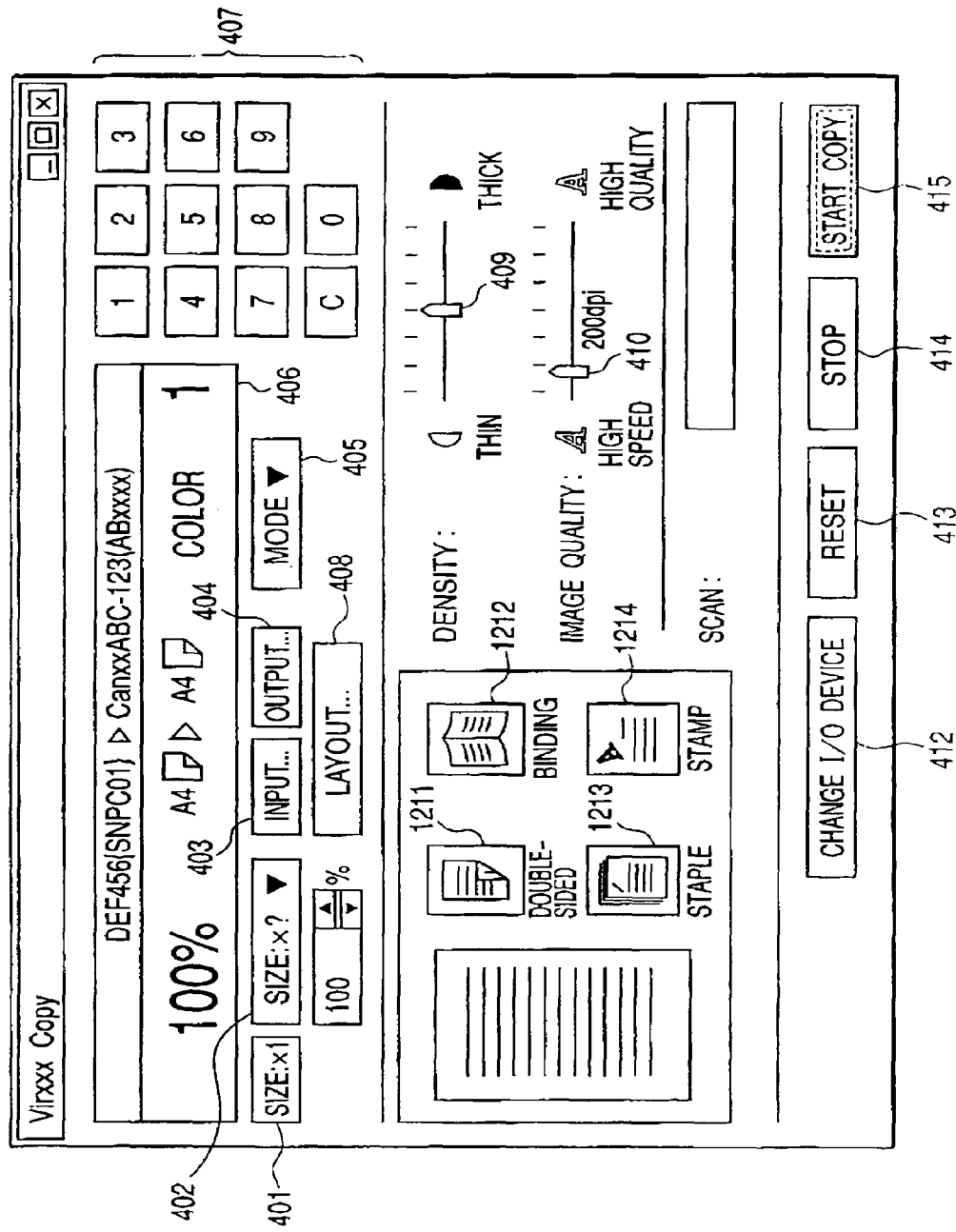
FIG. 12 shows an example of a copy function setup screen displayed on the CRT.

FIG. 12 shows an example of a copy function setup screen displayed on the CRT 16. This setup screen is displayed on the CRT 16 when the user applies drag-and-drop operation to icons shown in FIG. 3 and the combination of the icons is determined to be valid. The screen shown in FIG. 12 is different from the screen in FIG. 5 in that the screen in FIG. 12 is displayed when the copy function is executed by a printer having a special function.

Shown in FIG. 12 are function buttons 1211 to 1214. Button 1211 is for setting double-sided printing. Button

1212 is for bookbinding printing. Button 1213 is for setting stapling. Button 1214 is for stamping. The user can use extended functions (special functions) provided by the printer by pressing these buttons 1211 to 1214.

In the embodiment described above, the user cannot visually see that the copy function is executed, after the user drags the printer icon and drops it on the scanner icon. The display format of devices which is actually used and the network line connecting them may be changed so as to visually indicate the process operation. Such an embodiment will be described below.

<Screen During Execution of Function>

Figure 13:
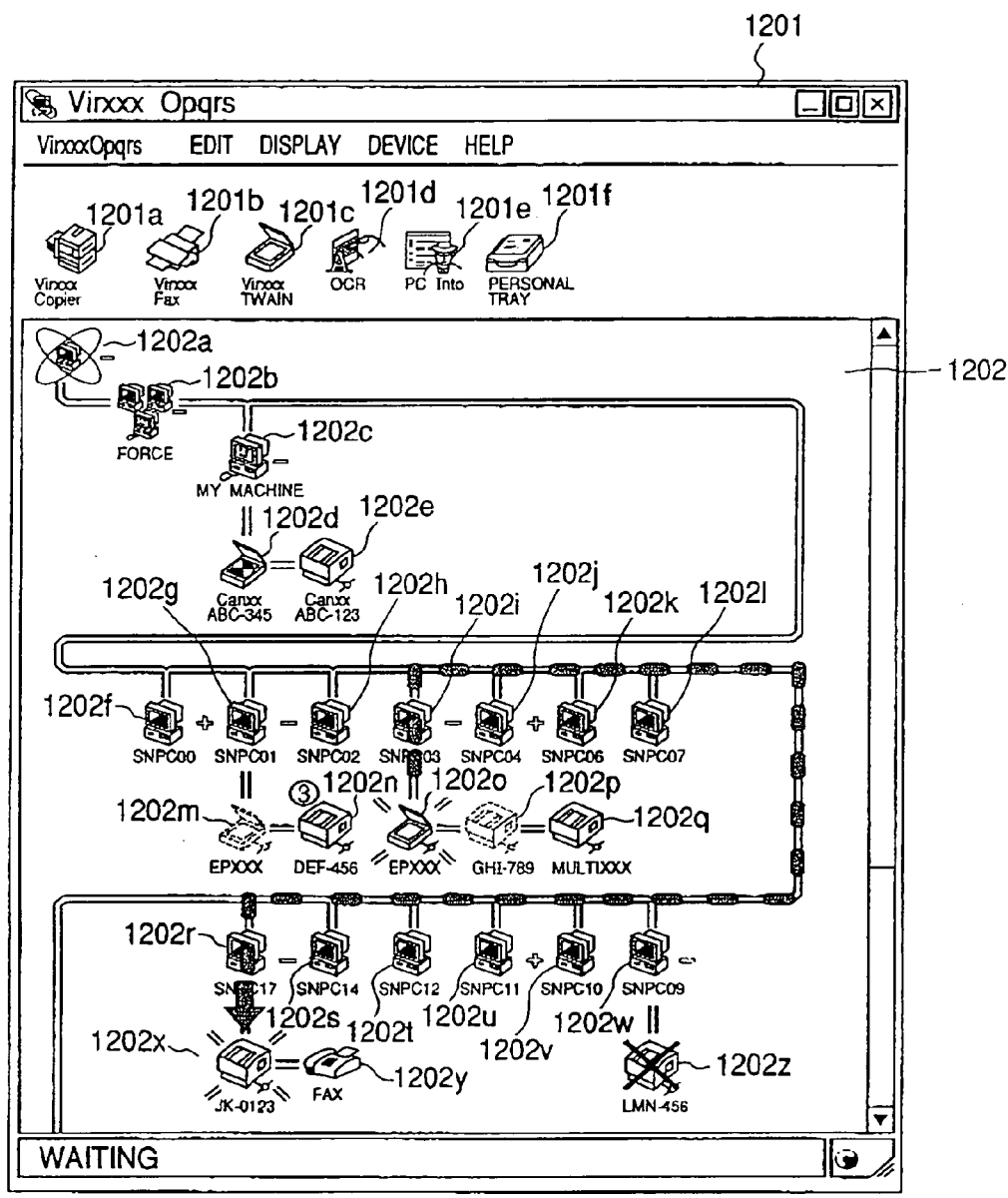
FIG. 13 shows an example of a screen displayed during the execution of a copy function in the data processing apparatus according to the present invention.

FIG. 13 shows an example of a screen displayed 1201 during the execution of the copy function. The appearance of icons 1202*o* and 1202*x* is changed and a path (heavy dashed line) is displayed to show that data is transferred from a scanner indicated by icon 1202*a* to a printer indicated by icon 1202*o* to execute the copy function. That is, which input/output devices are executing the function can be visually seen.

<Multifunctional Device>

In the embodiment described above, when a PC (data processing apparatus) is turned on, the PC communicates with devices on the network to obtain information about the devices and their device driver information to graphically and virtually display the connection information on and operation status of the devices with icons having a uniform appearance corresponding to each device type. However, the devices connected to the network may be not only printers or scanners, but also multifunctional devices having both the printer function and scanner function, or the combination of these functions and other functions (including facsimile and database functions). Such an embodiment will be described below.

FIG. 15 shows an example of device driver information managed in the data processing apparatus. For example, when the PC (data processing apparatus) is turned on, when the PC is initialized, or when an icon is depressed as will be described below, the PC obtains information about the device driver for a complex device (multifunctional device), for example, the digital copier 118 shown in FIG. 1, connected to the network from a device (for example another PC or the digital copier 118) and stores it in the PMEM 3 or the hard disk 10. If a management server which manages the device driver information is connected to the network, the information may be obtained from that server.

In FIG. 15, the header part 1501 contains a driver name, version information, and a comment. Reference numeral 1502 denotes a "page setup" information, in which information about page setup (original size, paper size, print direction, page layout, magnification, and stamp) is stored. The "original size" and "output paper size" may be, for example, A4, A3, and B4. The "print direction" may be vertical or horizontal. The "page layout" may be, for example, an option for outputting one page in one sheet, or two pages in one sheet. The "magnification" (scale factor) may be, for example, 100%, 141%. The stamp may be "Top Secret" or "Confidential".

Reference numeral 1503 denotes "Finishing" information, in which information about a printing method, binding direction, and ejection method is stored. The printing method may be normal, binding, double-sided, and OHP (printing on transparencies for Over Head Projector) printing. The binding direction may be vertical or horizontal. The Ejection method may be sorting, grouping, and rotation sorting.

Reference numeral 1504 denotes "paper feed" information, which contains paper feed setup information ("Feed Method", and "OHP Setup"). Herein, the paper feed setup information may be, "Cassette 1" or manual feeding. The detailed setup of the OHP printing includes a paper feed port upon setup of the OHP printing, the designation of insert paper, the type of paper, etc.

Reference numeral 1505 denotes "device setup" information, in which information about feed and ejection options is stored. The "Feed Option" may be paper feed option settings of the device. The ejection options may be option setting of the device.

In the foregoing embodiments, the same icon is used for the same device type. In this embodiment, respective icons having an appearance which resembles respective products from respective manufacturers are stored and displayed. Thus, the user can visually identify an icon for an equivalent model from a different manufacturer. In addition, a color support mark CM (which will be detailed below) is added to an icon for a device supporting a color output function.

The icons are displayed based on device driver information. The device driver information includes information about device mode supported by device drivers. Thus, when a new peripheral (including optional devices) is provided from a manufacturer, the user can install a device driver for that peripheral and use it immediately.

<Second Device Map>

Figure 16:
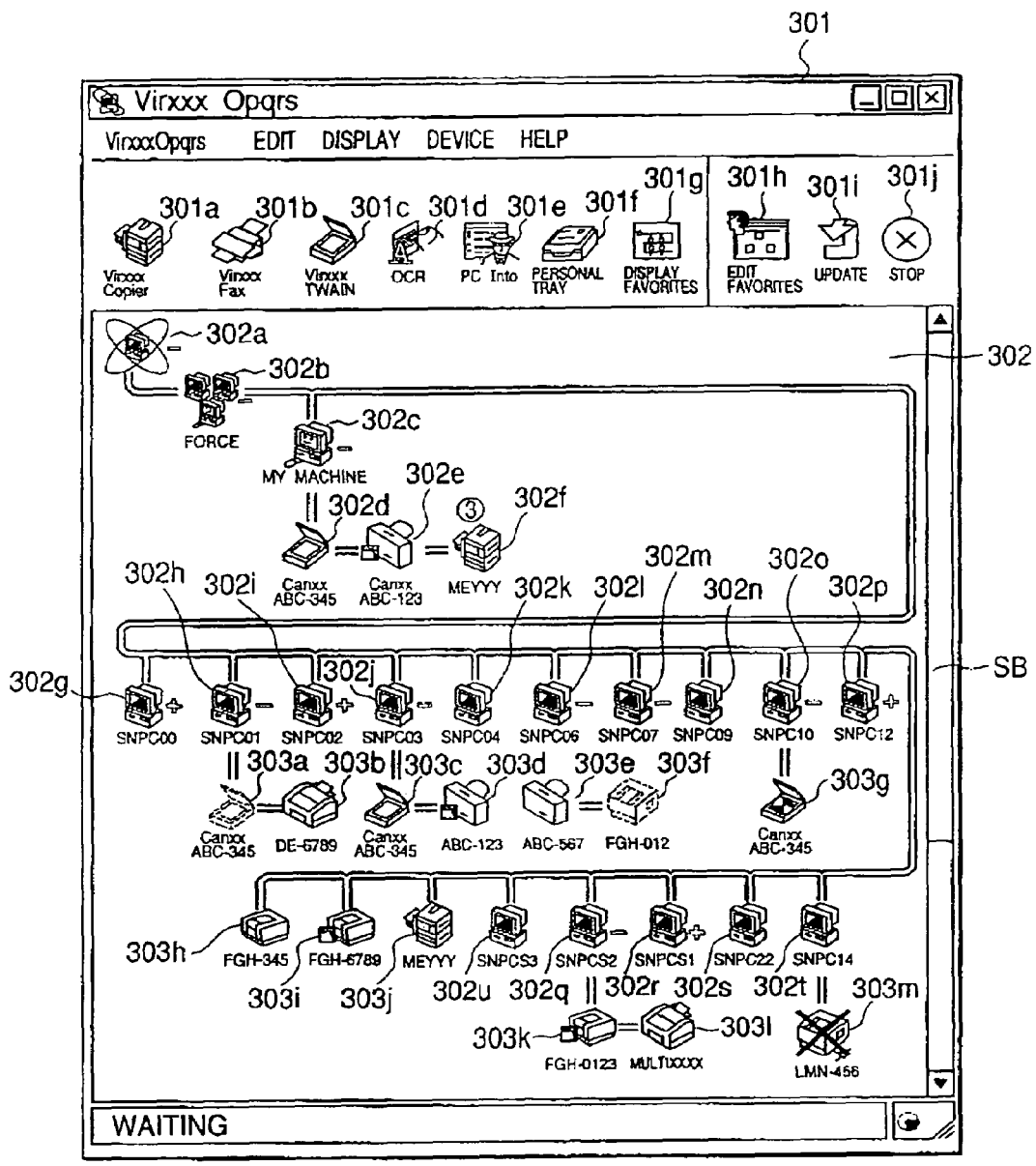
FIG. 16 shows a second device map displayed on the CRT.

FIG. 16 shows a second window (a second device map) displayed on the CRT 16 shown in FIG. 2 for displaying devices connected to the network. Shown in FIG. 16 are icons 301*g* to 301*j*. When the user positions the cursor on an icon 301*g* and clicks on the mouse 13, "Favorites" window (a system display window is spilt in two and the entire system is displayed in one part, and icons for frequently used devices registered by the user are displayed in the other part not), which is displayed (not shown).

Icon 301*h* is a button for displaying an edit screen for adding any of the icons in the system display window 302 to the "Favorites" window. Icon 301*i* is a button for updating the contents of the system display window 302. Icon 301*j* is a button for aborting the program for displaying the system display window.

Icons 302*g* to 302*u* represent PCs connected to the network. Icon 302*f* represents a multifunctional device, for example, the digital copier 118 shown in FIG. 1. The icon 302*f* has a unique appearance and device name different from the input/output devices connected to the network.

Icons 303*a* to 303*m* represent input/output devices connected to the network. Each of these icons is unique to each device (each icon has a very close resemblance in appearance to each device) and indicates its connection and operation states. Because the device corresponding to icon 303*m* currently cannot be selected due to some failure, a "disabled mark" is superimposed on the icon 303*m*. In addition, icons for devices which are connected to the network but wherein no device driver is installed for those devices are grayed.

<Virtual Operation Panel>

Figure 17:
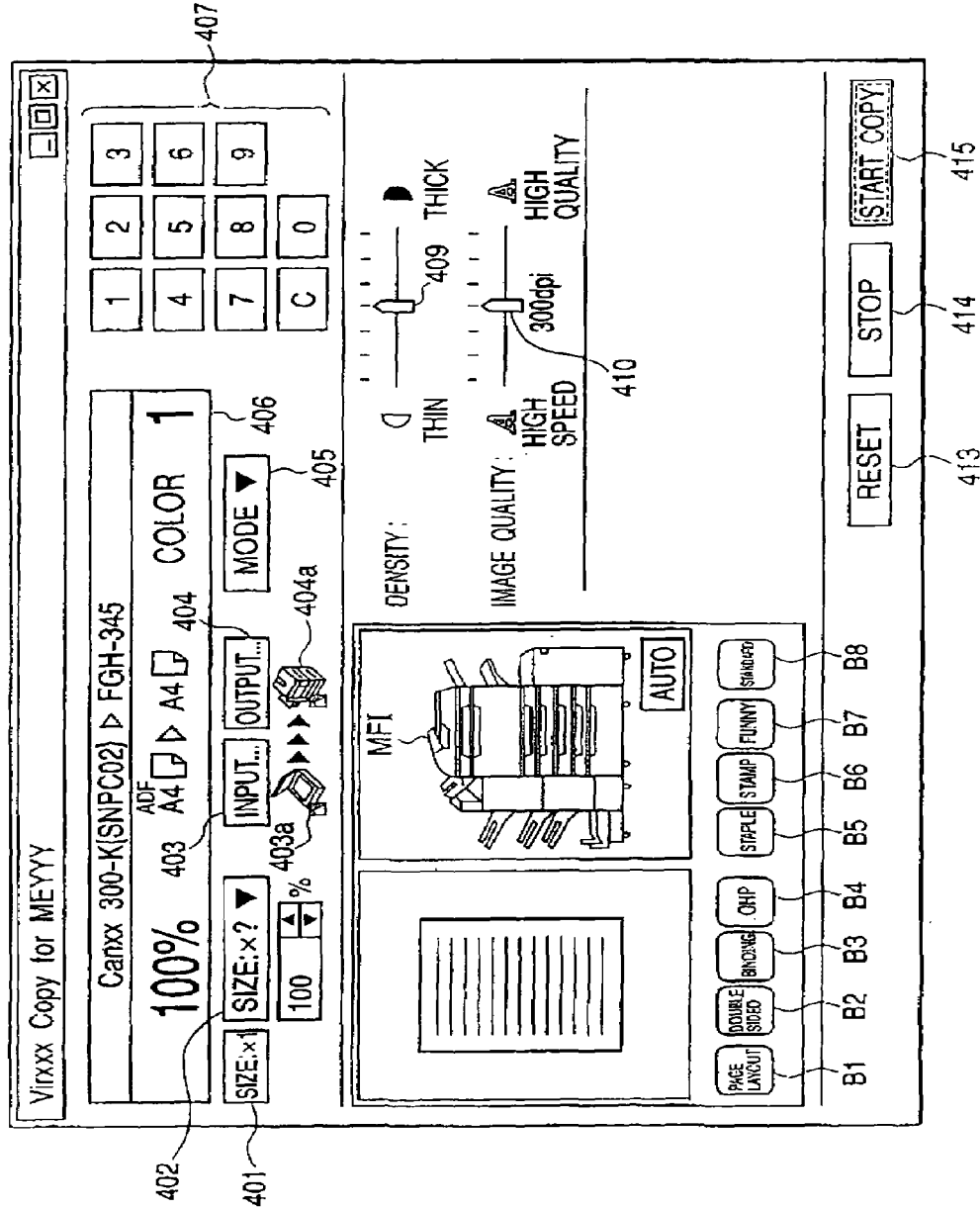
FIG. 17 shows an example of a virtual operation panel displayed on the CRT.
Figure 18:
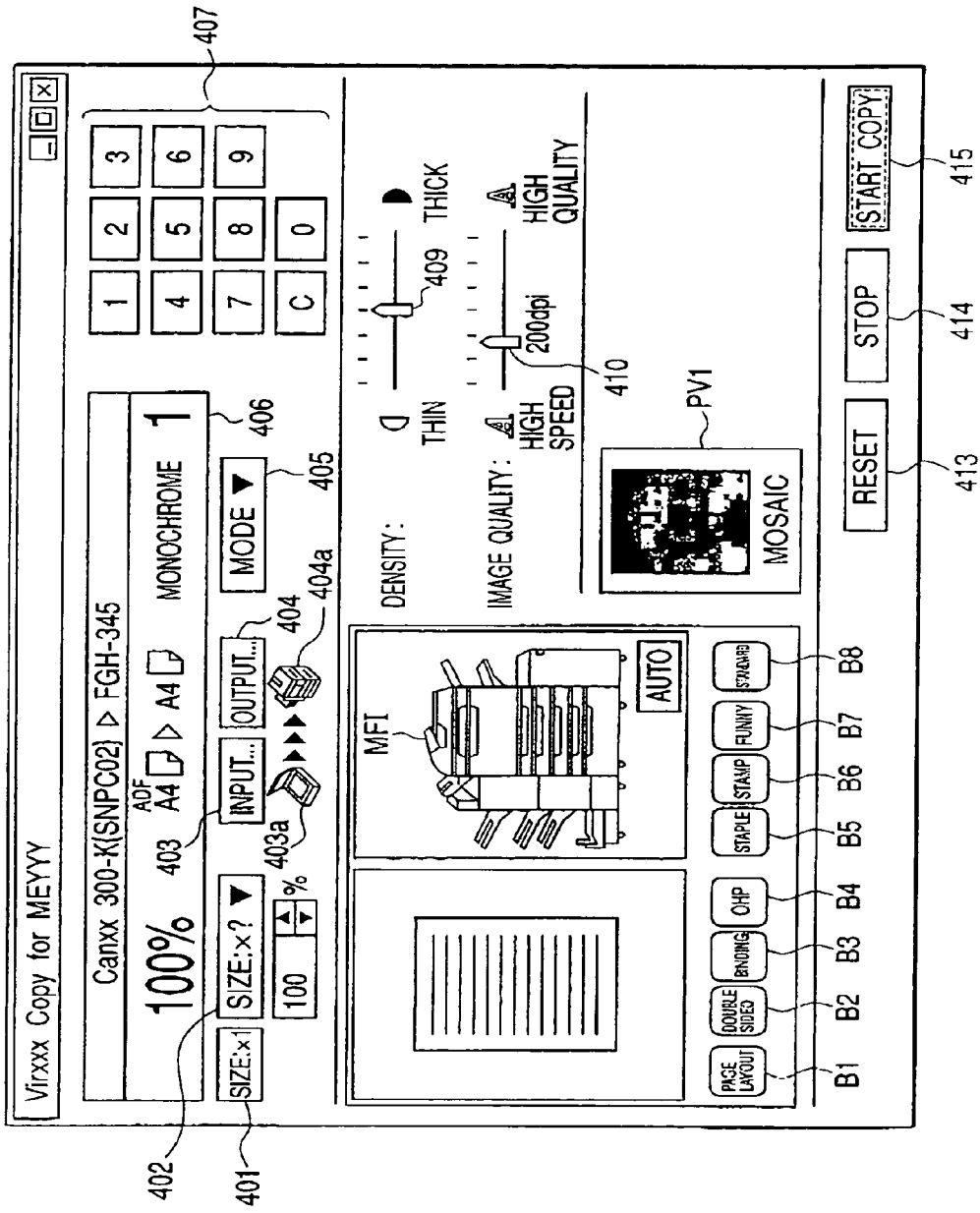
FIG. 18 shows an example of a virtual operation panel displayed on the CRT.
Figure 19:
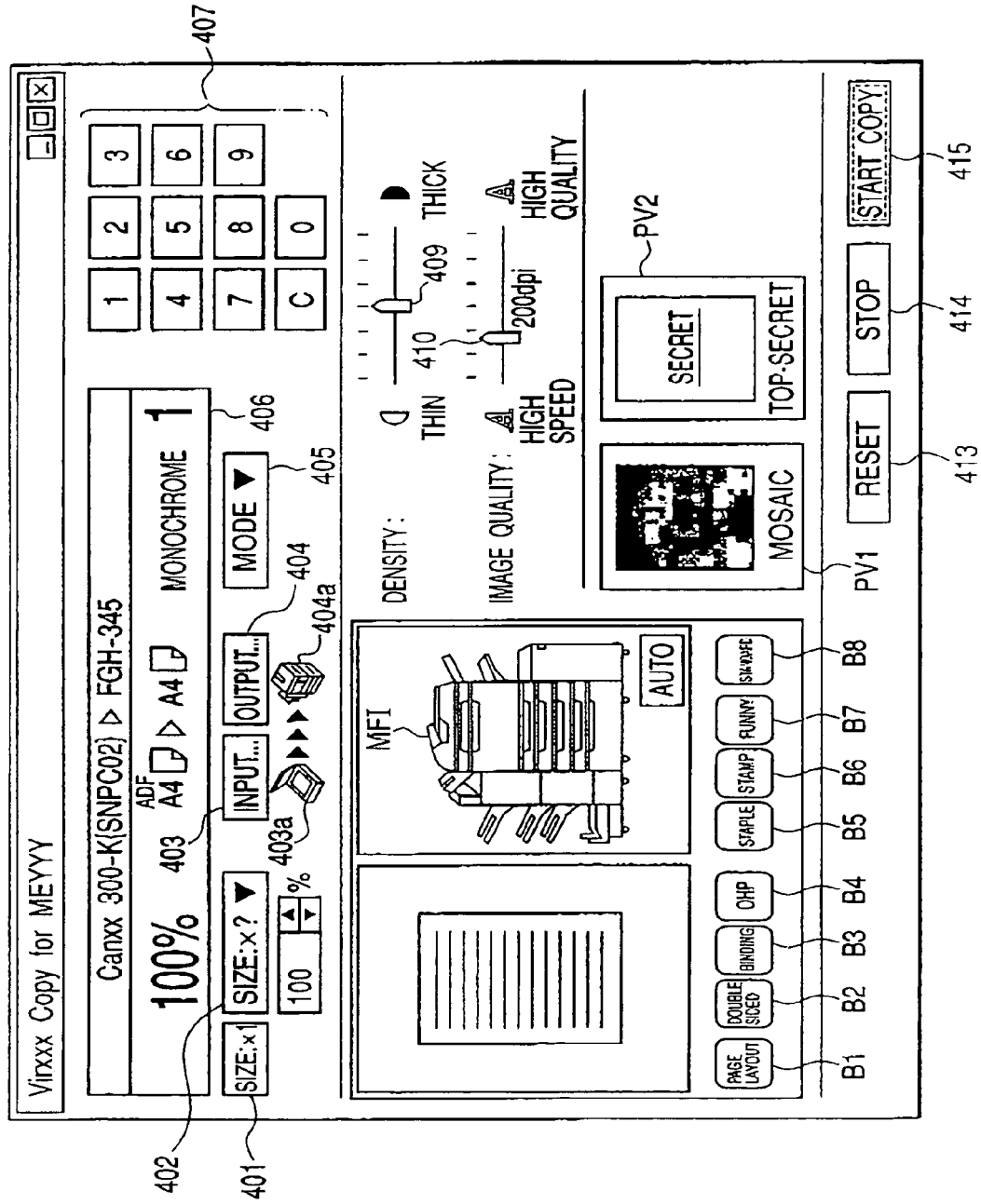
FIG. 19 shows an example of a virtual operation panel displayed on the CRT.

FIGS. 17 to 19 show examples of virtual operation panels displayed on the CRT 16. When a scanner icon (for example 302*d* or 303*c*) is dropped on the valid icon 302*f* shown in FIG. 16, an image representing the digital copier 118 indicated by the icon 302*f* and optional devices which can be connected to the copier 118 are displayed on the CRT 16. The image is displayed by referencing device driver information obtained from the digital copier 118 corresponding to the icon 302*f* and stored in the hard disk 10 or PMEM 3. That is, the contents displayed on the virtual operation panel vary depending on the types of icons to which a drag-and-drop operation is applied. In FIGS. 17 to 19, the same numbers are applied to the same elements as in FIG. 4.

In FIG. 17, buttons B1 to B6 are specific to the digital copier 118 and approximately equivalent to the buttons in the operation panel on the digital copier 118. Button B1 is for setting page layout (for example, layout options for outputting "N pages in one sheet", including "two pages in one sheet", or one image in a number of sheets). Initially, an output image is displayed with the settings of the paper size of "A4" and horizontal writing output.

Button B2 is pressed to specify double-sided printing. Button B3 is pressed to specify bookbinding. Button B4 is pressed to specify printing on transparencies for overhead projector. Button B5 is pressed to specify stapling as a paper eject option of the digital copier 118. Button B6 specifies stamping output in which a stamp is added to an image to be output. For example, an image such as "Confidential" is superimposed on the output image. Functions specified by using these buttons B1 to B6 are those provided by the digital copier 118.

Button B7 is used to specify functions which are not provided by the digital copier 118 but can be specified on the PC (in this embodiment, referred to as "funny setup"). The "funny setup" is provided with two kinds of options: graphics effects and stamps. Button B8 is used to reset the copy mode to normal mode.

Areas PV1 (FIG. 18) and PV2 (FIG. 19) are preview a scanner icon dragged, in order not to increase image data traffic transferred on the network. However, the resolution can be set to a higher or lower value as required by the user.

Also shown in the figure is a system image MF1. The system image MF1, which is displayed on the CRT 16, represents an optional device which is connected to the digital copier 118 indicated by icon 302f when a scanner icon (for example 302d or 303c) is dropped on the valid icon 302f in FIG. 16. This image is displayed by referencing device driver information stored in the hard disk 10 or the PMEM 3 which is obtained from the digital copier 118 corresponding to icon 302f, and it is assumed that an automatically selected paper feeder is displayed distinguishably from the other paper feeders in the image MF1.

Figure 24:
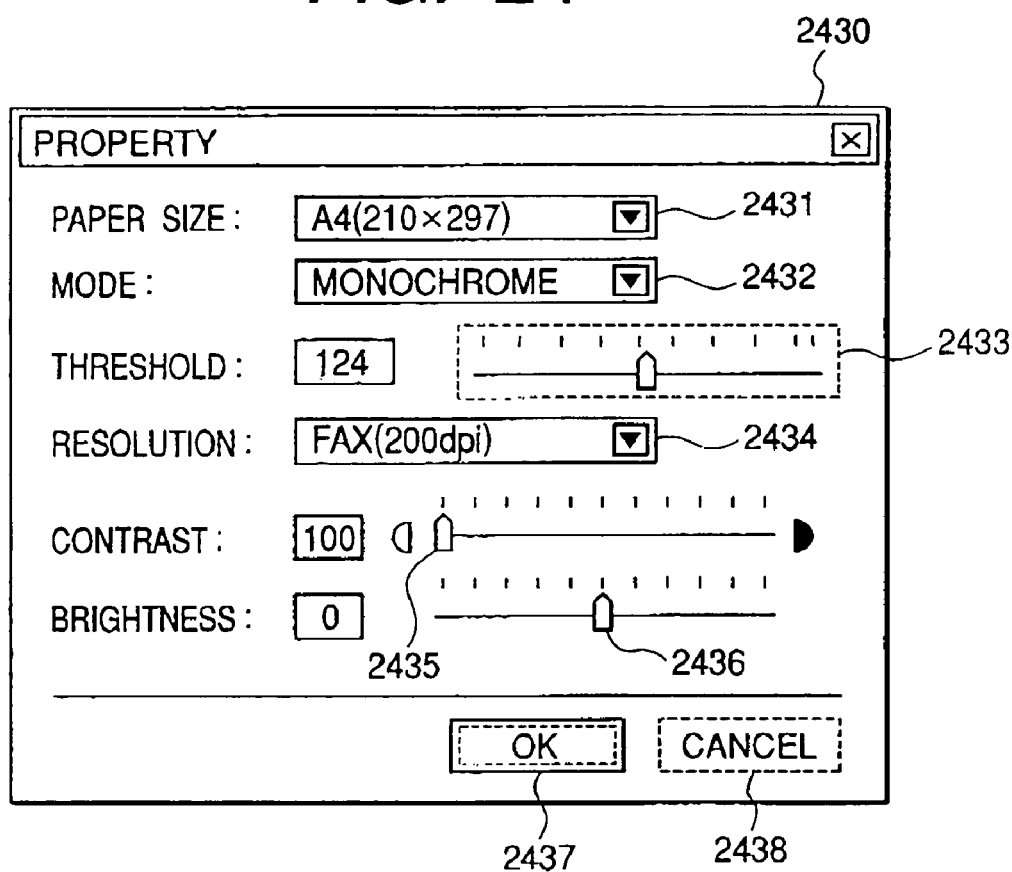
FIG. 24 shows an example of a property screen displayed in response to an icon instruction displayed on a virtual operation panel on the CRT.

Icon 403a is a button for setting input paper and icon 404a is a button for setting output paper. When icon 403a or 404a is pressed, a dialog window (for example a window as shown in FIG. 24 described below) is displayed and detailed settings can be specified, including a paper size, paper orientation, and color/monochrome mode.

<Effect Processing>

Figure 22:
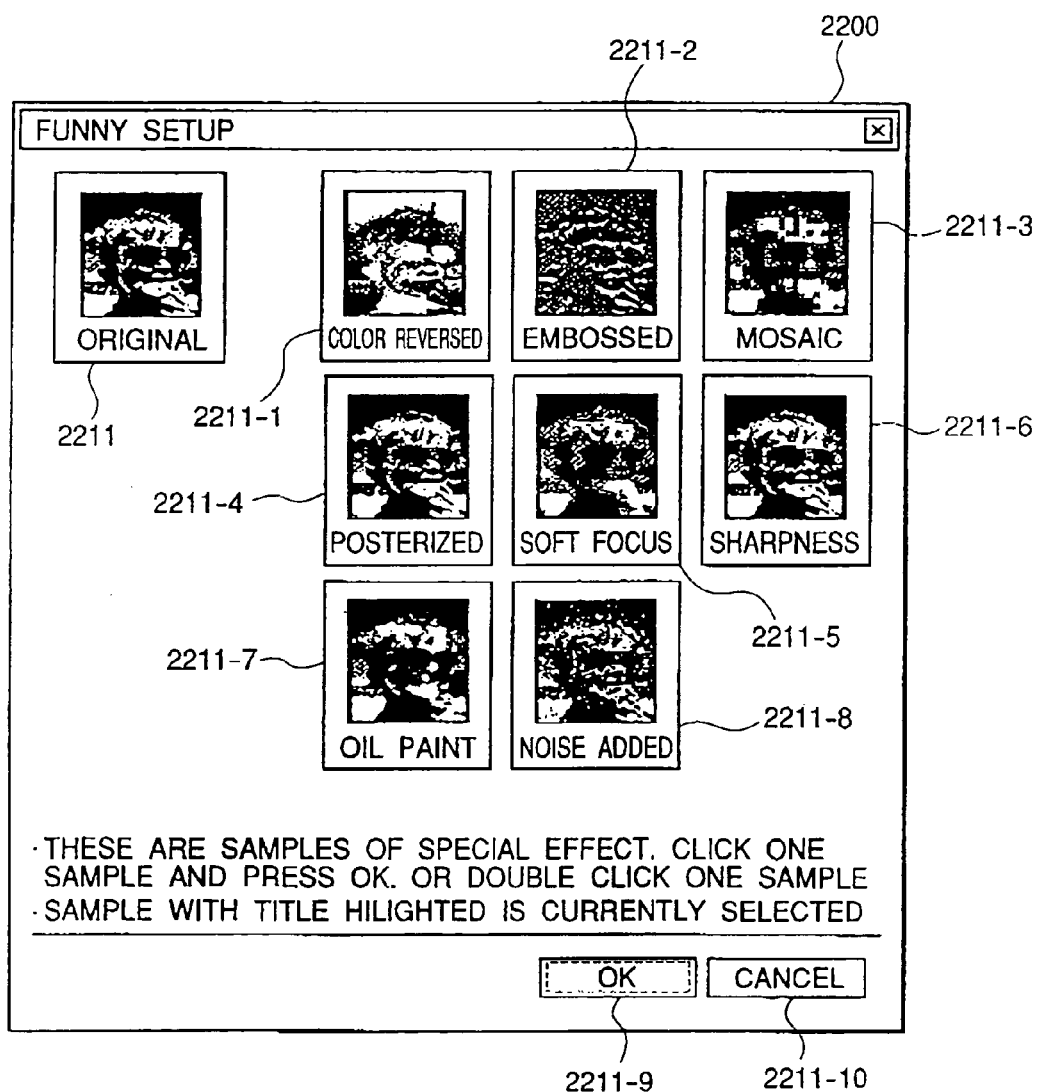
FIG. 22 shows an example of a first window displayed during "funny" setup on a virtual operation panel on the CRT.

FIG. 22 is a view showing one example of a first window 2200 displayed when a funny setup button B7 is pushed. Particularly, when the button B7 is pushed, this example of the first window is displayed upon selection of an "effect" on a menu which is not shown.

In FIG. 22, reference numeral 2211 denotes an original image corresponding to an original image inputted from a scanner. Reference numerals 2211-1 to 2211-8 denote effect images. The effect image 2211-1 corresponds to an image subjected to a color reversing process. The effect image 2211-2 corresponds to an image subjected to an embossing process. The effect image 2211-3 corresponds to an image subjected to a mosaic process. The effect image 2211-4 corresponds to an image subjected to a posterize process. The effect image 2211-5 corresponds to an image subjected to a soft-focussing process. The effect image 2211-6 is equivalent to an image subjected to a sharpness processing. The effect image 2211-7 is equivalent to an image subjected to an oil painting process. The effect image 2211-8 is equivalent to an image subjected to a noise adding process. At present, the effect image 2211-3 is selected. In the preview area PV1 of a virtual operation panel shown in FIG. 18, the image subjected to the mosaic process is displayed. Here, a user pushes buttons 2211-9 and 2211-10, so that he can determine the selected effect or cancel the effect.

The above described effect processing is performed by the image soft application system of a PC side which carries out a prescribed image processing operation to scanner image data.

<Stamp Processing>

Figure 23:
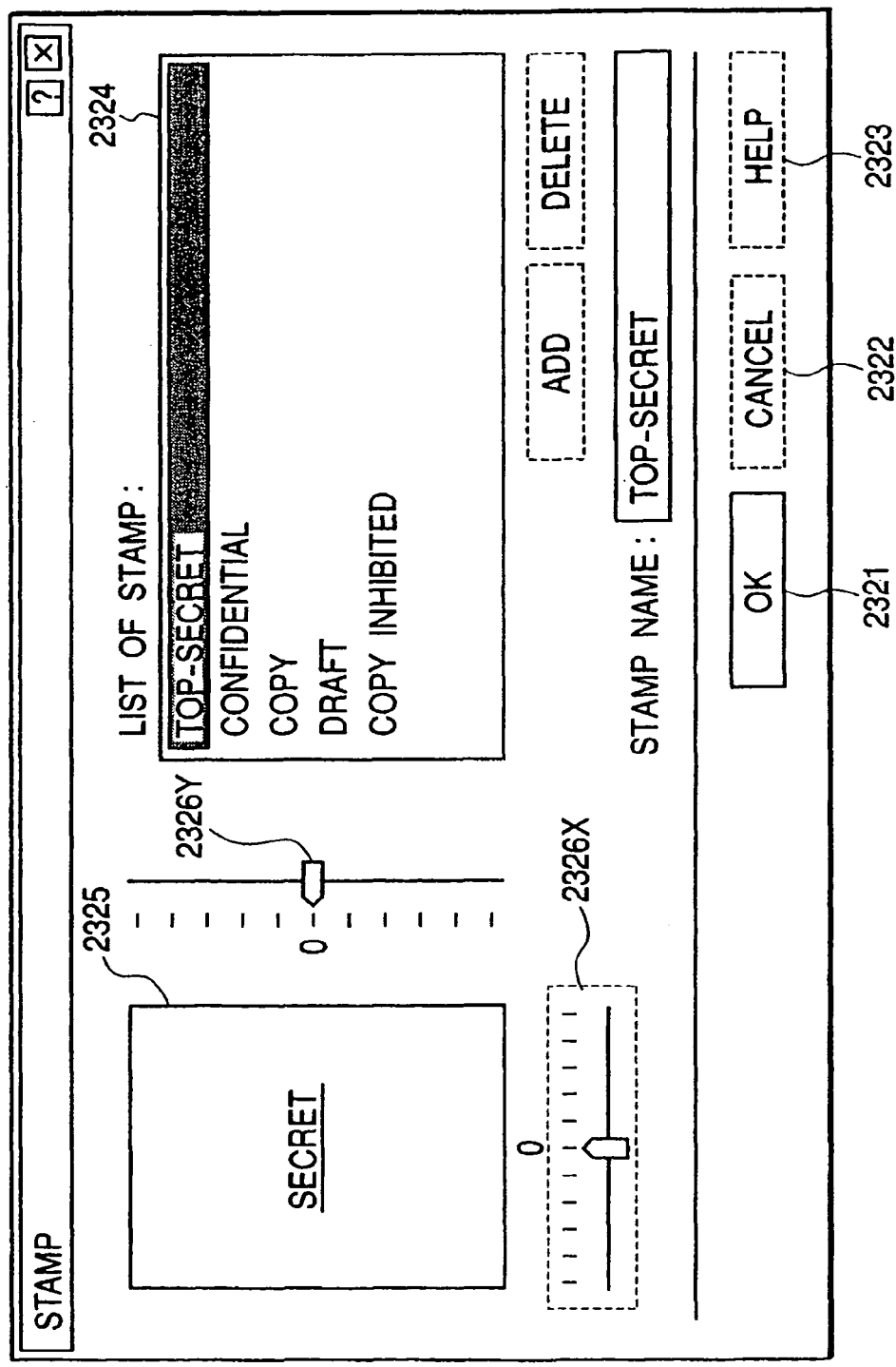
FIG. 23 shows an example of a second window displayed during "funny" setup on a virtual operation panel on the CRT.

FIG. 23 is a view showing one example of a second window displayed when the funny setup button B7 is pressed. Particularly, when the button B7 shown in FIG. 14 is pressed, the example of the second window is displayed upon selection of "stamp" on the menu (not shown).

In FIG. 23, reference numeral 2321 denotes a button for selecting a stamp selected (highlighted) in the list 2324. 2322 denotes a button for cancelling the stamp (highlighted) selected in the list 2324 of stamps. A button 2323 is a button for displaying a help screen related to the stamp processing.

Reference numerals 2326X and 2336Y denote sliders. The user moves these sliders to set the positions of the stamps assigned to an output sheet respectively independently in an X direction and a Y direction. In FIG. 23, selected stamp information 2325 is set to the center of an output image.

Stamp information registered in the list of stamps is configured so as to be newly added or deleted. Specifically, the stamp information formed through an application or the like and printed by the user, image data inputted from the scanner or the combined data of those whose images are edited is stored in the hard disk 10 or the like. These stamps are executed not by the function of a copying machine but by the function of a PC.

<Property Screen>

FIG. 24 is a view showing one example of a property screen 2430 displayed upon pressing the icon 403a. In FIG. 24, reference numeral 2430 denotes a property screen. On this property screen, the user can freely set various kinds of image inputting conditions to the scanner. Referring to FIG. 24, paper size 2431 is set to A4. A mode 2432 is set to a monochrome mode. Resolution 2434 is set to FAX (200 dpi). A slider 2433 serves to set the threshold value of gradation. A slider 2435 serves to set contrast. A slider 2436 serves to set brightness. Reference numeral 2437 denotes a button for determining the set contents. Reference numeral 2438 denotes a button for cancelling the set contents.

<Resource File of Device Driver>

FIG. 25 is a view showing one example of the resource file of a device driver controlled by a data processor. For instance, the resource file is obtained from a management server upon initialization process when the power of a PC (device processor) is turned on, or when a prescribed icon is pressed. The resource file is subjected to a unitary management by a management server (not shown) which is connected to a network.

In FIG. 25, reference numeral 2501 denotes a header part in which the name of a driver, version information and comment are stored. Reference numeral 2502 denotes page setup information in which resource offset information and information related to the page setup such as an original size, an output paper size, a print direction, a page layout, magnification and stamps are stored. Here, the original size and the output paper size include, for instance, A4, A3 and B4 or the like. The print direction includes, for example, a longitudinal direction, a horizontal direction or the like. The page layout includes, for example, 1 page/sheet, 2 in 1, etc. The magnification includes, for example, 100%, 141%, etc. The stamps include, for example, "Top secret", "Confidential", etc.

Reference numeral 2503 denotes finishing information in which resource offset information, a printing method, a binding direction and a paper ejection method are stored. In this case, the printing method includes, for instance, an ordinary printing, a bookbinding printing, a double-sided printing, an OHP printing, etc. The binding direction includes, for example, a longitudinal direction, a horizontal direction, etc. The paper ejection method includes, for example, a sorting method, a grouping method, a rotation sorting method, etc.

Reference numeral 2504 denotes paper feed information in which the resource offset information and various types of paper feed setup information such as a paper feed method and a detailed setup of the OHP printing are stored. In this case, the paper feed method includes a cassette 1, a manual feed, etc. The detailed setup of the OHP printing includes a paper feed port upon setup of the OHP printing, the designation of insert paper, the type of paper, etc.

Reference numeral 2505 denotes the setup information of a device in which the resource offset information and option information for feeding paper or ejecting paper (paper feeding options, paper ejecting options) are stored. In this case, the paper feeding options include an option device setup for feeding paper. The paper ejecting options include an option device setup for ejecting paper.

Reference numeral 2506 denotes a resource data part in which intrinsic image information (image parts) for displaying a system configuration for each device is stored.

Thus, even when the functions of the devices are extended by connecting option units thereto, a function extended virtual panel or buttons can be displayed by obtaining the latest resource file from a server.

<Button Editing>

Figure 26:
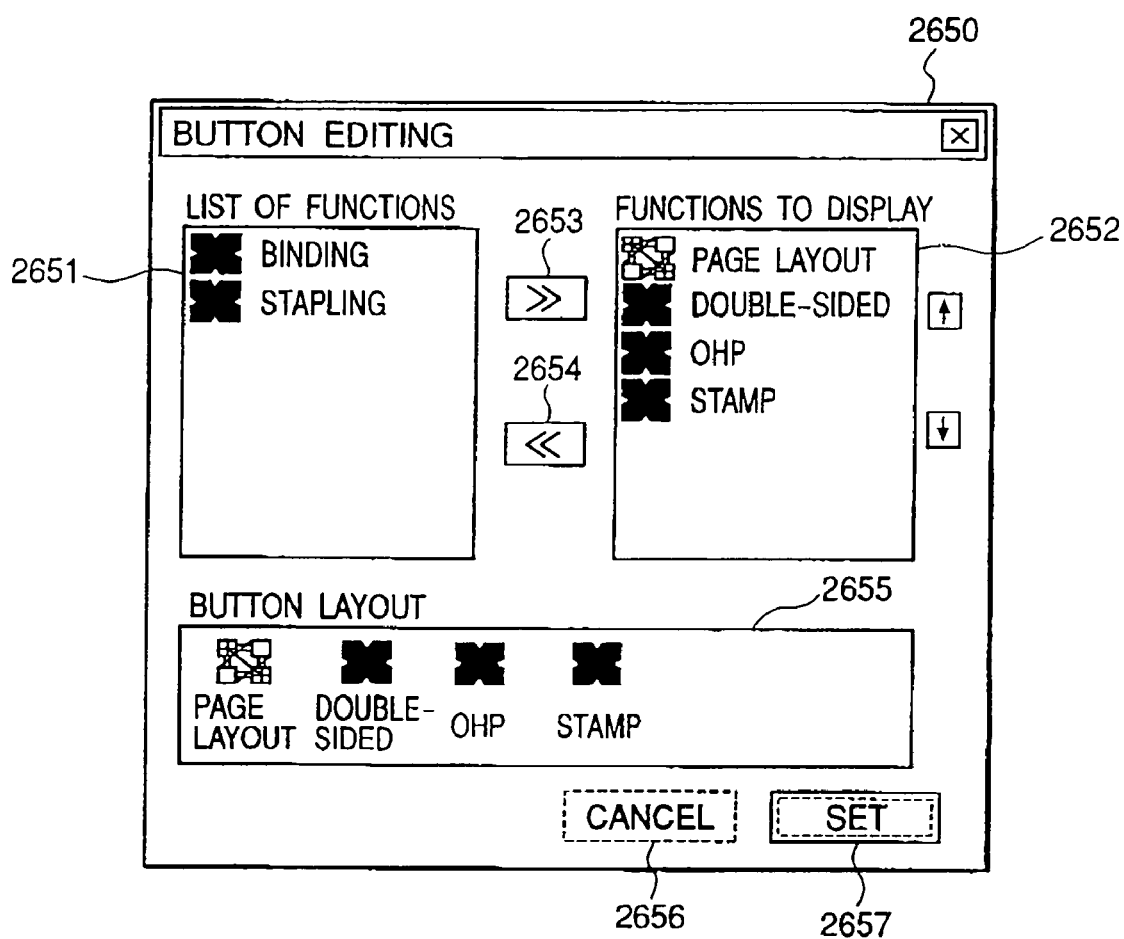
FIG. 26 shows an example of a button editing screen displayed on a virtual operation panel.

FIG. 26 is a view showing one example of an editing screen for editing with the buttons displayed on the virtual operation panel illustrated in FIGS. 17 to 19. In FIG. 26, reference numeral 2650 denotes an editing window. When the user selects a button to be displayed among groups of function buttons displayed on a function list area 2651 and presses a moving button 2653, the selected button moves to a function area 2652. Further, the user presses a moving button 2654 to move the selected function button to the function list area 2651 from the function area 2652.

Reference numeral 2655 denotes a button layout display area which corresponds to buttons B1 to B6 shown in FIG. 12 or the like. Buttons to be displayed are arranged in accordance with the selection order of the user (they can be changed by a mouse or the like). In this connection, when an editing button displayed on the virtual operation panel, which is not shown, is pressed, an editing program is read from the hard disk 10 and started so that this editing window or screen is displayed.

Now, a data processing in the editing program will be described below. The program stored in the hard disk 10, etc is executed by the CPU 2 shown in FIG. 2 so that the data processing is carried out. Initially, when moving the buttons 2653 and 2654 on the editing window 2650, the selected button is moved to the displayed function area 2652 from the function list area 2651 or moved to the function list area 2651 from the displayed function area 2652.

Next, when the change of the button layout is instructed in the button layout display area 2655 on the editing window 2650, the layout of the buttons of the button layout display area 2655 is changed in accordance with the instruction.

Then, when a button 2657 on the editing window 2650 is pressed, setup function button layout information is generated on the basis of information set up on the editing window 2650 and stored in the hard disk 10 or the like shown in FIG. 2 and the editing window 2650 is closed.

Further, when a button 2656 on the editing window 2650 is pushed, the information set up on the editing window 2650 is cancelled and the editing window 2650 is closed.

According to the above described processes, the user can edit (arrangement order, setup of the presence or absence of display) the function buttons (B11 to B8 shown in FIGS. 17 to 19) on the editing window 2650 shown in FIG. 26. Therefore, an operability for setting up functions can be further improved.

<Log Information of Function>

In the above described embodiment, in order to perform a desired function, the virtually displayed scanner icon is dragged or dropped on the printer icon or the scanner icon is dragged or dropped on the combined machine icon. The management server or the data processor controls the log of such combined functions or the log for each device to control the residual amount of the resource of each printer. The data processor obtains the log information upon execution of a function to display whether or not the selected function can be executed. Thus, the log information for each device can be effectively utilized. The embodiment of the log information of functions will be described hereinafter.

Figure 27:
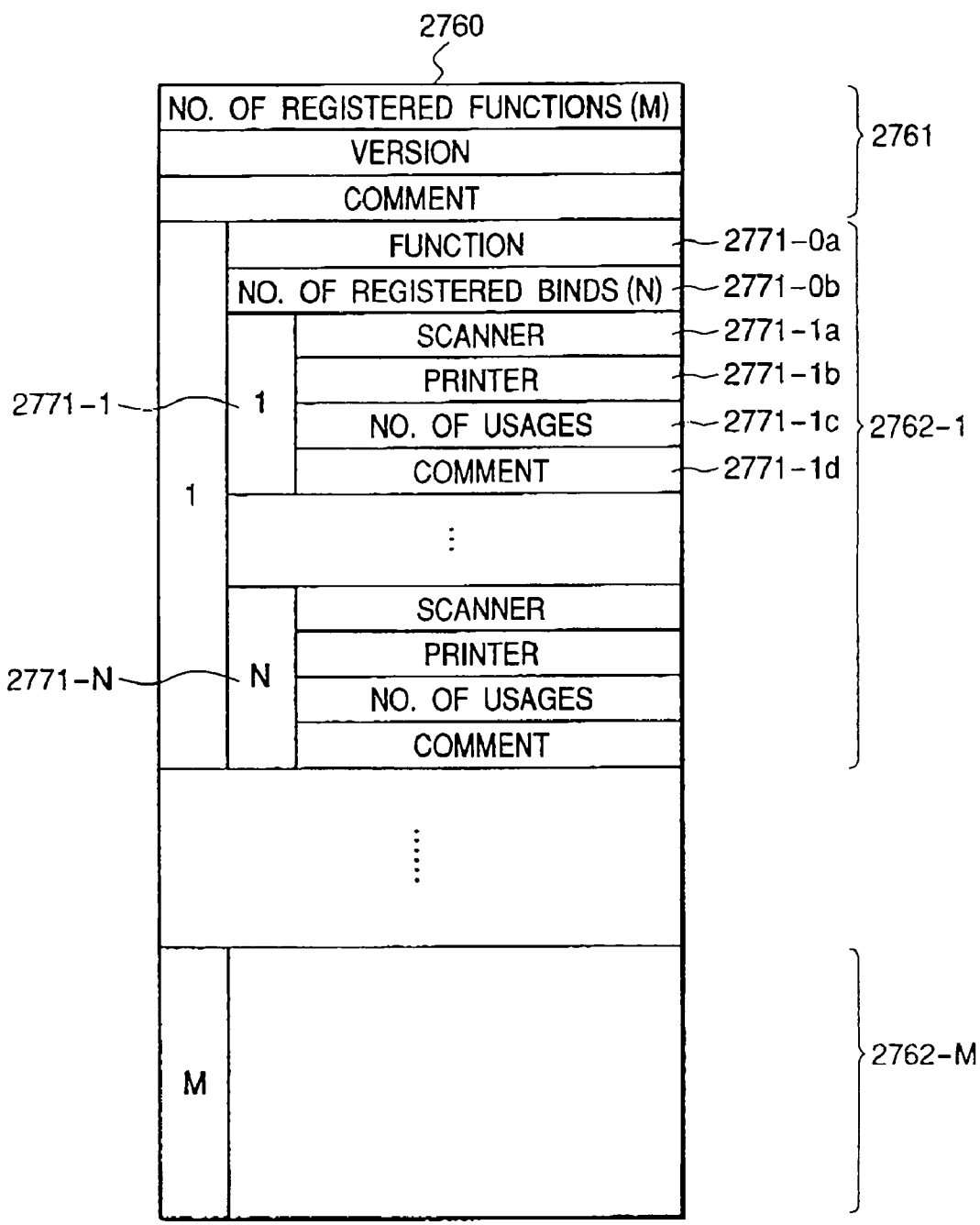
FIG. 27 shows an example of log information managed in the data processing apparatus according to the present invention.

FIG. 27 is a view showing one example of the log information of functions. Any one of the PCs of the network shown in FIG. 1 serves as a management server and the management server controls function log information. In FIG. 27, reference numeral 2760 denotes function log information which comprises a header part 2761 and function log information parts 2762-1 to 2762-M.

2762-1 corresponds to one function, for instance, a copying function. In 2771-0*a*, the identifying information of the function is stored. In 2771-0*b*, the number of registered binds of the function is stored. The number of binds indicates a value counted for each execution of the function. Reference numerals 2771-1 and 2771-N respectively correspond to one combination. In 2771-1*a*, a scanner ID is stored and a device ID corresponding to a dragged icon (scanner) is stored. In 2771-1*b*, a printer ID is stored and a device ID corresponding to a dropped icon (printer) is stored.

In 2771-1*c*, the number of usages is stored and the number of executions of the copying function composed of the combination of the scanner of 2771-1*a* and the printer of 2771-1*b* is cumulatively counted and stored. Reference numeral 2771-1*d* denotes a bind comment.

Every time the user drags and drops the icon on the PC to execute a function, this operation is sent to the management server so that device log information is stacked in the hard disk in the management server.

The function log information controlled by the management server is transferred to the PC of the user on the basis of the request of the user. Then, the function log information is processed as it is or subjected to a data processing on the PC of the user and displayed on a list form or a visual form.

<Log Information of Device>

FIG. 28 is a view showing one example of the log information of devices (device log information). Any one of the PCs shown in FIG. 1 serves as a management server and the management server controls the device log information.

In FIG. 28, reference numeral 2870 denotes printer log information. The printer log information comprises a header part 2871 and printer log information parts 2872-1 to 2872-M. In this case, M corresponds to the number of printers which can be identified on the network.

In 2881, the name of a printer is stored and the name of the printer determined by a device driver is automatically set up. In 2882, the number of logs is stored and the number of logs logged in the printer is cumulatively counted and stored. Reference numeral 2883 denotes a comment. 2884-1 to 2884-N1 denote log detailed information in which input information (application name or scanner attributes, etc.), the number of total printing pages, defined paper size, the length and width of undefined paper, color/monochrome printing, single/double-sided, toner consumption amount, etc. are stored. The toner consumption amount indicates toner consumption amount information sent from the printer every finish of a printing job in the printer. Further, at any time, each log information is updated and controlled in the hard disk of the management server.

Thus, the latest log information is updated every time each printer on the network executes the job. When the user selects the printer function or the copying function, the PC on the network employs the log information in order to decide whether or not a job based on the function can be executed with the current toner amount. Therefore, when the management server receives a command for requesting printer log information from a PC on the network (for example, when the user drags and drops the scanner icon on the printer icon in order to execute the copying function, a command is supplied to the management server), the management server sends the printer log information corresponding to the printer ID (printer name) of the printer indicated by the dropped printer icon to the PC as a request side.

<Log Information of Job>

FIGS. 29 to 32 are views showing one example of the log information of a job. Any one of the PCs shown in FIG. 1 serves as a management server. The management server controls job log information for each job.

FIG. 29 shows the log information of a job using a facsimile function which corresponds to log item information in a receiving folder. Senders, FAX number, date, reception results, reception time, number of received pages, error information, resolution, compression systems, etc. are controlled by the management server as the log information.

FIG. 30 shows the log information of a job using the facsimile function which corresponds to log item information in a sent receiving folder. A receiver, Fax number, date, sending results, sending time, the number of trials, the name of document, the number of broadcast transmissions, the number of sent pages, error information, the section of the receiver, comment, resolution, a compression system, server reception time, a sender, the PC of the sender, etc. are controlled by the management server as the log information.

FIG. 31 shows the log information of a job using a scanner function. The log information including the items of the name of a user, scanning start time, scanning end time, total number of scanned pages, the name of a machine, the name of a TWAIN driver, paper size, the height of paper, the width of paper, color/monochrome, etc. is supplied to the management server every time the scanner is employed, and is controlled by the management server.

FIG. 32 shows the log information of a job using a printer function. The log information including the items of the name of a user, printing start time, printing end time, the total number of printed pages, the name of a machine, the name of a printer driver, the name of an application, the designated number of copies, defined paper size, the length and width of undefined paper, color/monochrome, single/double-sided, toner consumption amount, etc. is supplied to the management server every time the printer is employed, and is controlled by the management server. In this case, the toner consumption amount is detected in the printer side or set on the basis of calculated consumption amount data.

The job log information controlled by the management server is transferred to the PC of the user in accordance with the request of the user. Then, the job log information is directly displayed or subjected to a data processing and then displayed in a list form or a visual form on the PC of the user.

<Management Server>

Now, a data processing using the management server will be described below. Processings described below will be performed by the CPU2 on the basis of a program stored in the hard disk 10 shown in FIG. 2 or in a storing medium (not shown).

Figure 33:
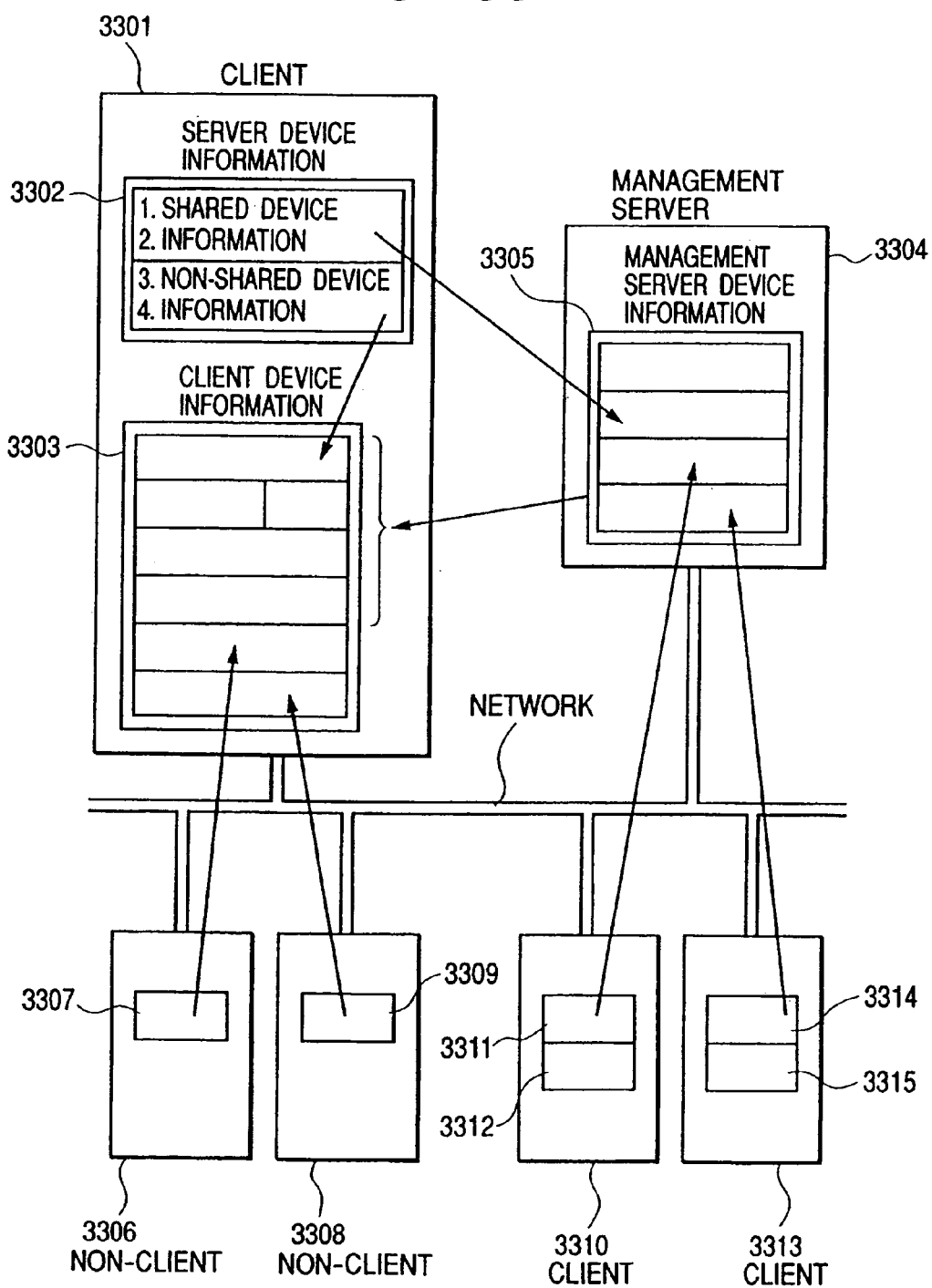
FIG. 33 shows the relationship between a data processing apparatus as a management server and a data processing apparatus as a client device.

FIG. 33 is a view showing the relation between a data processor as a management server and data processors as client devices. Referring to FIG. 33, 3301, 3310 and 3313 denote client devices. Server device information 3302, 3311 and 3314 (see FIG. 37 described below) and client device information 3303, 3312 and 3315 (see FIG. 38 described below) are respectively stored in the hard disk 10 shown in FIG. 2.

The server device information 3302, 3311 and 3314 comprise the information of a shared device (1. Shared Device, 2. Information) on the network and the information of a non-shared device (3. Non-Shared Device, 4. Information). The server device information is obtained from a device driver installed in its own apparatus and controlled by client programs in the client devices 3301, 3310 and 3313. The server device information (for example, 3302) designates the shared device information (1. Shared Device, 2. Information) controlled by the client device (for instance, 3301) as a server and the device information (3. Non-Shared Device, 4. Information) locally controlled by the client device (for instance, 3301).

Reference numeral 3304 denotes a management server which stores and controls management server device information 3305 (see FIG. 34 described below) in the hard disk 10 shown in FIG. 2. Reference numerals 3306 and 3308 denote non-client devices which are data processors in which a server program, a client program, a program shown by a flowchart described below, etc. are not installed. In the non-client devices 3306 and 3308 respectively, device information 3307 and 3309 are stored.

The above described client device information 3303, 3312 and 3315 comprises the combination of the management server device information, the device information of the client devices and the device information of the non-client devices. The client device information is transferred from the management server and the non-client devices and controlled by the client programs in the client devices 3301, 3310 and 3313.

FIG. 34 is a view for explaining the management server device information 3305 shown in FIG. 33. As shown in FIG. 34, the management server device information 3305 comprises header information 3401, an index table 3402, and the device information of valid client devices in the network (Client PC device information data) 3403-1 to 3403-N.

Each element (element (0) to (N-1)) in the index table 3402 comprises data offset, data size and flag. The elements (0) to (N-1) respectively correspond to the device information 3403-1 to 3403-N.

Further, the device information of the client devices (Client PC device information data) 3403-1 to 3403-N comprises PC information 3404 (see FIG. 35A described below), printer information 3405 (see FIG. 35B described below), scanner information 3406 (see FIG. 36A described below) and facsimile board information 3407 (see FIG. 36B described below).

Further, the device information of the client devices 3403-1 to 3403-N indicate information got from the server device information 3302, 3311 and 3314 shown in FIG. 33 and is equivalent to the information of the shared device (1. Shared Device, 2. Information) on the network.

FIGS. 35A and 35B are views for explaining in detail the PC information 3404 and the printer information 3405 shown in FIG. 34. The PC information 3404 shown in FIG. 35A comprises seven items of information. The contents of the respective information are stored. The printer information 3405 shown in FIG. 35B also comprises seven items of information. The contents of the respective information and methods for obtaining the respective information are stored.

FIGS. 36A and 36B are views for explaining the scanner information 3406 and the facsimile board information 3407 shown in FIG. 34 in detail. The scanner information 3406 shown in FIG. 36A comprises eight items of information. The contents of each information and methods for obtaining the information are stored. The facsimile board information 3407 shown in FIG. 36B comprises one item of information. The contents of the information and a method for obtaining the information are stored.

FIG. 37 is a view for explaining the server device information 3302, 3311 and 3314 shown in FIG. 33 and items equal to those in FIG. 34 are designated by the same reference numerals as those in FIG. 34. Referring to FIG. 37, reference numeral 3701 denotes local device information data which is the information of advice locally connected to its own apparatus. The local device information 3701 has the same configuration as that of the device information 3403-1 to 3403-N of the client devices shown in FIG. 34.

As shown in FIG. 37, the server device information 3302 comprises the header information 3401, the index table 3402 and the local device information data 3701.

FIG. 38 is a view for explaining the client device information 3303, 3312, and 3315 shown in FIG. 33 and items equal to those shown in FIG. 34 are designated by the same reference numerals as those in FIG. 34. As shown in FIG. 38, the client device information 3303 comprises the header information 3401, the index table 3402, the local device information 3701, the device information of other valid client devices (Client PC device information data) 3403-1 to 3403-N on the network and the device information 3407 (3409) of the non-client device 3306 (3308).

In this connection, the structure of printer information in the device information 3307 (3309) of the non-client device 3306 (3308) is the same as that of the printer information 3405 shown in FIGS. 35A and 35B. However, only a shared name and a server name are set.

<Third Data Processing>

Figure 39:
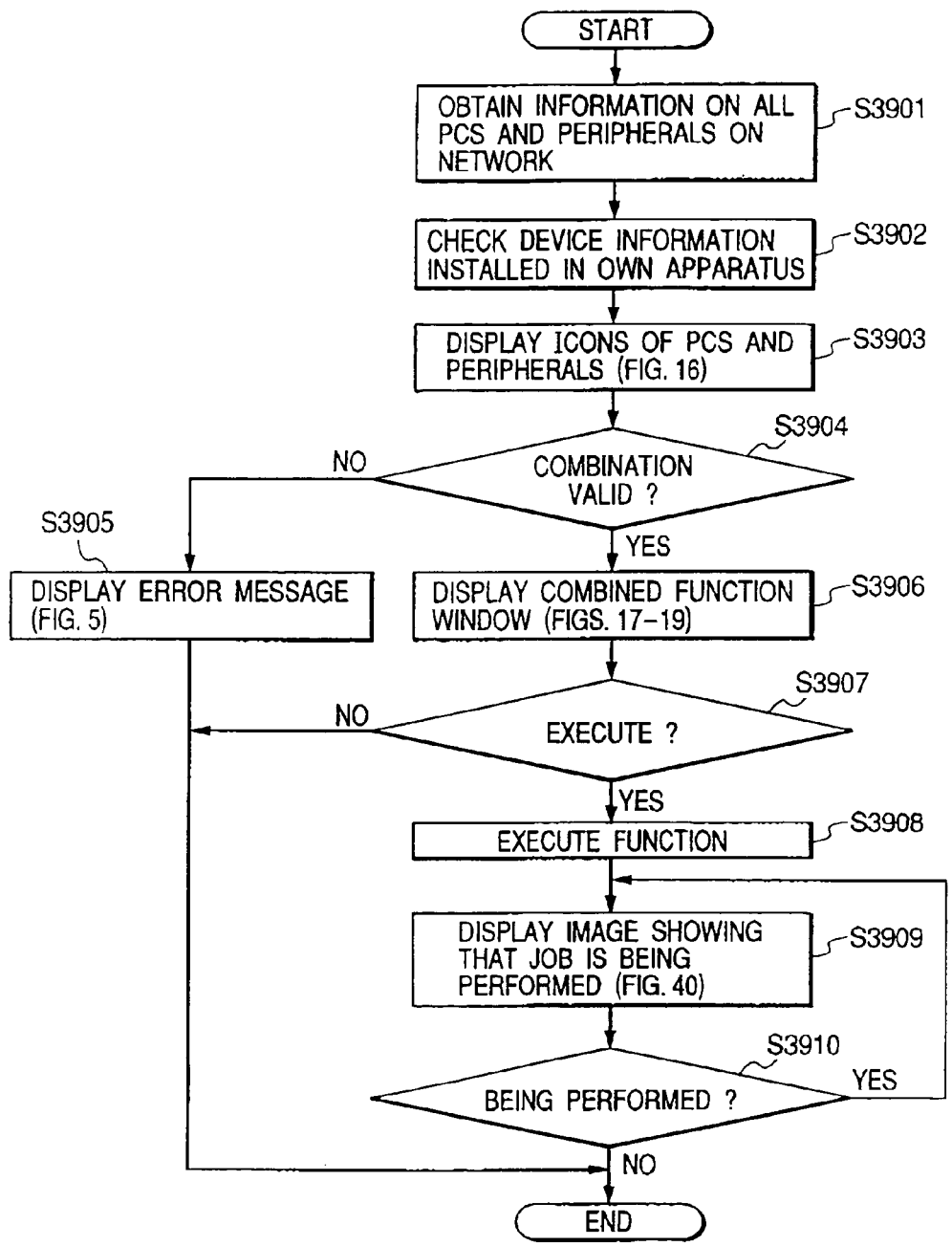
FIG. 39 is a flowchart showing an example of a third data processing procedure in the data processing apparatus according to the present invention.

FIG. 39 is a flowchart showing one example of a third data processing in the data processor (for instance, the client device 3301) according to the present invention. S3901 to S3910 designate respective steps.

Initially, in step S3901, domain information to which its own apparatus belongs is obtained. Any one of the PCs of the network shown in FIG. 1 serves as a management server. For example, the address of the management server (3304) is obtained. Then, the connecting information of all the shared PCs and peripheral devices on the network, the status of usage of these devices and the status information of these devices are got from the management server. At this time, the device information (the management server device information 3305 shown in FIG. 33) installed in other PCs (for instance, the client devices 3310 and 3313) is also obtained. Then, this information are stored and controlled on the PMEM 3 shown in FIG. 2. Then, in step S3902, the device information (the server device information 3302 shown in FIG. 37 and the information shown in FIG. 15, etc.) installed or controlled in its own apparatus is checked.

The management server always monitors the connecting states of the PCs and the peripheral devices shown in FIG. 1 and shares in the network, the status of usage of these devices and the status of these devices. Then, when the states of the PCs and the peripheral devices on the network change, the latest system information (the connecting states of respective devices on the network, the status of usage thereof and the status thereof) is sent to each client device.

In step S3903, the device map shown in FIG. 16 is displayed on the basis of the information thus obtained (the client device information shown in FIG. 31). Each peripheral device is represented by a device name and a peculiar icon specified by the device name which is extremely similar to the outline of a mainbody to be connected and exhibits a function including monochrome/color information, on the basis of the information obtained at that time and the resource data part 2506 shown in FIG. 25 which is stored in the hard disk 10, so that the connecting state and the operating state of each peripheral device (including the number of currently spooled jobs, visual or numerical information which cannot be used, etc.) are displayed.

Next, in step S3904, when the execution of each function is instructed, it is decided whether or not the function is valid. As an operating method therefor, for instance, the icon 303c of a scanner is dragged and dropped down onto the icon 302f of a digital copying machine on a screen or a window shown in FIG. 16. In this case, the copying function is carried out.

Here, when it is decided that the function is not composed of a valid combination or a valid function, the step advances to step S3905 to display an error message as shown in FIG. 5. On the other hand, in the step S3904, when the function is composed of a valid combination or a valid function, the step advances to step S3906 to display the window of a corresponding function. In the above described example, the virtual operation panel shown in FIGS. 17 to 19 are displayed.

In next step S3907, it is decided whether or not a copying operation is carried out. When there is an instruction for stopping the copying operation (when a button 414 on the virtual operation panel shown in FIGS. 17 to 19 is pressed), the processing is completed. When there is an instruction for performing the copying operation (when a button 415 on the virtual operation panel shown in FIGS. 17 to 19 is pushed), the step moves to step S3908 to perform the copying operation in accordance with the setup. Upon execution of the processing, the window of the function is closed to return the display of a system configuration state window for simultaneously displaying a system configuration and a system state shown in FIG. 11.

Subsequently, in step S3909, an image is displayed indicating that the processing is being performed (in the above described example, the copying process is being performed) (see FIG. 40 described below). The image display is continuously performed until it is decided that the processing is not being performed in step S3910.

Figure 40:
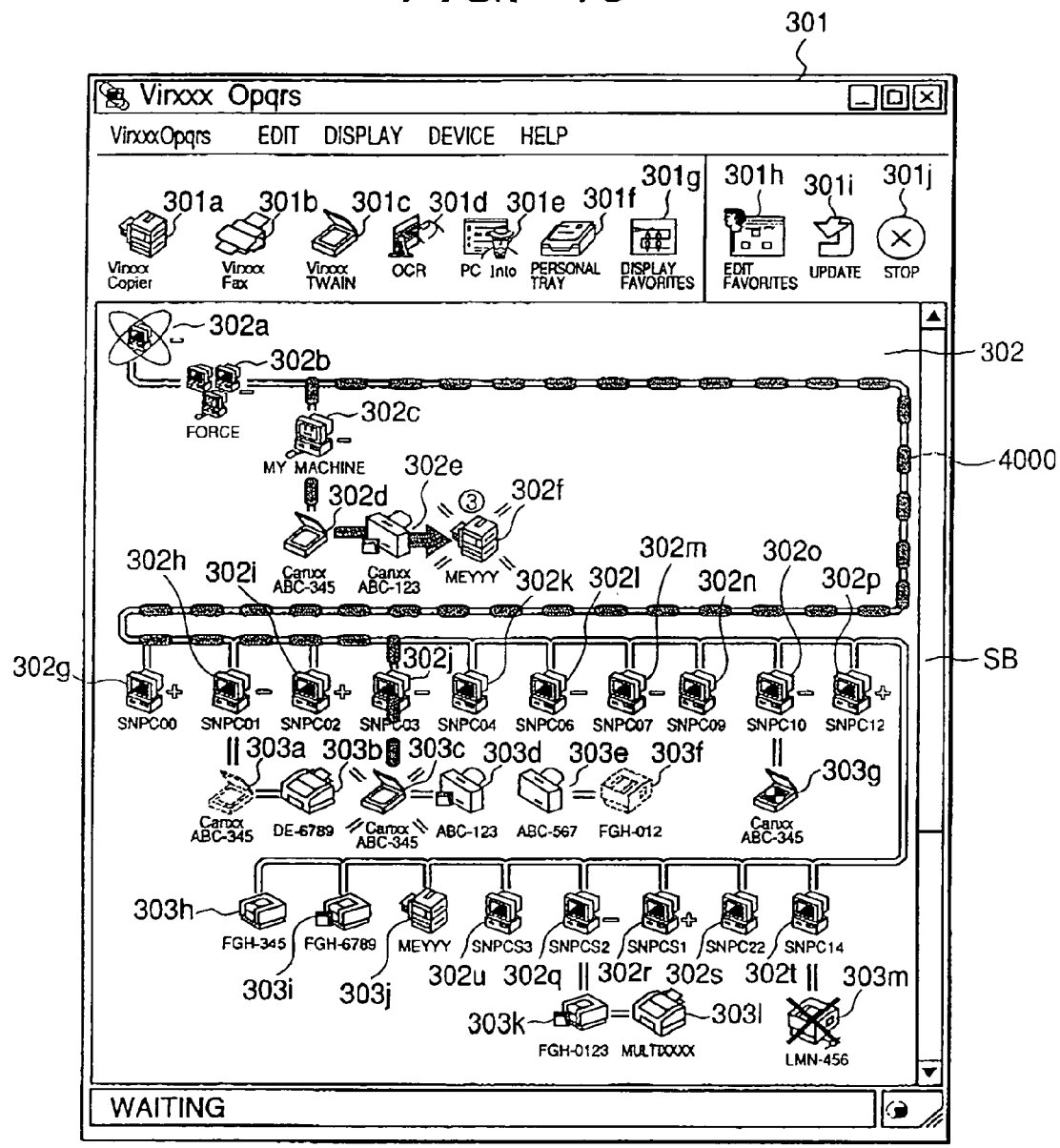
FIG. 40 is a diagram for describing a device map displayed on the CRT shown in FIG. 3.

FIG. 40 is a view showing one example of a window or a screen on which the copying function is being performed. In FIG. 40, items equal to those shown in FIG. 16 are designated by the same reference numerals as those in FIG. 16. In FIG. 40, 4000 indicates a display showing that a function is being performed. In this display, an image read from a scanner which is indicated by an icon 303c is transferred to a printer represented by an icon 302f and printed. Specifically, the icon 303c and the icon 302f are displayed so as to be discriminated from other icons and a thick broken line arrow mark is drawn in a network path.

With the above described processings performed, the device on the network is represented by an icon extremely similar to the outline of the main body and the information related to the functions (including monochrome/color information, etc.) and the number of currently spooled jobs are added thereto and displayed, so that the user can select an optimum device on the network with ease. Further, the user can grasp how the data is transferred between the selected input and output devices even after the processings are completed and can visually recognize the employed input and output devices and the timing of completion of the processings.

Further, when the PC connected to the network is shut down, this fact is sent to the management server. The management server decides whether or not the device connected to the PC is currently selected by the user. In the case where the device connected to the PC is selected by the user, and the following processings have already been started by the device, message is sent to the PC: "A user selects or uses the device connected to this computer. If the PC is shut down, the selection (use) of the device will be forcedly cancelled (ended). Do you shut down the PC?". Thus, in the case where the user selects a device connected to a different PC, simply selects it or has already started a processing by the device, this PC can be prevented from being shut down, so that the selection of the device can be prevented from being cancelled or a processing of the device can be prevented from being forcedly ended.

<Fourth Data Processing>

Figure 41:
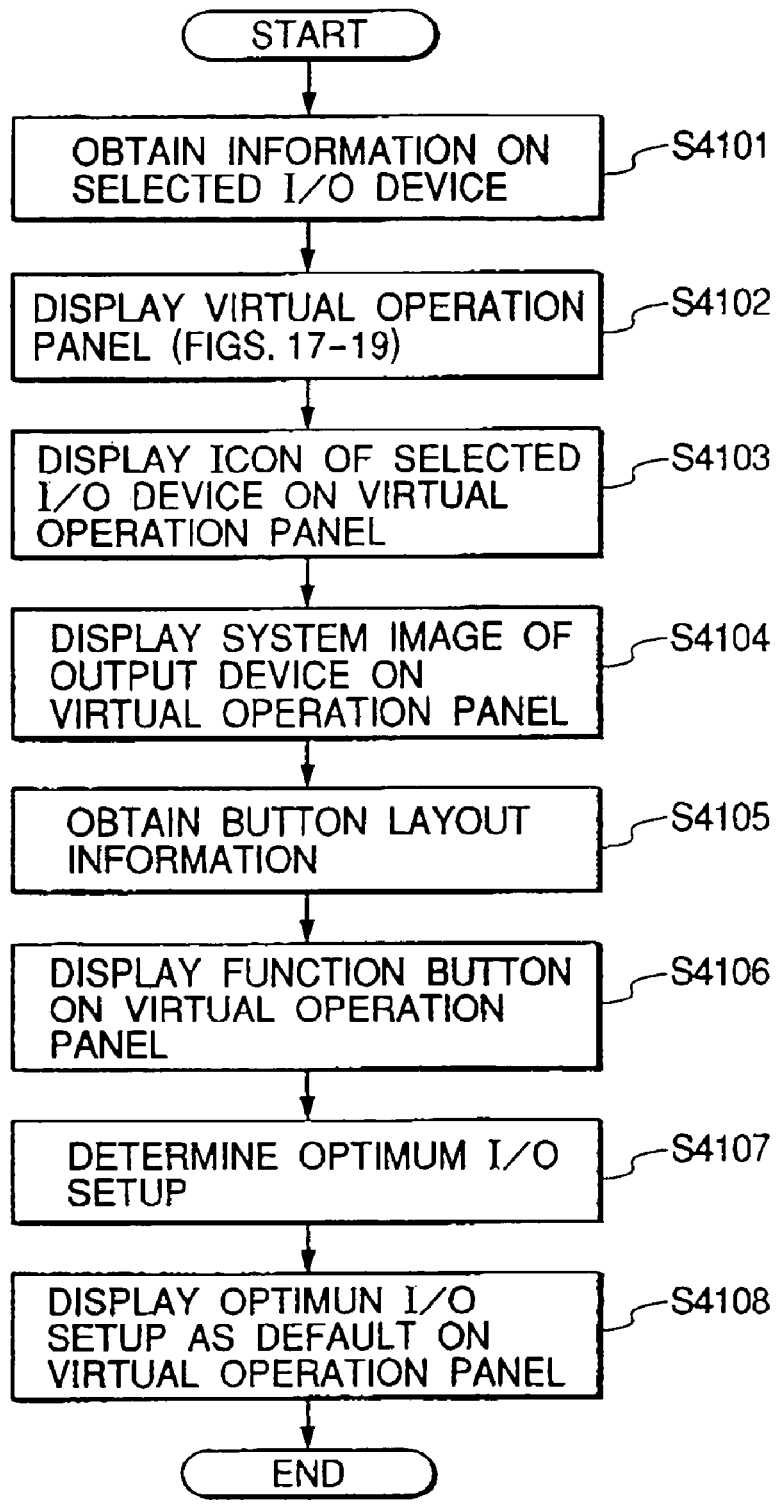
FIG. 41 is a flowchart showing an example of a fourth data processing procedure in the data processing apparatus according to the present information.

FIG. 41 is a flowchart showing one example of a fourth data processing in the data processor according to the present invention. For example, when the user drags and drops the icon 303c of the scanner down onto the icon 302f of the digital copying machine and the copying function is performed, the fourth data processing is executed in the step S3906 shown in FIG. 39. S4101 to S4108 denote respective steps.

First, in the step S4101, the information of selected input/output devices is obtained from the driver information of a device stored and controlled by its own apparatus, for example, stored and controlled in the hard disk 10 shown in FIG. 2, such as the device driver information shown in FIG. 15, and the resource file shown in FIG. 25, etc.

More specifically, based on the device driver information shown in FIG. 15 and the resource file shown in FIG. 25, etc., are obtained the resources (corresponding to icons 403a and 404a showing the input and output devices shown in FIGS. 17 to 19) of peculiar icons corresponding to the selected input and output devices which are extremely similar to the outlines of main bodies to be connected and which exhibit functions including monochrome/color information and the resource (equivalent to the system image MFI shown in FIGS. 17 to 19) of a system image MFI (including respective option device images) corresponding to the selected output device.

Next, in step S4102, the virtual operation panel shown in FIGS. 17 to 19 is displayed on a CRT 16. In step S4103, the icons 403a and 404a showing input and output devices corresponding to the selected input and output devices are displayed on the virtual operation panel thus displayed. Further, in step S4104, the system image MFI corresponding to the output device is displayed. This system image MFI indicates an image including an expanded function which can be set by the output device, that is to say, the image of the output device including an option device optionally mounted on the output device. In this case, an image including an expanded function which can be set not only by the output device but also by the input device, in other words, the image of the input device including an option device, for instance, an automatic original copy feeder ADF optionally mounted on a scanner, which is optionally mounted on the input device, may be designed to be displayed.

Next, in step S4105, setup function button layout information which is set by the editing window 2650 previously shown in FIG. 26 and stored in the hard disk 10 shown in FIG. 2 is acquired. In step S4106, the function buttons (see FIG. 17 to B1 to B8 in FIG. 19) are displayed on the virtual operation panel on the basis of the setup function button layout information.

Then, in step S4107, an optimum input/output setup (monochrome/color, density, image quality (resolution), paper size) is determined on the basis of the performance of the input device and the performance of the output device. For instance, in the case of the monochrome/color, when both the input and output devices are colored, the setup of color is determined. When one of them is monochromatic, the setup of monochrome is determined. In the case of resolution, half of the resolution of the output device is determined to be resolution.

Next, in step S4108, the optimum input and output setup is displayed on the virtual operation panel as default values (a slider 409 for setting density shown in FIGS. 17 to 19, a slider 410 for setting image quality and the color mode of an input image are set and displayed) to finish processings. In step S4108, an optimum input and output setup is also set to the property screen or window shown in FIG. 12.

Thus, since the optimum input and output setup of the selected input and output devices is set and displayed as the default values, even a user who is unaccustomed to the input and output setup (such as monochrome/color, density, image quality (resolution), paper size) can easily get an image with high quality suitable for the performance of the input and output devices.

Further, on the detailed setup window or screen displayed when the icons 403a and 404a showing the input and output devices are pressed, for instance, on the property window shown in FIG. 24, the user can perform an input and output setup in detail.

Still further, since an image including the mounting state of the option device of the selected output device is displayed on the virtual operation panel, the user can visually recognize the option device mounting states of the selected input and output devices, and can easily set up the option device even when he does not know the mounting state of the option device of the selected output device.

The resource file shown in FIG. 25 and the resource of the icon of each device are sent to each device from the management server every time they are updated, so that the resource showing the latest option function can be always provided. Even when a new device (including an option device) is added by a maker, a supervisor does not need to install the resource file in all client machines on the network only by installing the resource file in the management server. Then, an icon (system image) corresponding to the new device including the option device is displayed on all the client machines on the network.

<Fifth Data Processing>

Figure 42:
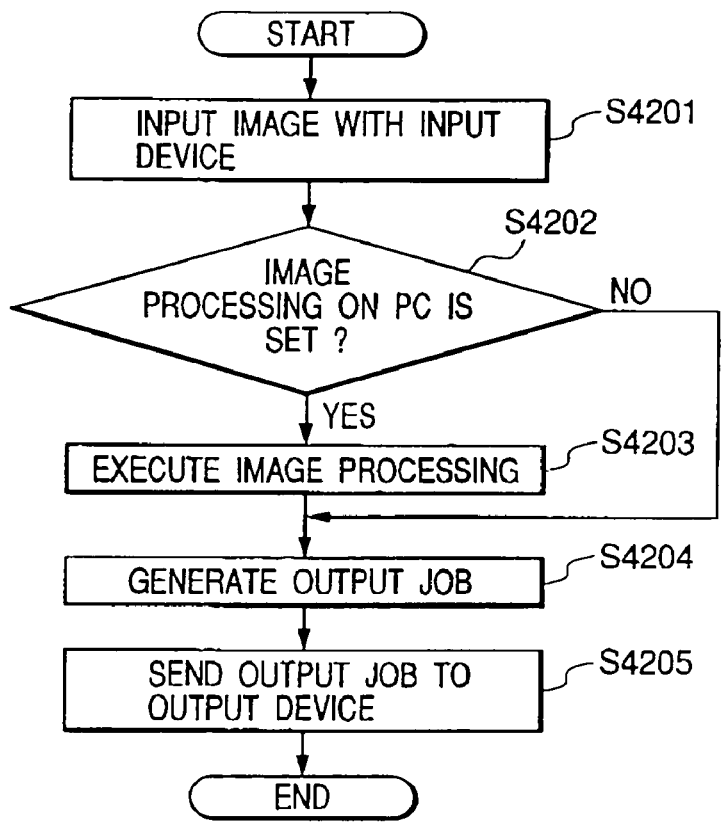
FIG. 42 is a flowchart showing an example of a fifth data processing procedure in the data processing apparatus according to the present invention.

FIG. 42 is a flowchart showing one example of a fifth data processing in the data processor according to the present invention. This data processing corresponds to the processing in the step S3908 shown in FIG. 39 performed, for instance, when the user drags and drops the icon 303c of the scanner down onto the icon 302f to perform the copying function. S4201 to S4205 designate respective steps.

First, in step S4201, the input device inputs an image in accordance with the setup of the virtual operation panel shown in FIGS. 17 to 19. Then, in step S4202, the button B7 shown in FIGS. 17 to 19 is pressed to decide whether or not the image processing of the PC side (according to the present embodiment, it is called a funny setup and includes two kinds of processings of an effect processing and a stamp processing) is carried out on the screen of FIG. 15 or FIG. 16. When it is decided that the image processing of the PC side is carried out, the step advances to step S4203. In the step S4203, the image processing is applied to the image inputted in the step S4201 on the basis of the setup inputted as described above on the screen of FIG. 15 or FIG. 16.

Next, in step S4204, an output format (including the layout of pages to be processed depending on the output device, double-sided printing, staples, etc.) is determined depending on the input and output setup set on the virtual operation panel. Then an output job is formed on the basis of the output format. In step S4205, the output job is transmitted to the output device. The steps S4202 to S4205 are carried out every time the data of one page is inputted.

Therefore, after the input and output devices are selected by the dragging and dropping operation, a simple operation in which the processing of the PC side and the processing of the output device side are set up on the virtual operation panel is merely performed, so that the image to which the processing of the PC side, which does not depend on the output device, as well as the image processing provided in the output device is applied, can be selected and outputted from the output device.

<Notice to User>

In the above described embodiment, although the output device performs the print processing on the basis of the setup inputted on the virtual operation panel shown in FIGS. 17 to 19, it should be noted that the present invention is not limited thereto, and, the resource information (the residual amount of paper and staple pins) or the like of the output device is got upon execution of the print processing to decide whether or not the print processing can be performed, and the user may be informed of the decided result. Now, the embodiment thereof will be described hereinafter.

Figure 43:
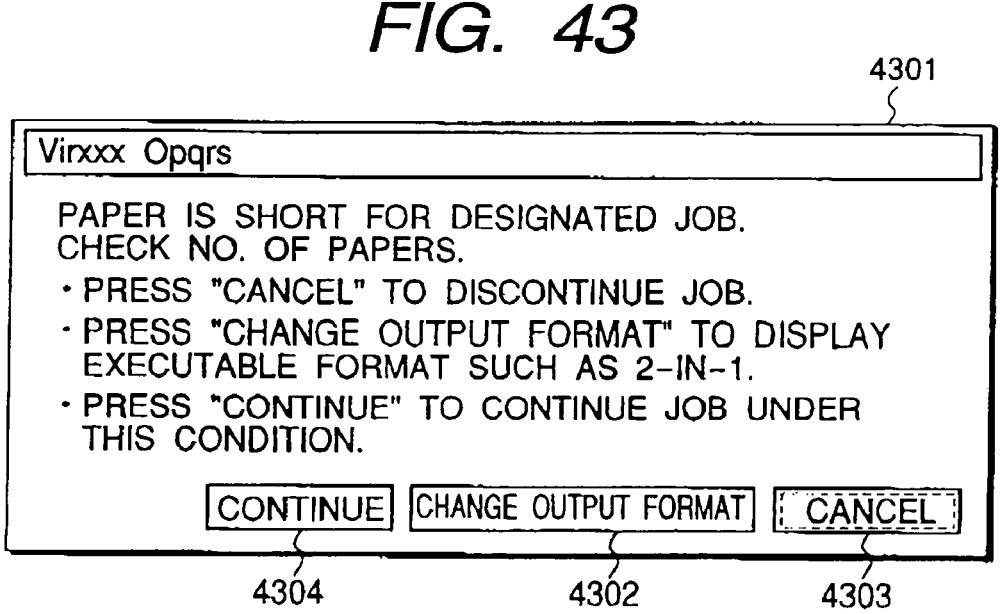
FIG. 43 shows an example of an alert message displayed on the CRT shown in FIG. 3.

FIG. 43 shows one example of an alarm message 4301 displayed on the CRT16. For instance, when the button 415 is pressed on the virtual operation panel shown in FIGS. 17 to 19 to perform a copying operation, if the number of sheets of paper accommodated in the output device is insufficient relative to the number of sheets required form the print processing, the alarm message will be displayed before the print processing is executed.

In FIG. 43, 4301 denotes an alarm message. 4302 denotes a button for stopping the print processing. When this button is pressed, a selection window of other output format which can be outputted (an output format selection window shown in FIG. 44 mentioned below) is displayed. 4303 denotes a cancel button. When this button is pressed, the print processing is stopped to return to a setup window such as the virtual operation panel shown in FIGS. 17 to 19. 4304 denotes a continue button for continuing the processing. When this button is pressed, the print processing is continued (forcedly continued).

Figure 44:
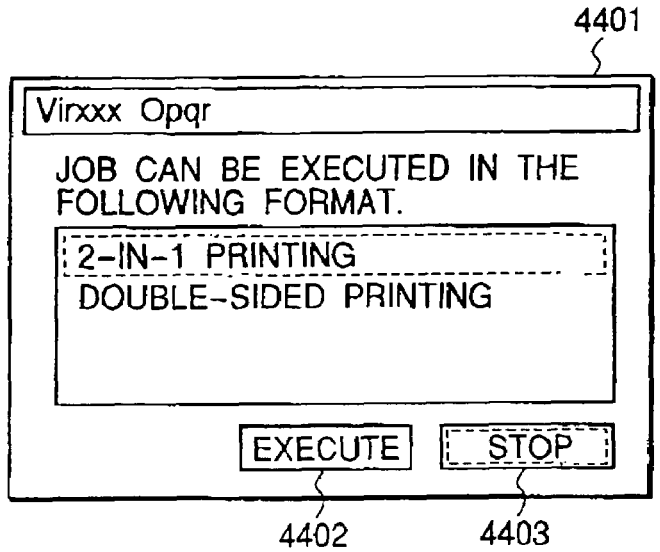
FIG. 44 shows an example of an output format selection window displayed on the CRT.

FIG. 44 is a view showing one example of the output format selection window displayed on the CRT16.

In FIG. 44, reference numeral 4401 denotes an output format selection window. The output format selection window is displayed when the button 4302 shown in FIG. 43 is pushed and the list of other output formats such as 2-in-1 printing, double-sided printing, etc. which can output the number of sheets of paper accommodated in the output device is displayed so as to be selected.

Reference numeral 4402 denotes an execute button. When the execute button is pressed, the print processing is performed in accordance with other output format thus selected. 4403 is a processing stop button. When the processing stop button 4403 is pressed, the print processing is stopped to return to a setup window, for instance, the virtual operation panel shown in FIGS. 17 to 19.

<Sixth Data Processing>

Figure 46:
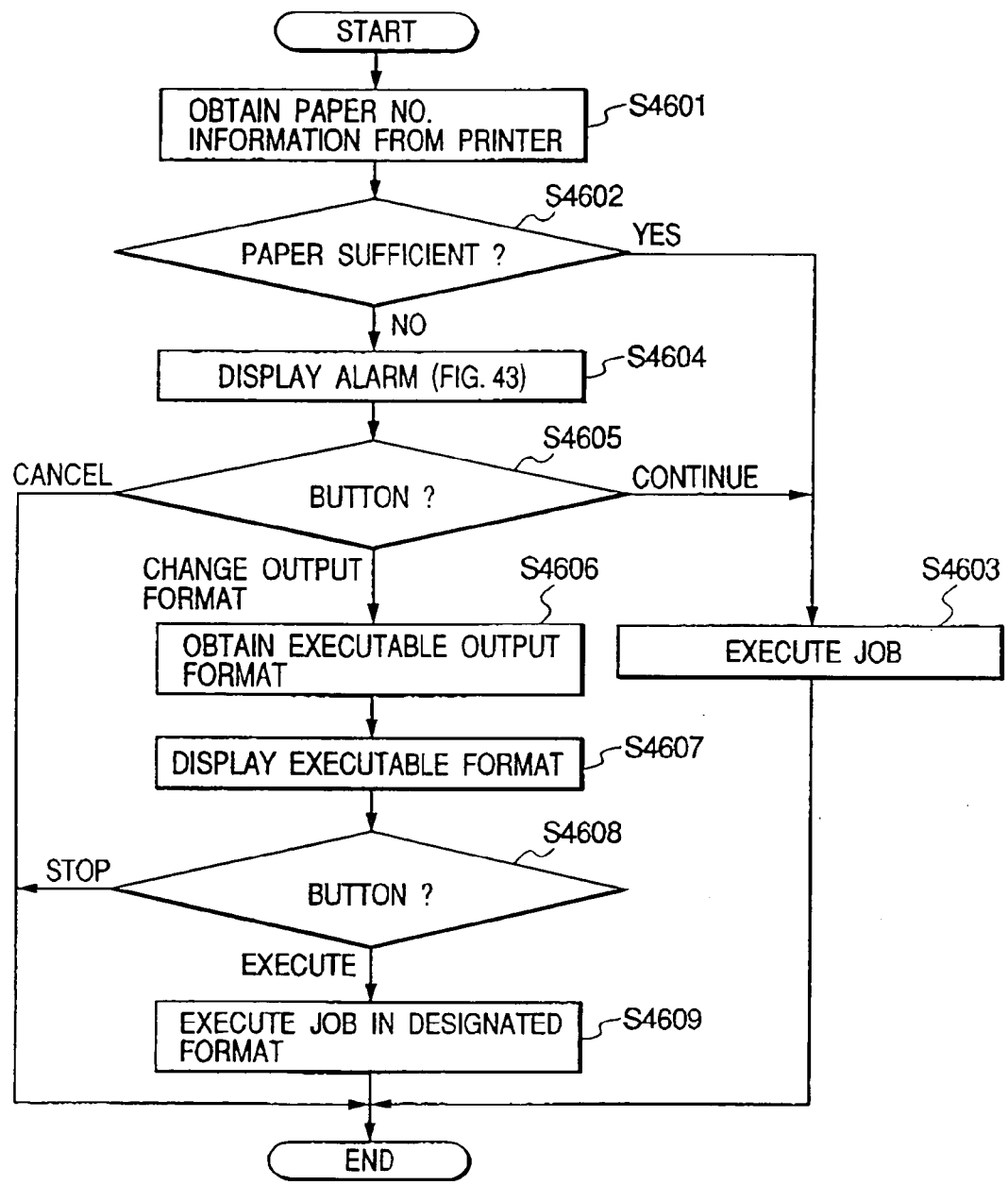
FIG. 46 is a flowchart showing an example of a sixth data processing procedure in the data processing apparatus according to the present invention.

FIG. 46 is a flowchart showing one example of a sixth data processing in the data processor according to the present invention. The sixth data processing is carried out when functions (copying function, printing function, etc.) for the print processing performed by the output device (printer) are executed. S4601 to S4609 designate respective steps.

First, in step S4601, paper or sheet number information is obtained from a specified printer. Then, in step S4602, it is decided whether or not the number of sheets of paper required for a print job designated on, for instance, the virtual operation panel shown in FIGS. 17 to 19 is accommodated in the printer (whether or not a processing condition is satisfied) on the basis of the paper number information thus obtained. When the required number of sheets is accommodated in the printer (when it is decided that the condition is satisfied), the print processing is carried out in step S4603.

On the other hand, in step S4602, when it is decided that the required number of sheets of paper is not accommodated in the printer (the processing condition is not satisfied), the alarm message 4301 shown in FIG. 43 is displayed in step S4604. Then, in step S4605, it is decided whether the button 4302 shown in FIG. 43 is pressed (the display of other output format which can be processed is instructed), the cancel button 4303 (instruct the print processing to stop) or the button 4304 is pressed (instruct the print processing to be continued).

When it is decided that the print processing is instructed to stop (when the button 4303 is pushed), the print processing is finished. Further, when it is decided that the print processing is instructed to be continued (when the button 4304 is pressed), the step advances to the step S4603 to perform the print processing.

Further, in the step S4605, when it is decided that other output format which can be processed is instructed to be displayed (when the button 4302 is pushed), the step advances to S4606.

In the step S4606, a different output format which can execute the print job instructed on the virtual operation panel or the like is obtained on the basis of the printer information previously got from the printer driver and the number of sheets of paper obtained in the step S4601. Then, in step S4607, the output format selection window 4401 shown in FIG. 44 on which the different output format thus instructed is represented is displayed.

Then, in step S4608, it is decided whether the user presses the execute button 4402 shown in FIG. 44 (the change of an output format is instructed) or the processing stop button 4403 is pressed (instruct the print processing to stop). When it is decided that the print processing is instructed to stop (the button 4403 is pushed), the print processing is finished. When it is decided that the output format is instructed to be changed (when the button 4402 is pressed), the print processing is performed on the basis of the output format thus instructed in step S4609, in other words, on the basis of the output format selected on the output format selection window 4401 shown in FIG. 44.

As a result of these processings, when it is anticipated that the print sheets become insufficient during a printing operation, an alarm message is displayed. Therefore, a risk that the print sheets become insufficient during the printing operation can be prevented beforehand and the user can supply printsheets to the output device before the print processing is executed.

According to the present embodiment (especially, in the steps S4601 and S4602 in FIG. 46), although the paper number information is obtained from the specified printer and it is decided whether or not the number of sheets of paper necessary for performing the designated print processing is accommodated in the printer on the basis of the paper number information thus obtained, it should be noted that the present invention is not limited thereto, and the paper number information and paper information used in a spooled job may be got from the designated printer in the step S4601 shown in FIG. 46 and it may be decided whether or not the number of sheets of paper capable of executing the print processing designated from the obtained paper number information is accommodated in the printer by considering the paper information employed in the spooled job in the step S4602. In this case, the display of "the sheets of paper are reserved for printing" may be added. Thus, it can be precisely estimated a risk that the sheets of paper become insufficient during the print processing by considering the spooled job.

Further, other output formats (for instance, double-sided printing, 2-in-1, etc.) under which the print processing designated by the user can be performed can be reported to the user, so that the user can select other output formats on the reported window without returning to the setup window. Therefore, since a troublesome operation to return to the setup window at each time is not required, even a user unaccustomed to the operation can readily change the output format to a different output format and can perform the designated print processing without supplying the print sheets to the printer (a substitute print processing can be performed).

According to the present embodiment, although the residual amount of print paper of the output device is obtained upon execution of the print processing to decide whether or not the print processing is performed, needless to say, the present invention is not limited thereto, and the residual amount of the staple pins of the output device may be obtained to decide whether or not the print processing is performed when a stapling process is set up in the designated print processing and to inform the user thereof through an alarm message such as the alarm message 4401 shown in FIG. 44.

Also, in this case, the user can instruct the change of the output format. The user can select other output format in which the designated print processing can be performed, for example, a sorting process with one staple punched or with no staple for decreasing the positions of staples by an output format selection window such as the output format selection window 4401 shown in FIG. 44 and can change the output format to perform the print processing.

Thus, when it is anticipated that the staples become insufficient during a processing, an alarm message is displayed, so that a problem that the staples become insufficient during the processing can be prevented beforehand, and the user can supply staples to the output device before the execution of the processing.

Further, the user can be informed of other output formats under which the print processing with staples can be performed (for instance, one staple punching with the small amount of usage of staples, double-sided printing, 2-in-1, sorting process with no staple (easily stapled upon manual subsequent stapling, etc.)), so that the user can select the output formats on the informed window without returning to the setup window and a troublesome operation to return to the setup window at each time is not needed. Therefore, a user unaccustomed to the operation can change the output format to another output format with ease and the print processing can be performed without supplying staple pins to the printer (a substitute processing can be performed).

In this case, the information of staple pins and the information of staple pins used in the spooled job may be obtained from the designated printer to decide whether or not the number of staple pins capable of performing the print processing as designated is accommodated in the printer from the information of the staple pins thus obtained by considering the staple pins employed in the spooled job.

Thus, it can be precisely anticipated that the staple pins become insufficient during the print processing by taking the spooled job into consideration.

<Seventh Data Processing>

In the above described embodiment, although the resource information (paper, the residual amount of staple pins) of the output device or the like is got upon execution of the print processing to decide whether or not the print processing can be performed and inform the user of the result, it should be noted that the present invention is not limited thereto and the resource information (residual amount of toner) of the output device or the like may be obtained upon execution of the print processing to decide whether or not the print processing can be performed and inform the user of the result. The embodiment thereof will be described hereinbelow.

Figure 45:
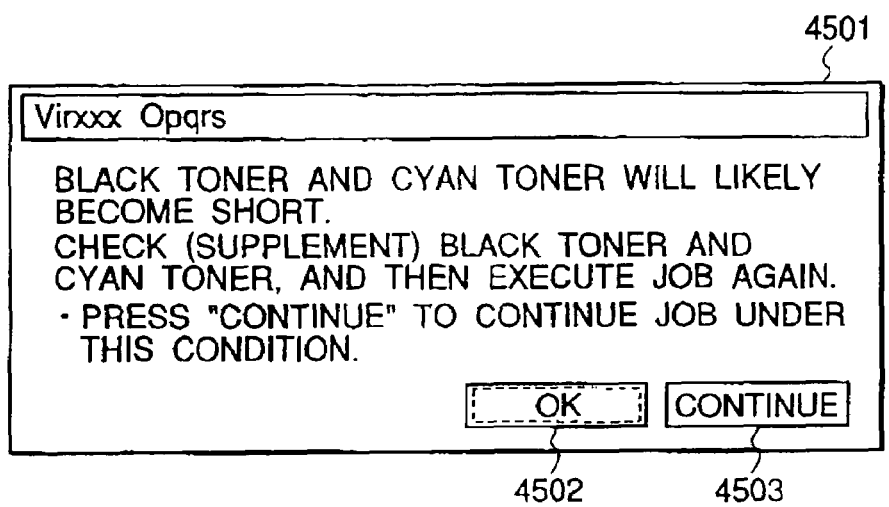
FIG. 45 shows an alert message displayed on the CRT shown in FIG. 3.

FIG. 45 is a view showing one example of an alarm message displayed on the CRT 16. The alarm message is displayed, for example, before the print processing is executed, when the button 415 is pressed on the virtual operation panel illustrated in FIGS. 17 to 19 to perform the copying function and the residual amount of toner housed in the output device is insufficient relative to the amount of toner necessary for the print job designated by the user.

Referring to FIG. 45, reference numeral 4501 denotes an alarm message, In the alarm message 4501, the toner of all colors which is expected to be insufficient is displayed. For example, when it is anticipated that black toner and cyan toner are not sufficient, there is displayed a message of "Black toner and cyan toner are likely to become insufficient. Please recognize (supply) the amount of black toner and cyan toner, and restart a processing".

Reference numeral 4502 denotes an OK button. When this button is pushed, the print processing is stopped and a display is returned to the setup window, for instance, the virtual operation panel shown in FIGS. 17 to 19. Reference numeral 4503 denotes a continue button. When this button is pressed, the print processing is continued (forcedly continued).

Figure 47:
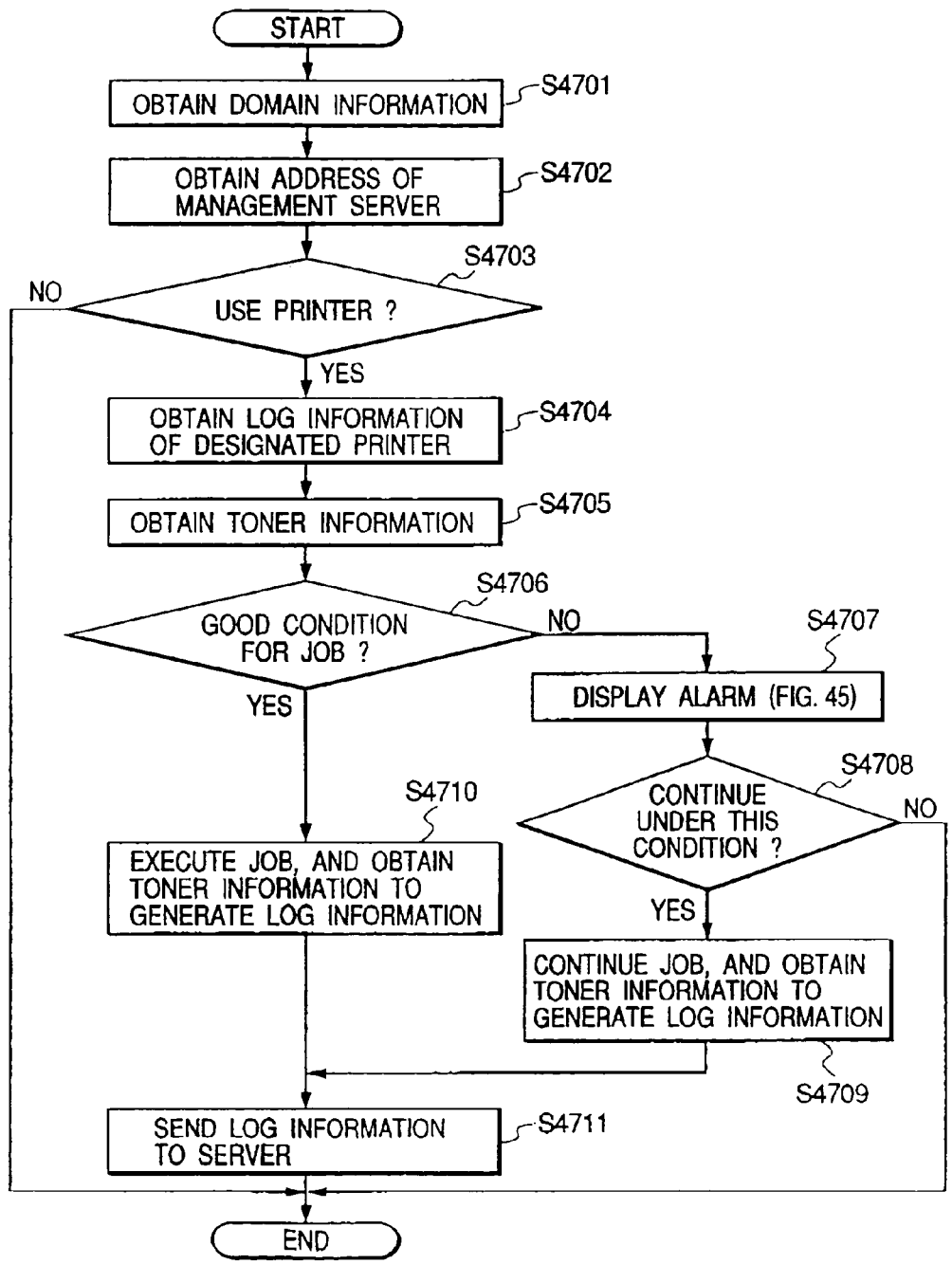
FIG. 47 is a flowchart showing an example of a seventh data processing procedure in the data processing apparatus according to the present invention.

FIG. 47 is a flowchart showing one example of a seventh data processing in the data processor according to the present invention. S4701 to S4711 show respective steps. First, in the step S4701, domain information to which its own apparatus belongs is obtained. In the step S4702, the address of a management server (any one of the PCs in the network shown in FIG. 1 is registered as a management server) is acquired.

Next, in the step S4703, it is decided whether or not a function employing the printer (for instance, a copying process, a print processing, etc.) is instructed. When it is judged or decided that the function using the printer is not instructed, the processing is ended as it is.

On the other hand, when it is decided that the function using the printer is instructed in the step S4703, the log of the designated printer (any of the printer log information parts 2872-1 to 2872-M of the printer log management information shown in FIG. 28) is obtained from the management server in step S4704. More specifically, when the management server is informed as to which printer is employed (designated printer), the management server returns the printer log information part of a corresponding printer (log information) among the printer log information parts 2872-1 to 2872-M of the printer log management information shown in FIG. 28. Then, in the step S4705, toner information (the residual amount of toner) or the like is got from the designated printer.

Next, in the step S4706, it is decided whether or not a designated processing (job) satisfies required conditions on the basis of the log information obtained in the step S4704 and the toner information of the printer obtained in the step S4705. More specifically stated, the log information acquired from the management server is analyzed to calculate or expect the amount of usage of toner when a processing similar to a currently designated processing (a processing decided to be similar thereto based on kinds of applications, kinds of scanners (high speed/low speed, color, monochrome), the total number of printed pages, paper size, color/monochrome, single/double-sided, etc.) is performed. Then, the expected amount of usage of toner is compared with the residual amount of toner obtained from the printer to decide whether or not the designated processing satisfies required conditions (the processing is executable).

When it is decided that the designated processing satisfies the required conditions, the instructed processing is performed in the step S4710, and further, the toner information or the like is obtained from the printer to generate the log information (printer name, input information, the total number of printed pages, paper size, color/monochrome, single/double-sided, the amount of usage of toner (for each color), etc.) on the basis of the toner information thus obtained.

Then, in the step S4711, the generated log information (printer name, input information, the total number of printed pages, paper size, color/monochrome, single/double sided, the amount of usage of toner (for each color), etc.) is sent to the management server to finish the processing or job.

On the other hand, when it is decided that the designated processing or job does not satisfy the required conditions, the alarm message shown in FIG. 45 is displayed in the step S4707. In the step S4708, it is decided whether or not the processing is instructed to be continued as it is (whether or not the continue button 4503 is pressed).

In the step S4708, when it is decided that the processing is instructed to be continued as it is, the processing is continued in the step S4709, and further, the toner information or the like is got from the printer to generate the log information (printer name, input information, the total number of printed pages, paper size, color/monochrome, single/double-sided, the amount of usage of toner (for each color), etc.) on the basis of the toner information thus obtained.

On the other hand, in the step S4708, when it is decided that the processing is instructed not to be continued (the OK button 1102 is pressed), the processing is finished.

According to these processings, when it is anticipated that the toner is likely to be insufficient during the print processing, an alarm message is displayed, so that the toner is prevented beforehand from being insufficient during the print processing and the user can supply the toner to the output device before the processing is carried out.

Further, the user is informed of other output formats (for instance, printing in an economy mode with the small amount of usage of toner, printing by switching to a monochrome mode, 2-in-1 printing, etc.) under which the print processing designated by the user can be performed on a selection window similar to the output format selection window 4401 shown in FIG. 44, so that the user can select other output formats on the informed window without returning to the setup window. Therefore, since the user does not need to perform a troublesome operation for returning to the setup window at each time, even a user unused to the operation can change the current output format to another output format with ease and perform the designated print processing without supplying the toner to the printer (a substitute print processing can be performed).

Still further, when it is decided that the designated print processing does not satisfy required conditions, the user is informed of other printers by which the print processing designated by the user can be performed, on a selection window similar to the output format selection window 4401 shown in FIG. 44, so that the user can select a proper printer on the informed window without returning to the setup window. Therefore, a troublesome operation for returning to the setup window at each time is not required; hence even a user unaccustomed to the operation can readily change the printer to another printer and perform the designated print processing without supplying the toner to the printer.

Further, upon access to the printer, the expected end time of a job spooled in the printer may be obtained from the printer, so that an alarm message can be displayed in the case where the user must wait for a considerably long time until the print processing is performed because of other executable jobs spooled in the printer.

According to the present embodiment, although the residual amount of toner of the output device is acquired upon execution of the print processing to decide whether or not the print processing can be carried out and inform the user of the result, needless to say, ink, ink ribbon, etc. as well as the toner may be employed.

Still further, according to the present embodiment, although, upon print processing, the printer log of the printer is obtained from the management server through the network and the resource information (residual amount of toner) of the printer is obtained from the printer to decide whether or not the print processing is carried out, it should be noted that, when a PC standing alone stores the printer log in the hard disk of its own apparatus to perform a printer processing upon completion of the print processing relative to a printer connected to the PC, the printer log stored in the hard disk of its own apparatus and the resource information (residual amount of toner) etc. of the printer may be acquired from the printer to decide whether or not the print processing can be performed.

Thus, even in the printer connected to the PC standing alone, the toner can be prevented from being insufficient during the print processing and the user can previously supply the toner to the output device before the processing is executed.

<Eighth Data Processing>

According to the above described embodiment, although the printer log of the printer is got from the management server and the resource information of the printer (the amount of residual toner), etc. of the printer is got from the printer, upon print processing, to decide whether or not the print processing can be carried out and to inform the user of the result thereof, it should be recognized that the present invention is not limited thereto, and the log information of respective processings (print processing, facsimile transmission/reception processing, image read processing, etc.) controlled by the management server may be obtained and displayed in accordance with the instruction of the user.

Now, the embodiment thereof will be described below.

Figure 48:
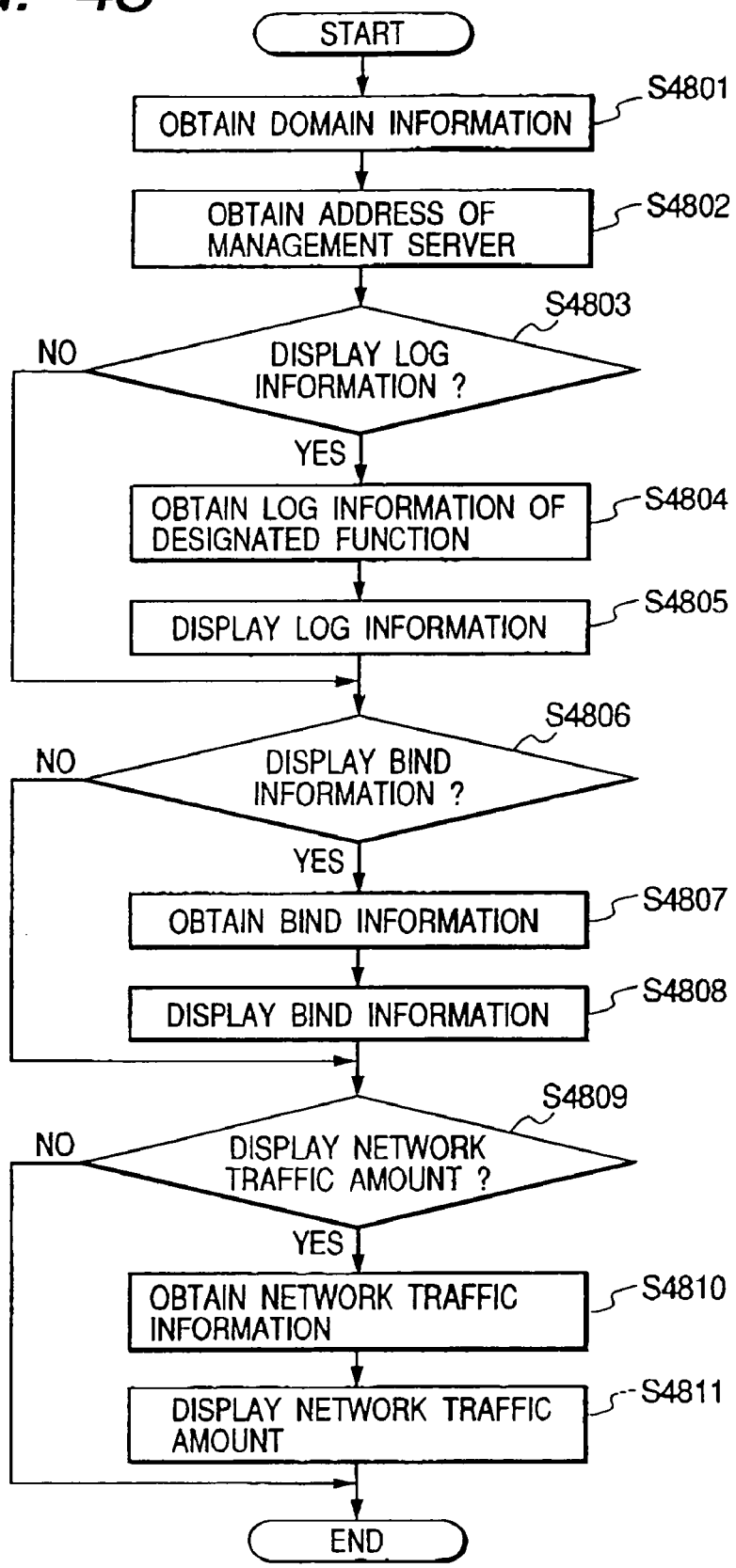
FIG. 48 is a flowchart showing an example of an eighth data processing procedure in the data processing apparatus according to the present invention.

FIG. 48 is a flowchart showing one example of an eighth data processing in the data processor according to the present invention. S4801 to S4811 denote respective steps. First, in the step S4801, domain information to which its own apparatus belongs is obtained. In the step S4802, the address of a management server is obtained (any one of the PCs of the network shown in FIG. 1 is registered as the management server).

Then, in the step S4803, it is decided whether or not log information is instructed to be displayed (an instruction can be made, for instance, for each of printing function, facsimile transmission/reception function, image reading function). When it is decided that the display of the log information is not instructed, the processing of the step S4803 advances to that of the step S4806. On the other hand, in the step S4803, when it is decided that the log information is instructed to be displayed, the log information (see FIGS. 29 to 32) of the instructed function is acquired from the management server in step S4804. Then, in the step S4805, the log information is displayed in a form (list display, graph display, etc.) desired by the user. This displaying manner is designated when the log information is instructed to be displayed.

Then, in the step S4806 it is decided whether or not binding or bind information is instructed to be displayed (an instruction can be made, for instance, for each of a copying function and a facsimile transmission reception function). When it is decided that binding or bind information is not instructed to be displayed, the processing of the step S4806 advances to that of the step S4809.

On the other hand, in the step S4806, when it is decided that binding or bind information is instructed to be displayed, the bind information (not shown) of the instructed function is acquired from the management server in step S4807. In the step S4808, the bind information is displayed in a form desired by the user (list display, graph display, etc.). This display form is instructed when the bind information is instructed to be displayed.

Next, in the step S4809, it is decided whether or not network traffic is instructed to be displayed. When it is decided or judged that the instruction of the network traffic is not executed, the processing is finished as it is.

On the other hand, in the step 4909, when it is decided that the network traffic is instructed to be displayed, network traffic information (not shown) is got from the management server in the step 4810. In the step S4811, the network traffic information is displayed in a form desired by the user (list display, graph display, etc.). This display form is designated when the network traffic is instructed to be displayed.

According to these processings, the user can readily grasp the combination of respective devices in the respective functions, frequency of usage, time of usage, for example, the combination of a scanner and a printer in the case of a copying function, etc. Further, the management server always monitors the network traffic.

<Combination>

In the above described embodiment, although the function processing that an image simply inputted from the scanner is printed by the printer, the combined machine, etc. by dragging and dropping the icons of the virtually displayed scanner and the printer or the scanner and the combined machine, etc., it should be noted that the present invention is not limited thereto, and an image inputted from the scanner may be combined with a data file stored in its own apparatus and other PCs on the network and the combination thereof may be outputted and image data inputted from two scanners may be combined together and the combination thereof may be outputted. Now, the embodiment thereof will be described below.

Figure 49:
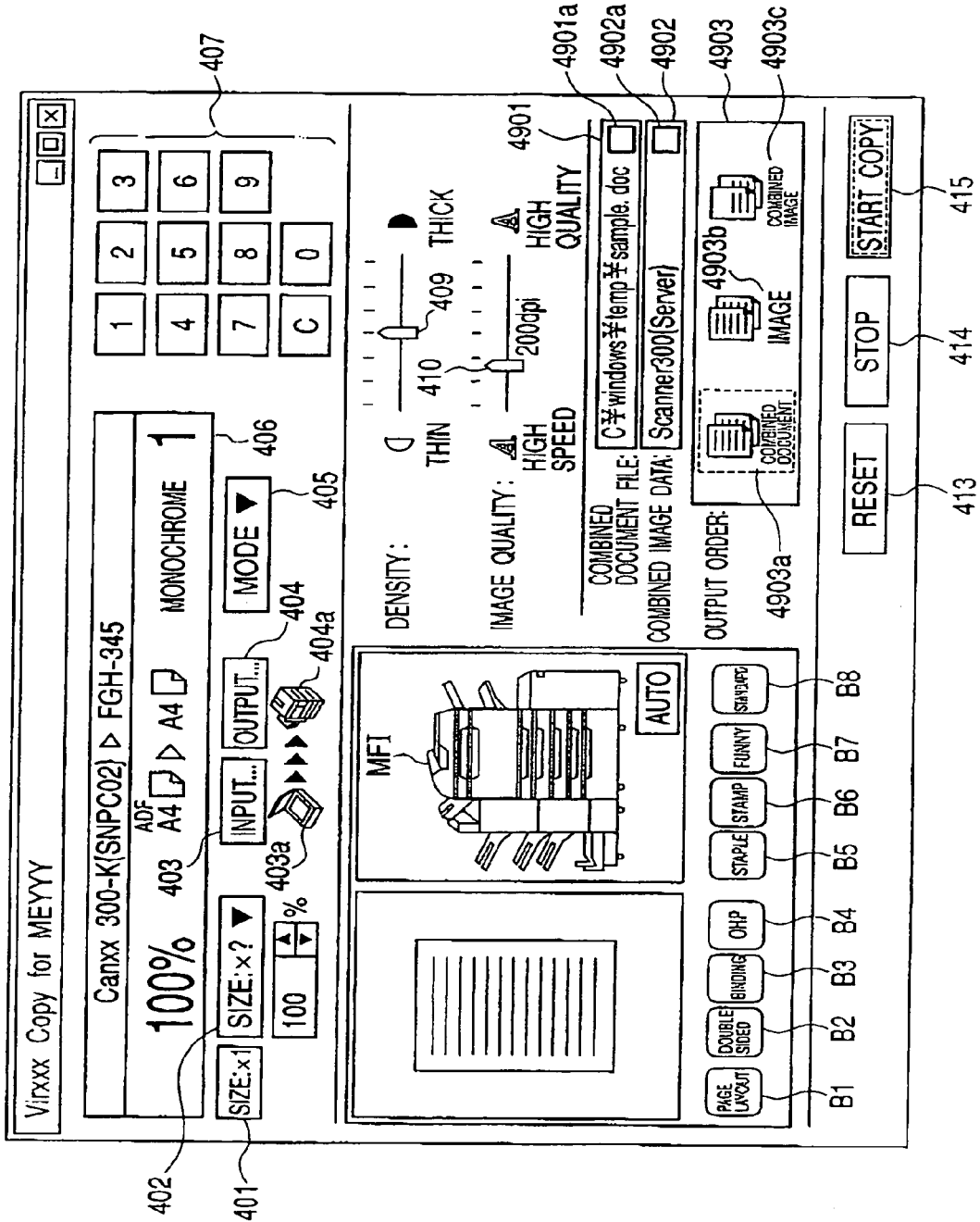
FIG. 49 shows an example of a virtual operation panel displayed on the CRT shown in FIG. 3.

FIG. 49 is a view showing one example of the virtual operation panel displayed on the CRT 16. When the scanner icon dragged with the icon 302f effectively displayed is dropped down onto the icon 302f, the device driver information obtained from the digital copying machine 118 corresponding to the icon 302f and stored on the hard disk 10 or the PMEM 3 is referred to display an image by which the digital copying machine 118 and an option device connected thereto can be recognized on the CRT16. In this connection, items the same as those shown in FIG. 12 are designated by the same reference numerals as those in FIG. 12.

Referring to FIG. 49, reference numeral 4901 denotes a combined document file designating area. In this area, the user designates a file connected to an image inputted from an input device corresponding to an icon 403a (a document file, an image file, etc. stored in its own apparatus or stored as a shared file in other communicable PCs). When the file is not designated, "not designated" is displayed in the combined document file designating area 4901, so that an image inputted from the input device corresponding to the icon 403a is not combined with a file. Reference numeral 4901a denotes a button. When this button is pressed, a combined document file selection window shown in FIG. 50 described below is displayed.

Reference numeral 4902 denotes a combined image data designating area in which other input device for inputting image data to be combined with an image inputted from the input device corresponding to the icon 403*a* is designated. When other input device is not designated, "not designated" is displayed in the combined image data designating area 4902, so that the image inputted from the input device corresponding to the icon 403*a* is not combined with a file. 4902*a* denotes a button. When this button is pressed, a combined image data selection window shown in FIG. 51 described below is displayed.

Reference numeral 4903 denotes an output order display area. In this area, an icon (a combined document 4903*a*) showing a file designated in the combined document file designating area 4901, an icon (an image 4903*b*) showing an image inputted from an input device corresponding to the icon 403*a*, and an icon (a combined image 4903*c*) showing an image inputted from an input device designated in the combined image data designating area 4902 are displayed. The images and documents are outputted in an order in which they are displayed (successively from the left side). Specifically, in this case, is illustrated an example in which the image inputted from the input device corresponding to the icon 403*a* is combined with the file designated in the combined document file designating area 4901, and further, the image inputted from the input device designated in the combined image data designating area 4902 is sequentially combined together and the combined images are outputted.

The combined order of the combined document 4903*a*, the image 4903*b* and the combined image 4903*c* can be changed by the user dragging them with the mouse 13 shown in FIG. 2.

Further, the combined document 4903*a* and the combined image 4903*c* are not displayed when the combined document file in the combined document file designating area 4901 and the combined image data in the combined image data designating area 4902 are not designated. For instance, when the scanner icon is dragged, while the icon 302*f* shown in FIG. 16 is effectively displayed, and is dropped down onto icon 302*f* the virtual operation panel as shown in FIG. 49 is displayed. At this time, only the icon of the image 4903*b* is displayed in the output order display area. When a file is designated in the combined document file designating area 4901, the icon of the combined document 4903*a* is displayed in the right side of the icon of the image 4903*b*. Subsequently, when an input device is designated in the combined image data designating area 4902, the icon of the combined image 4903*c* is displayed in the right side of the icon of the combined document 4903*a*.

Figure 50:
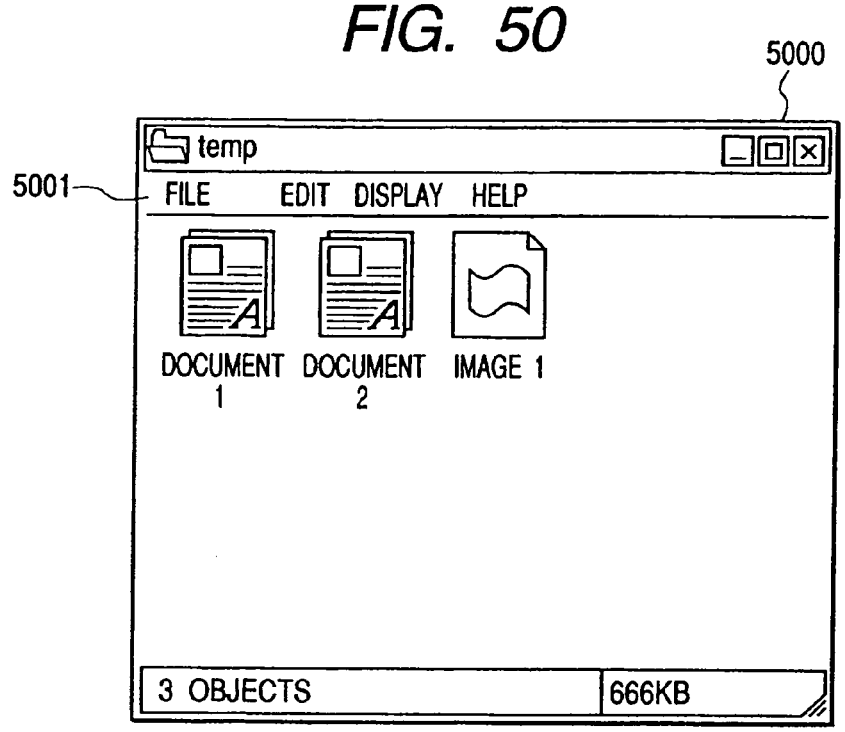
FIG. 50 shows an example of a combination document selection window displayed on the CRT shown in FIG. 3 in response to an icon instruction to a button displayed on a virtual operation screen on the CRT.

FIG. 50 is a view showing one example of a combined document selection window displayed upon pressing the button 4901*a* displayed on the virtual operation panel displayed on the CRT 16. In FIG. 50, reference numeral 5000 denotes a combined document selection window. This window displays files (document 1, document 2, image 1) in a directory previously set up as a combined document directory. Here, the document 1 and the document 2 indicate document files and the image file 1 indicates an image file. When the user uses the mouse 13 to select any one of the document 1, the document 2 and the image 1, the combined document selection window 5000 is closed and the selected file is displayed in a full-path manner in the combined document file designating area 4901 shown in FIG. 49.

Further, when file 5001 is selected, a pull-down menu (not shown) is displayed. Then, when the user selects "change combined document directory" in the menu, the combined document directory can be changed. Further, when the user selects "refer to network" in the network, the device map shown in FIG. 16 is displayed, so that a shared file on other PCs can be also selected therefrom.

Figure 51:
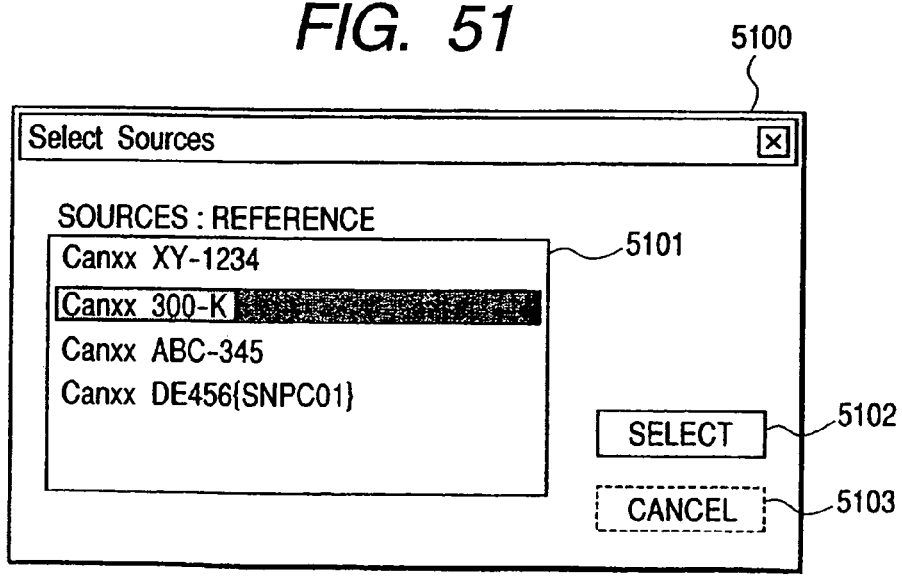
FIG. 51 shows an example of a combination document selection window displayed on the CRT shown in FIG. 3 in response to an icon instruction to a button displayed on a virtual operation screen on the CRT.

FIG. 51 shows one example of a combined image data selection window displayed when the button 4902*a* is displayed on the virtual operation panel shown in FIG. 49. In FIG. 51, reference numeral 5100 denotes a combined image data selection window 51. This window displays the name of a shared input device in the network on a selection display area 5101. Reference numeral 5102 denotes a select button. After any one of the input devices displayed in the selection display area 5101 is selected by the mouse 13, when the select button is pressed, the combined image data selection window 5100 is closed and the name of the selected input device is displayed in the combined image data designating area 4902 shown in FIG. 49. Reference numeral 5103 denotes a cancel button. When the cancel button 5103 is pressed, after the selection of the selection display area 5101 is cancelled, the combined image data selection window 5100 is closed. Further, reference numeral 5104 denotes a reference menu. When the menu is instructed by the mouse 13, the device map shown in FIG. 16 is displayed, so that the user can select the input device from this window or screen.

<Ninth Data Processing>

At this time, while the device map shown in FIG. 16 is displayed, when the prescribed keys such as "Ctrl" and "Alt" keys of the keyboard 12 shown in FIG. 2 are simultaneously pushed down, the icon of an input device with a function equal to that of the already selected input device (the input device corresponding to the icon 403*a* in FIG. 49) is displayed in a different manner. For example, the icon may be flashed and displayed.

Further, on the device map shown in FIG. 16, in order to prevent the already selected input device (the input device corresponding to the icon 403*a* shown in FIG. 49) from being repeatedly selected at the same time, the icon of the already selected input device may be displayed, for instance, in grey so that the icon cannot be selected.

Figure 52:
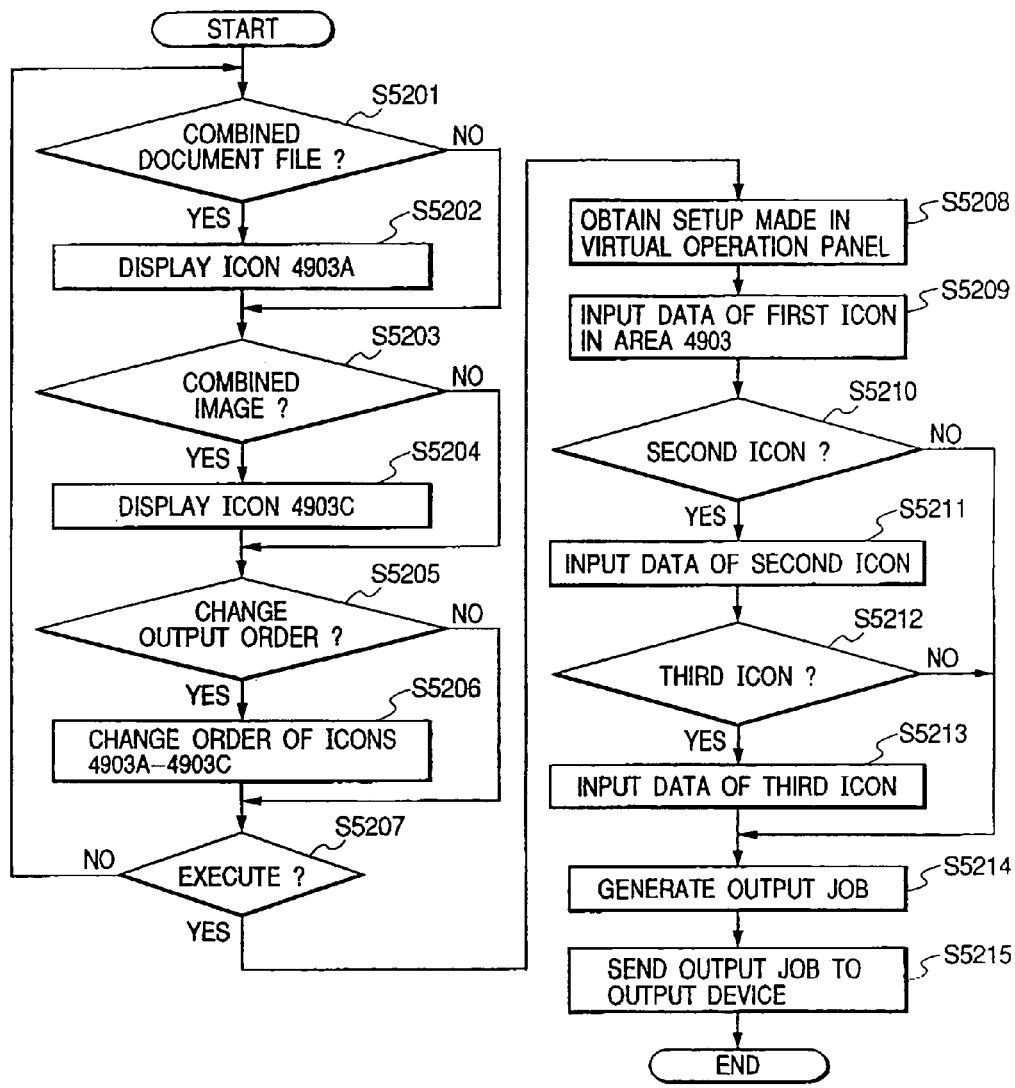
FIG. 52 is a flowchart showing an example of a ninth data processing procedure in the data processing apparatus according to the present invention.

FIG. 52 is a flowchart showing one example of a ninth data processing in the data processor according to the present invention. In the ninth data processing, for instance, when the user drags and drops the icon 303*c* of the scanner down onto the icon 302*f* to perform a copying function, the processing is performed in the step S3908 shown in FIG. 39. S5201 to S5215 designate respective steps.

First, in the step S5201, it is decided whether or not the combined document file is designated in the combined document file designating area 4901 on the virtual operation panel. When it is decided that the combined document is not designated, the processing of the step directly advances to the step S5203. On the other hand, when it is decided that the combined document is designated, the icon of the combined document 4903*a* is displayed (put leftward) in the output order display area 4903 in the step S5202.

Then, in the step S5203, it is decided whether or not the combined image is designated in the combined image data designating area 4902 on the virtual operation panel. When it is decided that the combined image is not designated, the processing of the step S5203 directly advances to the step S5205. On the contrary, when it is decided that the combined image is designated, the icon of the combined image 4903*c* is displayed (put leftward) in the output order display area 4903 in the step S5204.

Next, in the step S5205, it is decided whether or not the change of the output order is instructed in the output order display area 4903 on the virtual operation panel. When it is decided that the change of the output order is not instructed, the processing of the step S5205 directly moves to the step S5207. On the other hand, when it is decided that the change of the output order is instructed, the display order of the icons (the image 4903*b*, the combined document 4903*a*, the combined image 4903*c*) in the output order display area 4903 is changed in accordance with the instruction to change the output order in the step S5206.

Then, in the step S5207, it is decided whether or not the start of a copying operation is instructed to be executed (whether or not a copy start button 415 on the virtual operation panel is pressed). When it is decided that the execution of the copying operation is not instructed (when the button 415 is not pressed), the processing of the step S5207 returns to the step S5201. On the other hand, when it is decided that the start of the copying operation is instructed to be executed (when the button 415 is pressed), a setup inputted on the virtual operation window is obtained in the step S5208. In the step S5209, a first designated input (an input corresponding to a first icon displayed in the left side in the output order display area 4903) is executed.

Then, in the step S5210, it is decided whether or not a second input is designated in the output order display area 4903 (a second icon displayed in the left side). When it is decided that the second icon is not designated, the step advances to the step S5214. On the other hand, when it is decided that the second input is designated, a second designated input in the output order display area 4903 (an input corresponding to a second icon displayed in the left side) in the step S5211 is executed.

Then, in the step S5212, it is decided whether or not a third input is designated in the output order display area 4903 (a third icon displayed in the left side). When it is decided that the third input is not designated, the step advances to the step S5214. On the other hand, when it is decided that the third input is designated, a third designated input in the output order display area 4903 (an input corresponding to a third icon displayed in the left side) in step S5213 is executed.

Next, in the step S5214, the first to the third inputs are successively combined together to determine an output format (including layout of processed pages depending on the output device, double-sided printing, staples, etc,) on the basis of the input and output setup set on the virtual operation panel and to generate an output job on the basis of the output format. In the step S5215, the output job is sent to the output device to finish the processing. In this case, the job is generated in the step S5214 and the job is transmitted in the step S5215 every time the data of one page to be outputted is inputted. However, the above described processes may be carried out after the data of plural pages is stored in a memory.

According to the above mentioned processing, plural input sources and the output order thereof are designated to output information, so that the information inputted from the plurality of input sources desired by the user can be outputted by the output devices combined and selected in accordance with an order desired by the user. Therefore, an image obtained by combining a document file, an image file, etc. stored in its own apparatus or stored as a shared file in other communicable PCs with an image read from a scanner can be outputted from a selected output device in a desired output format such as double-sided printing, 2-in-1 printing, etc.

Further, combined images read by two scanners with different functions, for instance, a color scanner and a monochrome high speed scanner can be outputted from the output device selected based on a desired output format such as double-sided printing, 2-in-1 printing, etc.

Still further, the combination of images read from two scanners having equal functions is outputted from the selected output device in a desired output format, for example, double-sided printing, 2-in-1 printing, etc. Therefore, in the case where two sheets of original copies are read, even when a scanner having an automatic original copy feeder (ADF) or the like is not employed, plural scanners (in the present embodiment, the two scanners are employed, however, three scanners may be used) may read the original copies one by one. Accordingly, two sheets of original copies can be read without replacing one original copy by another original copy.

In addition, when the information inputted from plural input sources (three input sources are used in the present embodiment, however, four or more input sources may be used) are combined together in accordance with a designated order and the combined information is outputted, the information can be outputted from the selected output device in a desired output format such as double-sided printing, 2-in-1 printing, etc. by attaching serial page numbers thereto, irrespective of the input sources.

Furthermore, in the above described embodiment, although the information inputted from the plurality of input sources is combined together in accordance with the designated order and the combined information is outputted, it should be noted that the present invention is not limited thereto, and an application program related to an image processing or the like started by its own apparatus may be designated and the information inputted from the plurality of input sources may be combined together in accordance with the designated order and the combined information may be fetched to the application program started by its own apparatus.

Thus, only the input sources and the combination order may be designated without performing a conventional troublesome operation that respective input information is individually inputted, and then, they are combined together, so that the combined information obtained in such a manner that the information inputted from the plurality of input sources is freely combined together in accordance with the designated order, can be fetched to the application program.

The printer in the above described embodiments may employ an electrophotographic system, an ink-jet system, a sublimation system or other systems. The scanner may include a flat head scanner and a scanner of other system.

Further, the peripheral devices on the network are not limited to the printer, the scanner and the digital copying machine, and may include other peripheral devices such as a digital camera and, a modem, etc. Other peripheral devices such as the digital camera, the modem can be displayed by icons similar to the appearances of the products on a system display window shown in FIG. 3, likewise the printer, the scanner and the digital copying machine, etc. Besides, other peripheral devices such as the digital camera, the modem, etc. may be designated as the input and output devices similarly to the printer, the scanner, the digital copying machine, etc. to perform the above described various kinds of combined functions.

As explained above, according to the present invention, since, while the system configuration is displayed, when the icons of a pair of peripheral devices for the combined function processing desired by the user are instructed, the setup window of the combined functions is displayed, the icons of the instructed peripheral devices are displayed by icons extremely similar to the outlines of the peripheral devices and exhibiting the function of monochrome/color, etc. and the combined operations of the respectively corresponding peripheral devices are controlled on the basis of the setup on the setup window, the combined functions can be easily and efficiently set up even on the setup window of the combined functions, while the kinds and the functions of the peripheral devices are visually recognized. Further, since the optimum combination setup of the peripheral devices instructed to be combined is determined and displayed as an initial value, even a user unused to the setup of the combined functions can readily output a high quality image suitable for the performances of the input device and the output device. Further, since the resource file as the resource of icons of the peripheral devices can be got from the management server, even when a new device is added by a maker, an icon corresponding to the new device can be displayed in all client machines on the network without performing the troublesome work of installing resource file in all the client machines on the network but merely by installing the resource file in the management server.

Therefore can be freely and effectively formed an operating environment in which the combined functions can be set up while the kinds and functions of the peripheral devices are visually recognized and a data processing setup based on the above setup can be easily and efficiently performed.

<Recording Medium for Storing Data Processing Program>

Now, a data processing program which can be read by the CPU2 of the data processor according to the present invention will be described hereinafter. FIG. 53 is a view showing the memory map of a recording medium for storing various kinds of data processing programs. Information for controlling groups of programs stored in the memory or storing medium, which is not specifically shown, such as version information, a creator, etc. is also stored. Further, information depending on the OS or the like of a program reading side, for example, icons for identifying and displaying the programs, etc. may be stored in the memory or storing medium.

Further, data dependent upon various kinds of programs is also controlled by the above directory. When a program for installing the various kinds of programs in a computer or the programs themselves to be installed are compressed, a program or the like for uncompressing or decoding them may be also stored in the memory medium.

The functions shown in FIGS. 7 and 10 in the present embodiment may be executed through externally installed programs by a host computer. In that case, the present invention is applied even to a case in which the groups of information including programs are fed to the output device by a memory or storing medium such as a CD-ROM, a flash memory, an FD, etc., or from an external storing medium or memory medium through the network.

As described above, needless to say, the object of the present invention can be achieved by supplying the storing medium on which the program codes of software for realizing the functions of the above described embodiment to the system or the device and reading and executing the program codes stored in the storing medium by the computer (or a CPU or an MPU) of the system or the device.

In this case, the program codes themselves read from the storing medium can realize the new function of the present invention, and the storing medium which stores the program codes therein constitutes the present invention.

As the memory or storing medium for supplying the program codes, for instance, a floppy disk, a hard disk, an optical disk, a photomagnetic disk, a CD-ROM, a CD-R, a magnetic tape, a non-volatile memory card, a ROM, an EEPROM, etc. can be utilized.

Further, it should be noted that the program codes read by the computer are executed, so that not only the functions of the above described embodiment are realized, but also the OS (operating system), etc. operating on the computer performs a part or all of the actual processings on the basis of the instruction of the program codes, and the functions of the above embodiment can be also realized by the processings.

Still further, needless to say, after the program codes read from the storing or memory medium are written in a memory provided in a function expanding board inserted into the computer or a function expanding unit connected to the computer, a CPU or the like provided on the function expanding board or the function expanding unit performs a part or all of the actual processings on the basis of the instruction of the program codes and the functions of the above described embodiment may be also realized by the above described processings.

Now, referring to a memory map shown in FIG. 46, the configuration of the data processing program which can be read by the data processor according to the present invention will be described below.

Similarly, FIG. 53 is a view for explaining the memory map of a memory or storing medium for storing various kinds of data processing programs which can be read by the data processor of the present invention.

Information for controlling groups of programs stored in the memory or storing medium, which is not specifically shown, such as version information, a creator, etc. is also stored. Further, information depending on the OS or the like of a program reading side, for example, icons for identifying and displaying the programs, etc. may be also stored in the memory medium.

Further, data dependent upon various kinds of programs is also controlled by the above described directory. When programs or data to be installed are compressed, a program or the like for thawing or decoding them may be also stored in the memory or storing medium.

The functions shown in FIGS. 39, 41, 42, 46, 47, 48 and 52 in the present embodiment may be executed through externally installed programs by a host computer. In that case, the present invention is applied even to a case in which the groups of information including programs are fed to the output device by a memory or storing medium such as a CD-ROM, a flash memory, an FD, etc. or from an external storing medium through the network.

As described above, needless to say, the object of the present invention can be also achieved by supplying the storing medium on which the program codes of software for realizing the functions of the above described embodiment to the system or the device and reading and executing the program codes stored in the storing medium by the computer (or a CPU or an MPU) of the system or the device. In this case, the program codes themselves read from the storing medium can realize the new function of the present invention, and the storing medium which stores the program codes constitutes the present invention.

As the storing or memory medium for supplying the program codes, for instance, a floppy disk, a hard disk, an optical disk, a photomagnetic disk, a CD-ROM, a CD-R, a magnetic tape, a non-volatile memory card, a ROM, an EEPROM, etc can be utilized.

Further, it should be noted that the program codes read by the computer are executed, so that not only the functions of the above described embodiment are realized, but also the OS (operating system), etc. operating on the computer performs a part or all of the actual processings on the basis of the instruction of the program codes, and the functions of the above embodiment may be also realized by the above described processings.

Still further, needless to say, after the program codes read from the storing or memory medium are written in a memory provided in a function expanding board inserted into the computer or a function expanding unit connected to the computer, a CPU or the like provided on the function expanding board or the function expanding unit performs a part or all of the actual processings on the basis of the instruction of the program codes, and the functions of the above described embodiment may be also realized by the above processings.

Furthermore, the present invention may be applied to a system composed of plural devices or to a device composed of one item of equipment. Still further, the present invention can be applied to the achievement of software by supplying a program to a system or a device. In this case, the memory or storing medium in which the program represented by the software for achieving the present invention is stored is read to the system or the device, so that the effects of the present invention can be applied to the system and the device.

Additionally, the program represented by the software for achieving the present invention is downloaded and read by a communication program from a database on the network, so that the system and the device can satisfy the effects of the present invention.

What is claimed is:

1. A data processing apparatus capable of performing data communication with various peripheral devices connected on a predetermined communication medium, comprising:
   obtaining means for obtaining, via the predetermined communication medium, present peripheral device information including connection information and status information about the peripheral devices;
   system display means for displaying a system configuration on a display with icons based on the present peripheral device information obtained by said obtaining means via the predetermined communication medium;
   designation means for designating a combination of any of the icons displayed on the display based on the obtained present peripheral device information;
   setup screen display means for displaying on the display a setup screen for the combined functions based on the combination designated by said designation means if the combined functions are determined to be valid; and
   control means for controlling the peripheral devices designated by said designation means in order to execute the combined functions in response to an execution instruction,
   wherein said control means further controls the peripheral devices based on a parameter input in the setup screen displayed by said setup screen display means.

2. The data processing apparatus according to claim 1, wherein:
   when an icon representing a scanner and an icon representing a printer are designated by said designation means, said control means causes image data to be input to the scanner, the image data to be transferred from the scanner to the printer, and the image data to be output on the printer.

3. The data processing apparatus according to claim 1, wherein, when icons are designated by said designation means, said system display means modifies the appearance of the designated icons distinguishably from the other icons.

4. The data processing apparatus according to claim 1, wherein, when an icon representing a scanner and an icon representing an printer are designated by said designation means, said system display means causes an image to be displayed on the display, the image indicating that data is being transferred from the scanner to the printer.

5. The data processing apparatus according to claim 1, further comprising parameter determination means for determining a parameter involving the combined functions based on information about the function of peripheral devices according to the combination of icons designated by said designation means.

6. The data processing apparatus according to claim 5, wherein said setup screen display means causes the setup screen to be displayed on the display based on the parameter determined by said parameter determination means.

7. The data processing apparatus according to claim 5, wherein, when an icon representing a scanner and an icon representing a printer are designated by said designation means, said parameter determination means determines the resolution of a copy function based on the resolution of the scanner and the resolution of the printer.

8. The data processing apparatus according to claim 5, wherein, when an icon representing a scanner and an icon representing a printer are designated by said designation means, said parameter determination means determines which of the two copying modes color or monochrome, is to be performed.

9. The data processing apparatus according to claim 5, wherein, when an icon representing a scanner and an icon representing a printer are designated by said designation means, said parameter determination means determines a paper size.

10. The data processing apparatus according to claim 1, wherein said obtaining means obtains information about the function of the peripheral device.

11. The data processing apparatus according to claim 1, wherein plural other data processing apparatuses capable of performing data communication with said data processing apparatus are connected to the predetermined communication medium.

12. The data processing apparatus according to claim 11, wherein any of the plurality of data processing apparatus is assigned as a management server.

13. The data processing apparatus according to claim 12, wherein said obtaining means obtains the connection information and the status information from the management server.

14. The data processing apparatus according to claim 1, wherein the peripheral devices include a printer.

15. The data processing apparatus according to claim 1, wherein the peripheral devices include a facsimile.

16. The data processing apparatus according to claim 1, wherein the peripheral devices include a digital copier.

17. The data processing apparatus according to claim 1, wherein the peripheral devices include a scanner.

18. The apparatus according to claim 1, further comprising determination means for determining whether the combined functions based on the combination of icons designated by said designating means are valid or not.

19. The apparatus according to claim 18, wherein said system display means modifies the appearance of the icons designated by said designation means distinguishably from the other icons, if the combined functions are determined to be valid by said determination means.

20. A data processing method in a data processing apparatus capable of performing data communication with various peripheral devices connected to a predetermined communication medium, comprising the steps of:

obtaining, via the predetermined communication medium, present peripheral device information including connection information and status information about the peripheral devices;

displaying a system configuration on a display with icons based on the present peripheral device information obtained in said obtaining step via the predetermined communication medium;

designating a combination of any of the icons displayed on in display based on the obtained present peripheral device information;

displaying on the display a setup screen for the combined functions based on the combination designated in said designation step if the combined functions are determined to be valid; and controlling the peripheral devices designated in said designation step in order to execute the combined functions in response to an execution instruction, wherein said control step includes controlling the peripheral devices based on a parameter input in the setup screen displayed in said setup screen display step.

21. The data processing method according to claim 20, wherein, when an icon representing a scanner and an icon representing a printer are designated in said designation step, said control step includes causing image data to be input to the scanner, the image data to be transferred from the scanner to the printer, and the image data to be output on the printer.

22. The data processing method according to claim 20, wherein, when icons are designated in said designation step, said system display step includes modifying the appearance of the designated icons distinguishably from the other icons.

23. The data processing method according to claim 20, wherein, when an icon representing a scanner and an icon representing an printer are designated in said designation step, said system display step includes causing an image to be displayed on the display, the image indicating that data is being transferred from the scanner to the printer.

24. The data processing method according to claim 20, further comprising the step of determining a parameter involving the combined functions based on information about the function of peripheral devices according to the combination of icons designated in said designation step.

25. The data processing method according to claim 24, wherein said setup screen display step includes causing the setup screen to be displayed on the display based on the parameter determined in said parameter determination step.

26. The data processing method according to claim 24, wherein, when an icon representing a scanner and an icon representing a printer are designated in said designation step, said parameter determination step includes determining the resolution of a copy function based on the resolution of the scanner and the resolution of the printer.

27. The data processing method according to claim 24, wherein, when an icon representing a scanner and an icon representing a printer are designated in said designation step, said parameter determination step includes determining which of the two copying modes, color or monochrome, is to be performed.

28. The data processing method according to claim 24, wherein, when an icon representing a scanner and an icon representing a printer are designated in said designation step, said parameter determination step includes determining a paper size.

29. The data processing method according to claim 20, wherein said obtaining step includes obtaining information about the function of the peripheral device.

30. The data processing method according to claim 20, wherein plural other data processing apparatuses capable of performing data communication with the data processing apparatus are connected to the predetermined communication medium.

31. The data processing method according to claim 30, wherein any of the plurality of data processing apparatuses is assigned as a management server.

32. The data processing method according to claim 31, wherein said obtaining step includes obtaining the connection information and the status information from the management server.

33. The data processing method according to claim 20, wherein the peripheral devices include a printer.

34. The data processing method according to claim 20, wherein the peripheral devices include a facsimile.

35. The data processing method according to claim 20, wherein the peripheral devices include a digital copier.

36. The data processing method according to claim 20, wherein the peripheral devices include a scanner.

37. The method according to claim 20, further comprising the step of determining whether the combined functions based on the combination of icons designated in said designating step are valid or not.

38. The method according to claim 37, wherein said system display step includes modifying the appearance of the icons designated in said designation step distinguishably from the other icons, if the combined functions are determined to be valid in said determination step.

39. A computer-readable memory medium which stores a program for a data processing apparatus capable of performing data communication with various peripheral devices connected to a predetermined communication medium, the program comprising the steps of:

code for obtaining, via the predetermined communication medium present peripheral device information including connection information and status information about the peripheral devices;

code for displaying a system configuration on a display with icons based on the present peripheral device information obtained in said obtaining step via the predetermined communication medium;

code for designating a combination of any of the icons displayed on the display via the predetermined communication medium;

code for displaying on the display a setup screen for the combined functions based on the combination designated in said designation step if the combined functions are determined to be valid; and code for controlling the peripheral devices designated in said designation step in order to execute the combined functions in response to an execution instruction, wherein said code for controlling controls the peripheral devices based on a parameter input in the setup screen displayed in said setup screen display step.

40. The memory medium according to claim 39, wherein, when an icon representing a scanner and an icon representing a printer are designated in said designation step, said control step includes causing image data to be input to the scanner, the image data to be transferred from the scanner to the printer, and the image data to be output on the printer.

41. The memory medium according to claim 39, further comprising code for determining whether the combined functions based on the combination of icons designated in said designating step are valid or not.

42. The memory medium according to claim 41, wherein said system display step includes modifying the appearance of the icons designated in said designation step distinguishably from the other icons, if the combined functions are determined to be valid in said determination step.

43. The memory medium according to claim 39, wherein, when icons are designated in said designation step, said system display step includes modifying the appearance of the designated icons distinguishably from the other icons.

44. The memory medium according to claim 39, wherein, when an icon representing a scanner and an icon representing an printer are designated in said designation step, said system display step includes modifying an image to be displayed on the display, the image indicating that data is being transferred from the scanner to the printer.

45. The memory medium according to claim 39, the program further comprising code for determining a parameter involving the combined functions based on information about the function of peripheral devices according to the combination of icons designated in said designation step.

46. The memory medium according to claim 45, wherein said setup screen display step includes causing the setup screen to be displayed on the display based on the parameter determined in said parameter determination step.

47. The memory medium according to claim 45, wherein, when an icon representing a scanner and an icon representing a printer are designated in said designation step, said parameter determination step includes determining the resolution of a copy function based on the resolution of the scanner and the resolution of the printer.

48. The memory medium according to claim 45, wherein, when an icon representing a scanner and an icon representing a printer are designated in said designation step, said parameter determination step includes determining which of the two copying modes, color or monochrome, is to be performed.

49. The memory medium according to claim 45, wherein, when an icon representing a scanner and an icon representing a printer are designated in said designation step, said parameter determination step includes determining a paper size.

50. The memory medium according to claim 39, wherein said obtaining step includes obtaining information about the function of the peripheral device.

51. The memory medium according to claim 39, wherein plural other data processing apparatuses capable of performing data communication with the data processing apparatus are connected to the predetermined communication medium.

52. The memory medium according to claim 51, wherein any of the plurality of data processing apparatuses is assigned as a management server.

53. The memory medium according to claim 52, wherein said obtaining step includes obtaining the connection information and the status information from the management server.

54. The memory medium according to claim 39, wherein the peripheral devices include a printer.

55. The memory medium according to claim 39, wherein the peripheral devices include a facsimile.

56. The memory medium according to claim 39, wherein the peripheral devices include a digital copier.

57. The memory medium according to claim 39, wherein the peripheral devices include a scanner.

* * * * *

UNITED STATES PATENT AND TRADEMARK OFFICE
CERTIFICATE OF CORRECTION

PATENT NO. : 7,002,702 B1
APPLICATION NO. : 09/544669
DATED : February 21, 2006
INVENTOR(S) : Haruo Machida It is certified that error appears in the above-identified patent and that said Letters Patent is hereby corrected as shown below:

ON Title PAGE AT (57) ABSTRACT

Line 1, "plural" should read --plurality of --.

COLUMN 1

Line 28, "devices. For" should read --devices, for--.

COLUMN 11

Line 32, "is that" should read --that is--.

COLUMN 15,

Line 29, "preview" should read --previews of --.

COLUMN 26

Line 4, "form" should read --for--.

COLUMN 27

Line 51, "it" should read --there--.

COLUMN 37

Line 21, "can" should read --there can--.

COLUMN 40

Line 5, "an" should read --a--; and
Line 29, "modes" should read --modes,--.

UNITED STATES PATENT AND TRADEMARK OFFICE
CERTIFICATE OF CORRECTION

PATENT NO. : 7,002,702 B1
APPLICATION NO. : 09/544669
DATED : February 21, 2006
INVENTOR(S) : Haruo Machida It is certified that error appears in the above-identified patent and that said Letters Patent is hereby corrected as shown below:

COLUMN 41

Line 40, "an" should read --a--.

COLUMN 42

Line 42, "medium" should read --medium,--.

COLUMN 43

Line 16, "an" should read --a--.

Signed and Sealed this

Fifth Day of September, 2006

JON W. DUDAS
*Director of the United States Patent and Trademark Office*